United States Patent
Sugita

(10) Patent No.: US 8,797,655 B2
(45) Date of Patent: Aug. 5, 2014

(54) ZOOM LENS AND IMAGE PICKUP APPARATUS HAVING THE SAME

(75) Inventor: Shigenobu Sugita, Shimotsuke (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/614,416

(22) Filed: Sep. 13, 2012

(65) Prior Publication Data

US 2013/0088786 A1    Apr. 11, 2013

(30) Foreign Application Priority Data

Oct. 5, 2011   (JP) .................................. 2011-220908
Oct. 5, 2011   (JP) .................................. 2011-220909

(51) Int. Cl.
*G02B 15/14*    (2006.01)

(52) U.S. Cl.
CPC .................................... *G02B 15/14* (2013.01)
USPC ........................................ 359/683; 359/684

(58) Field of Classification Search
CPC .............................. G02B 15/14; G02B 15/22
USPC ............................. 359/676, 683, 684
See application file for complete search history.

(56) References Cited

U.S. PATENT DOCUMENTS

| 6,556,356 B2 | 4/2003 | Ohtake |
| 7,184,221 B2 | 2/2007 | Misaka |
| 2010/0091170 A1 | 4/2010 | Miyazaki et al. |
| 2010/0091171 A1 | 4/2010 | Miyazaki et al. |
| 2012/0314298 A1* | 12/2012 | Ota et al. .................. 359/683 |

FOREIGN PATENT DOCUMENTS

| JP | 63266415 A | 11/1988 |
| JP | 10111455 A | 4/1998 |
| JP | 10133109 A | 5/1998 |
| JP | 2001033697 A | 2/2001 |
| JP | 2001228397 A | 8/2001 |

* cited by examiner

*Primary Examiner* — Scott J Sugarman
(74) *Attorney, Agent, or Firm* — Canon USA Inc. IP Division

(57) ABSTRACT

A zoom lens includes a lens unit Ln having negative refractive power including two or less lenses moving during focusing and zooming, a lens unit Lp1 having positive refractive power disposed adjacent to an object side thereof, and a lens unit Lp2 having positive refractive power disposed adjacent to an image side thereof. The lens units Lp1 and Lp2 move during zooming. A distance Tlw between a lens surface nearest to the object side in the entire zoom lens and an image plane at a wide-angle end, a distance Dnw between the lens surface nearest to the image side of the lens unit Ln and the image plane at the wide-angle end, a back focus bfw at the wide-angle end, and a maximum amount of movement Mnz during focusing of the lens unit Ln at a telephoto end are appropriately set.

30 Claims, 46 Drawing Sheets

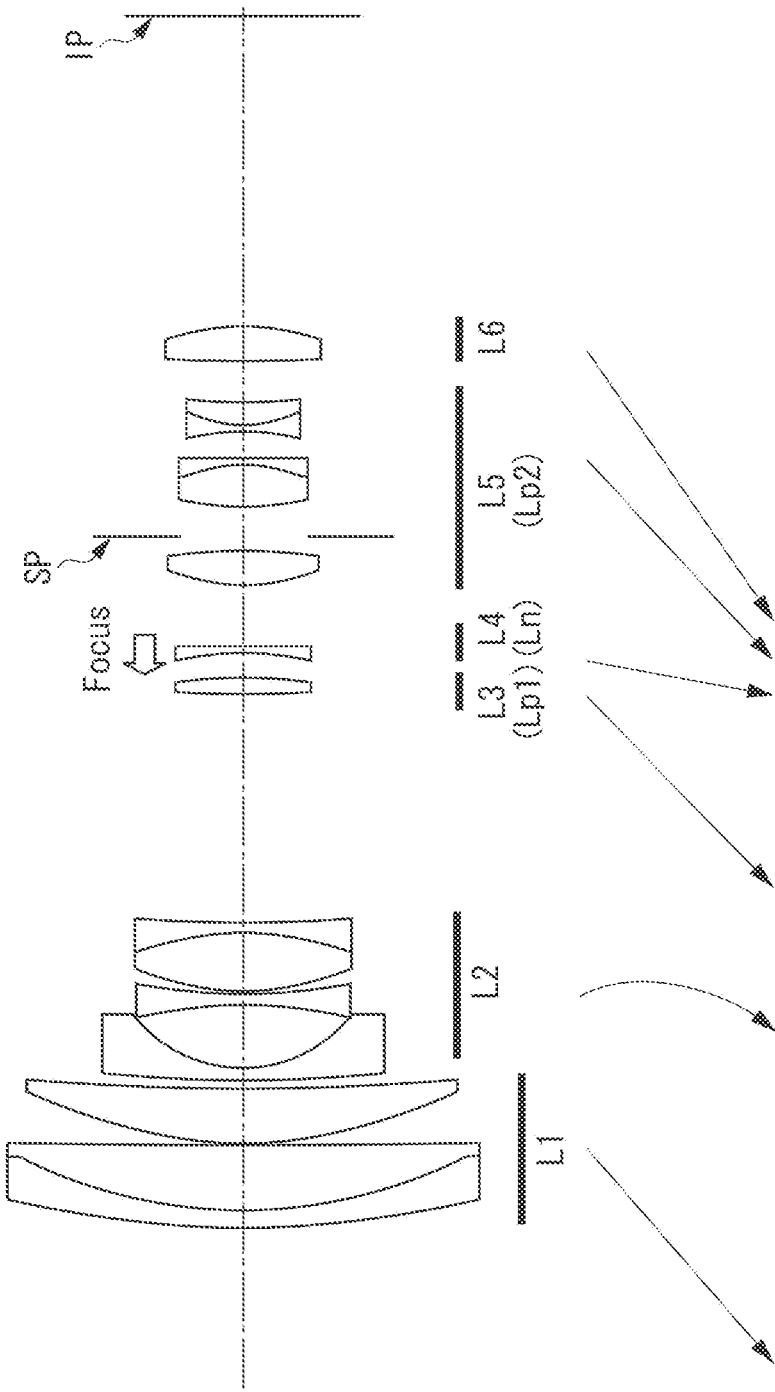

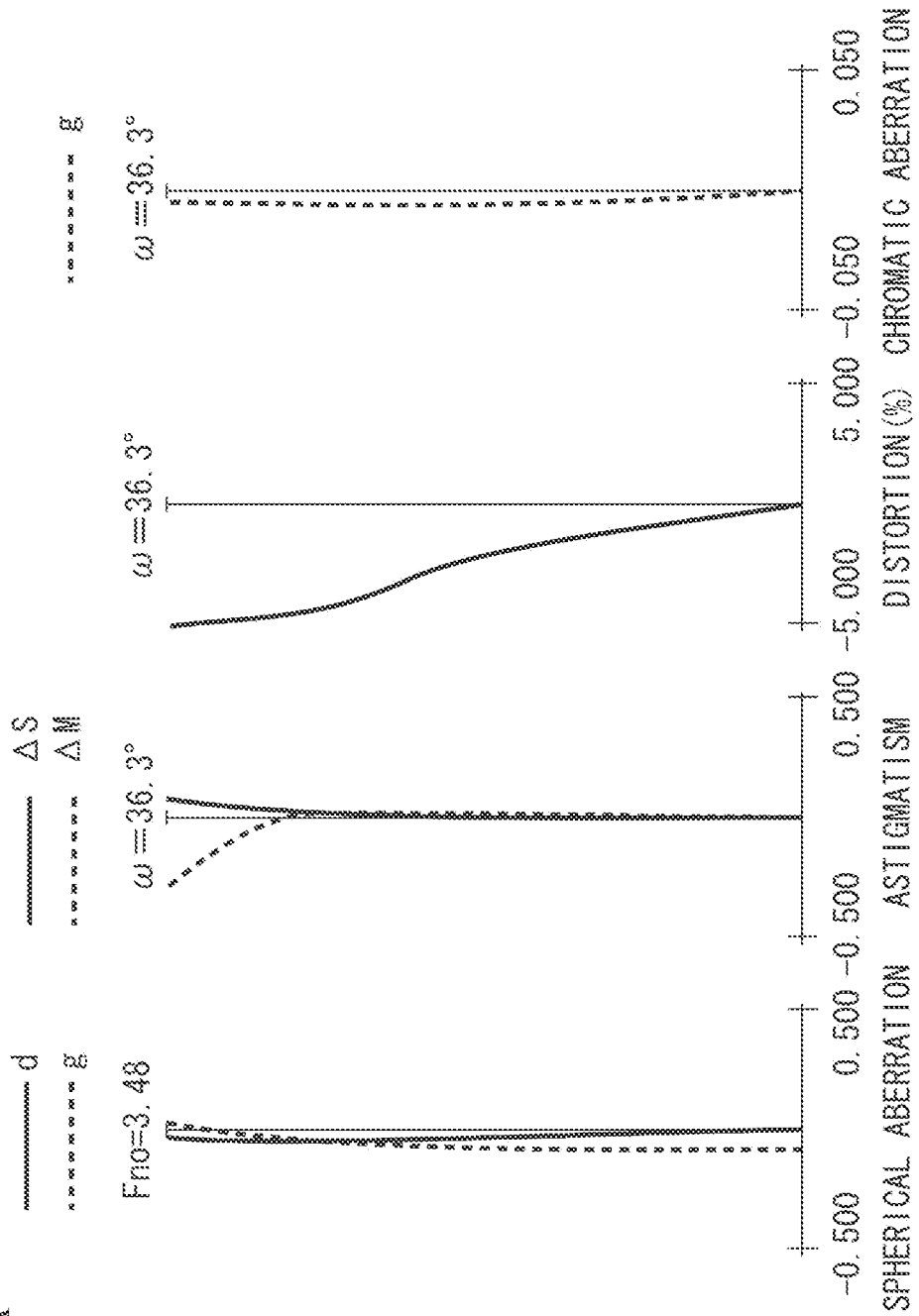

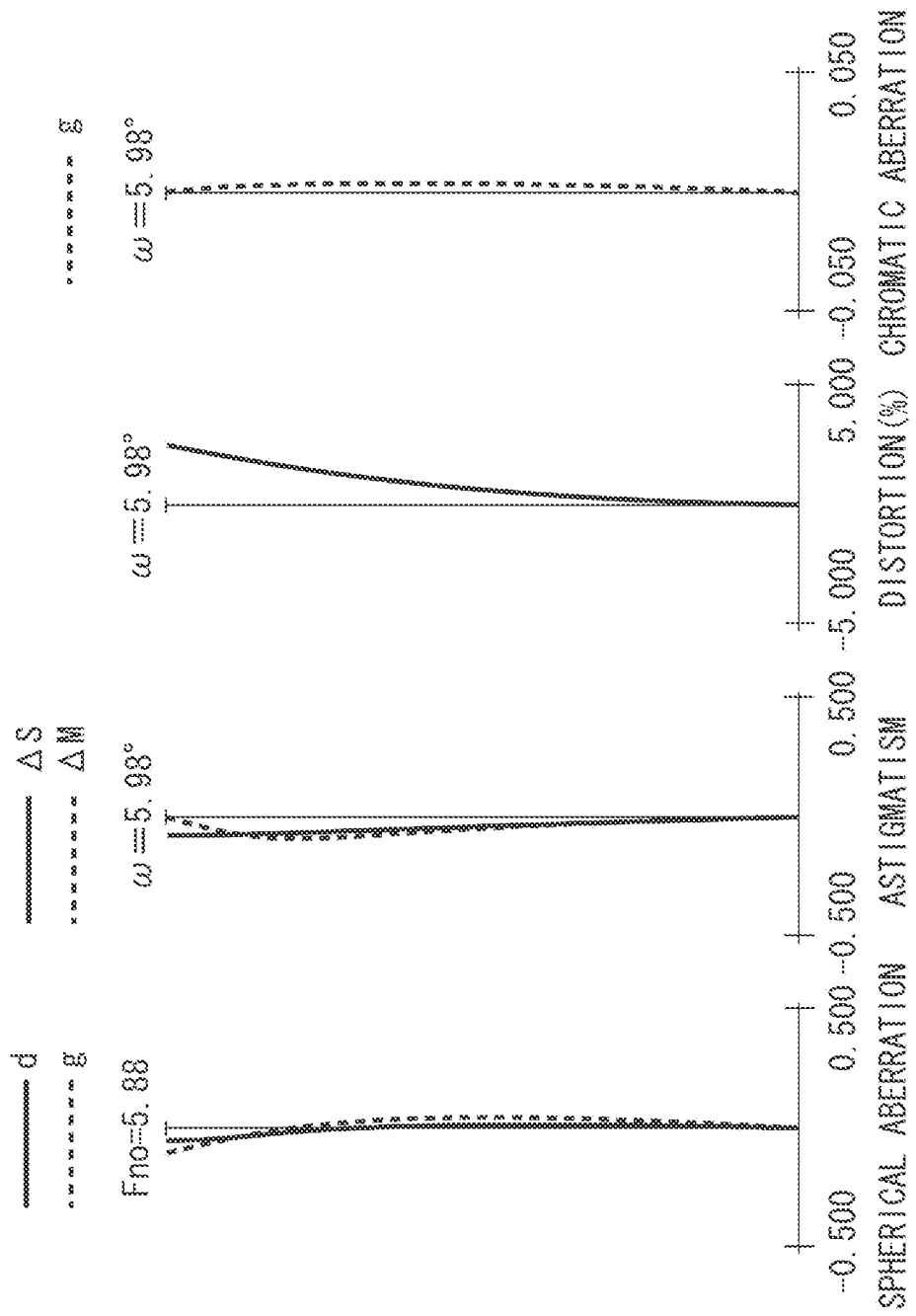

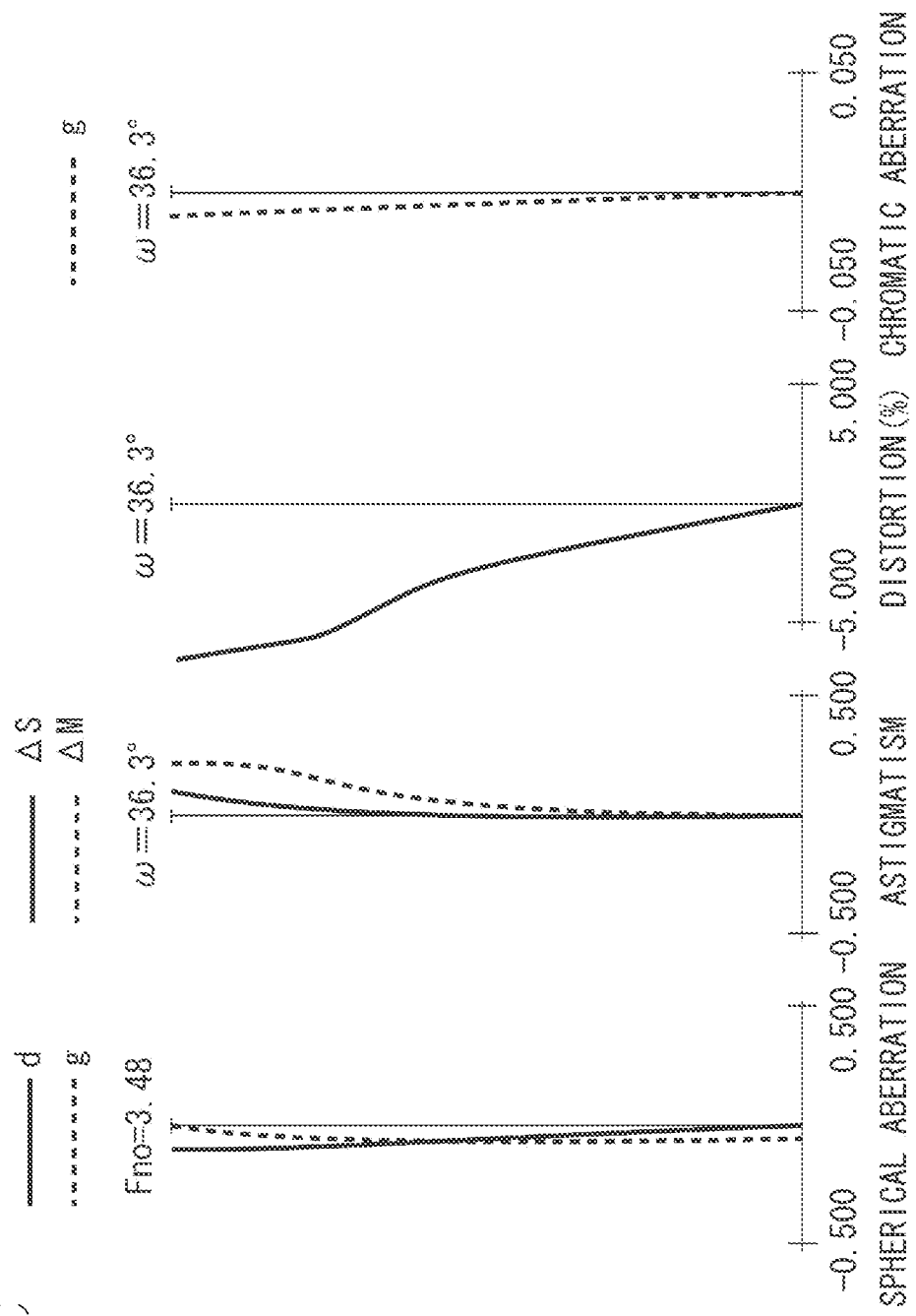

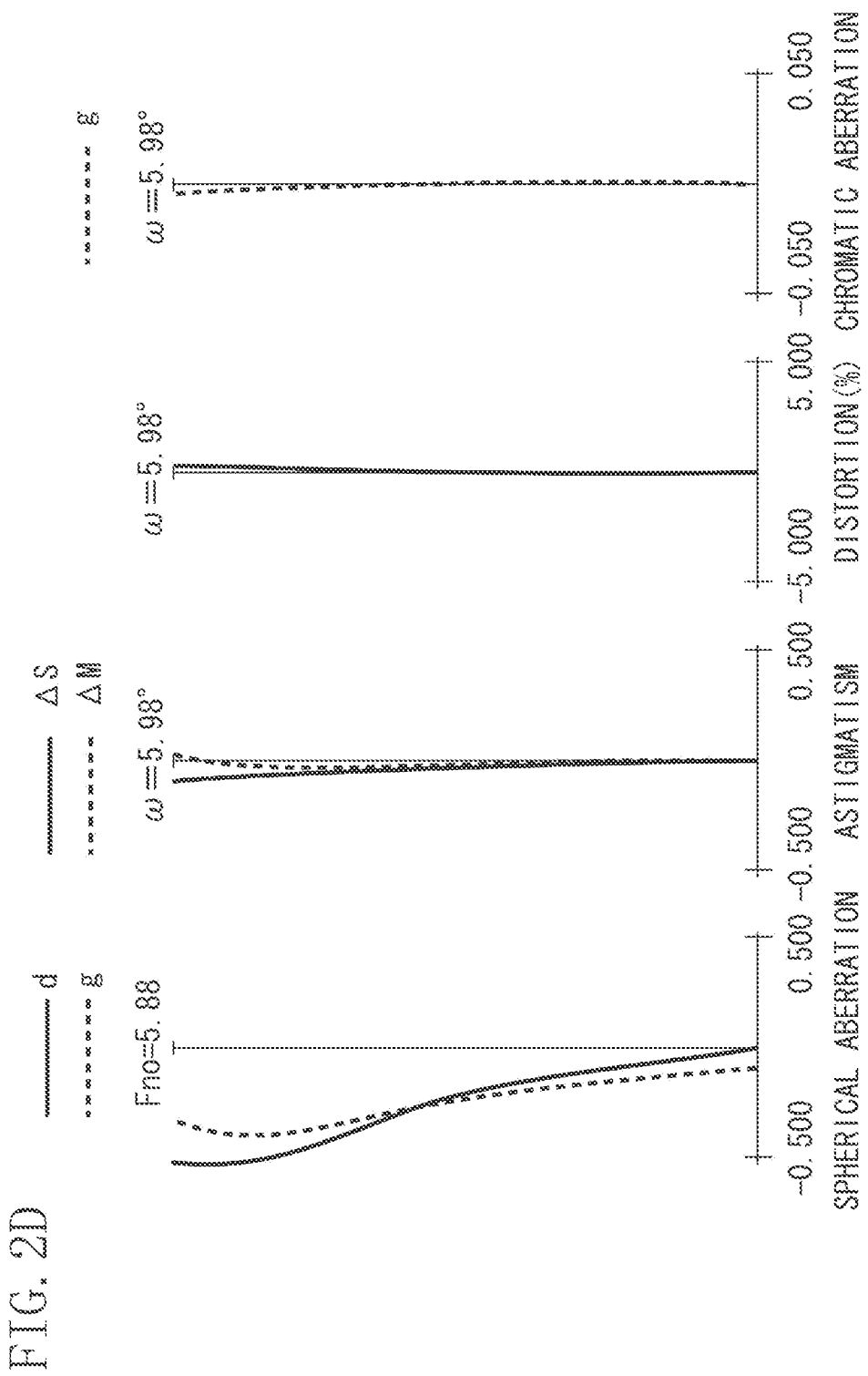

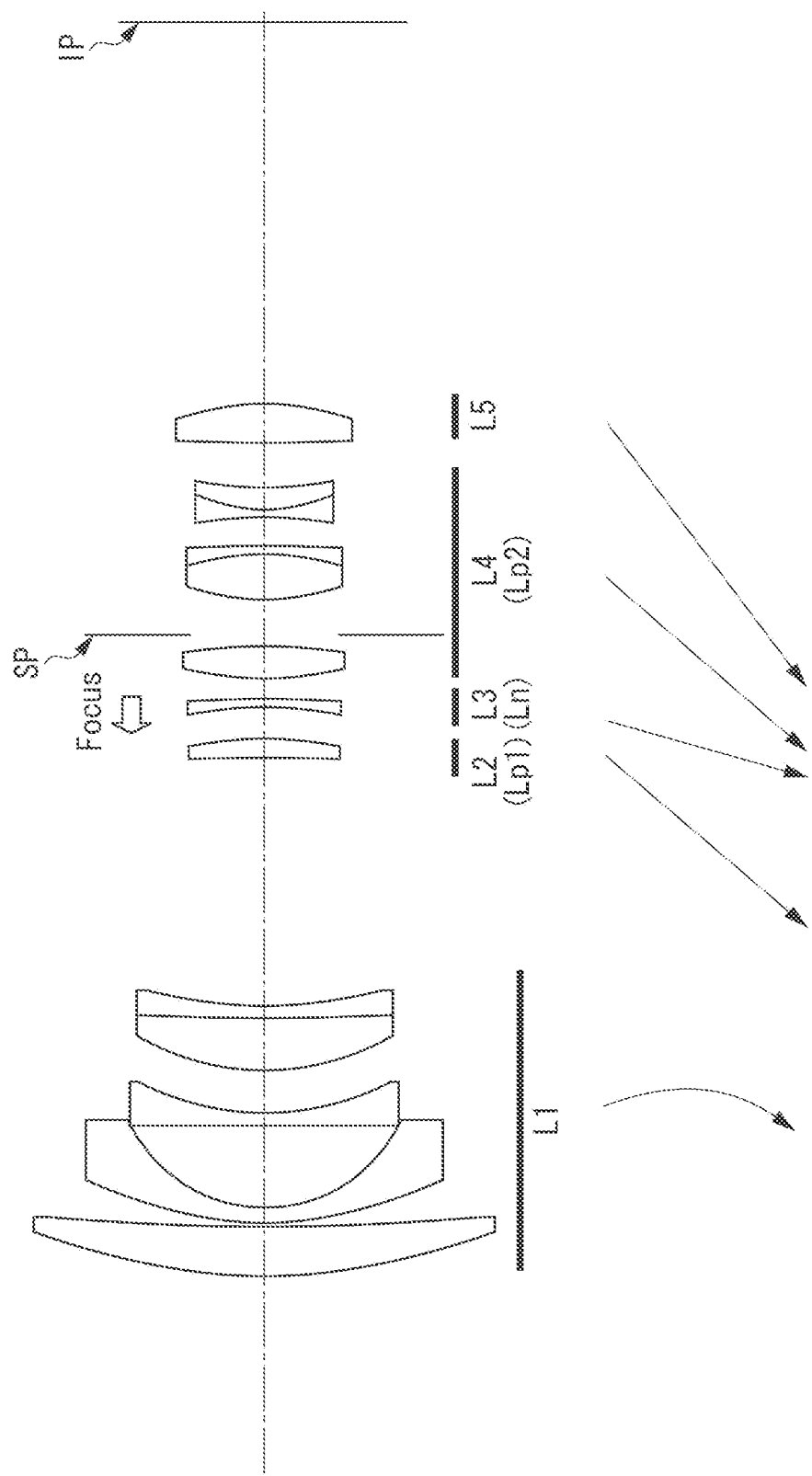

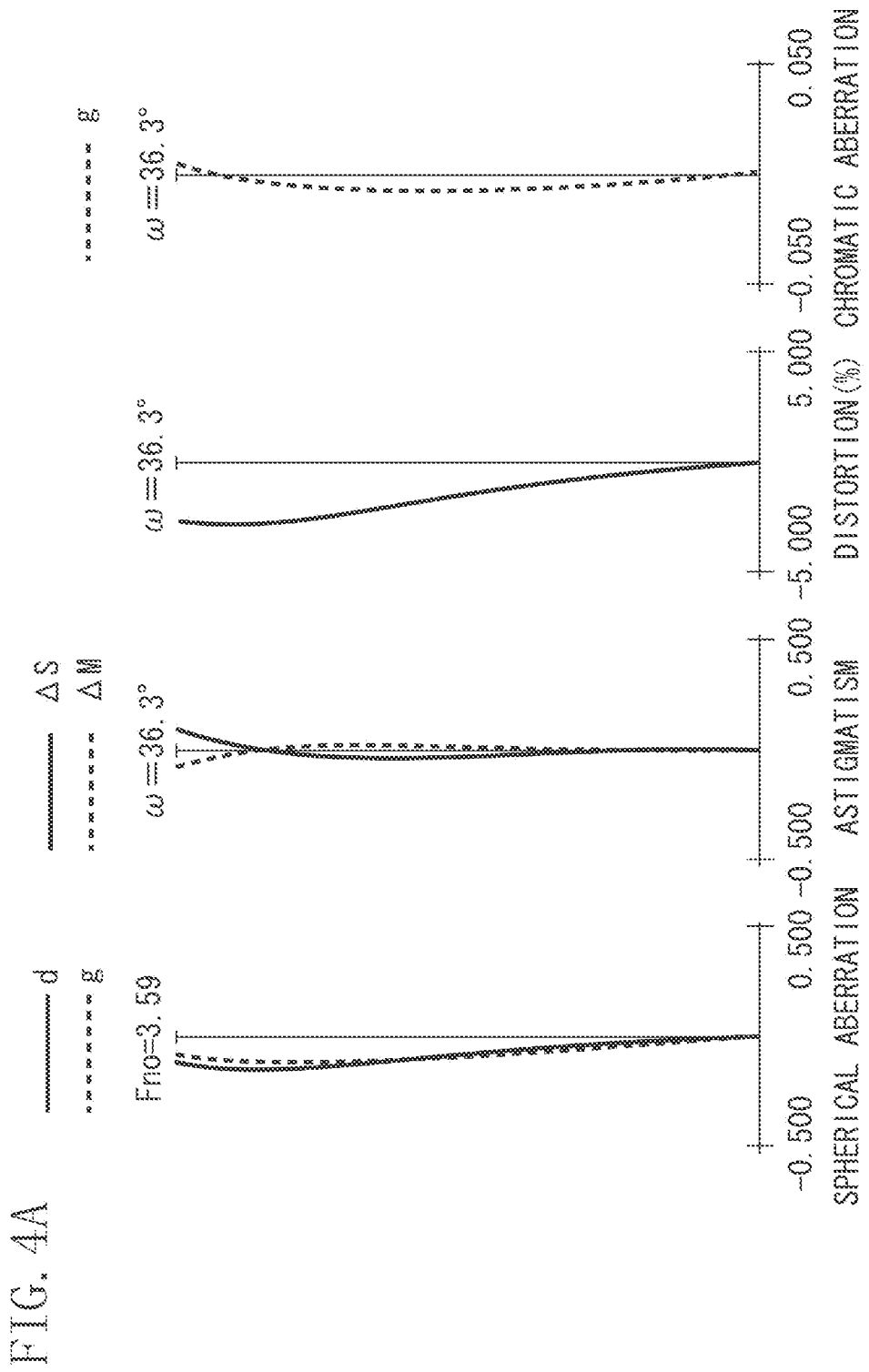

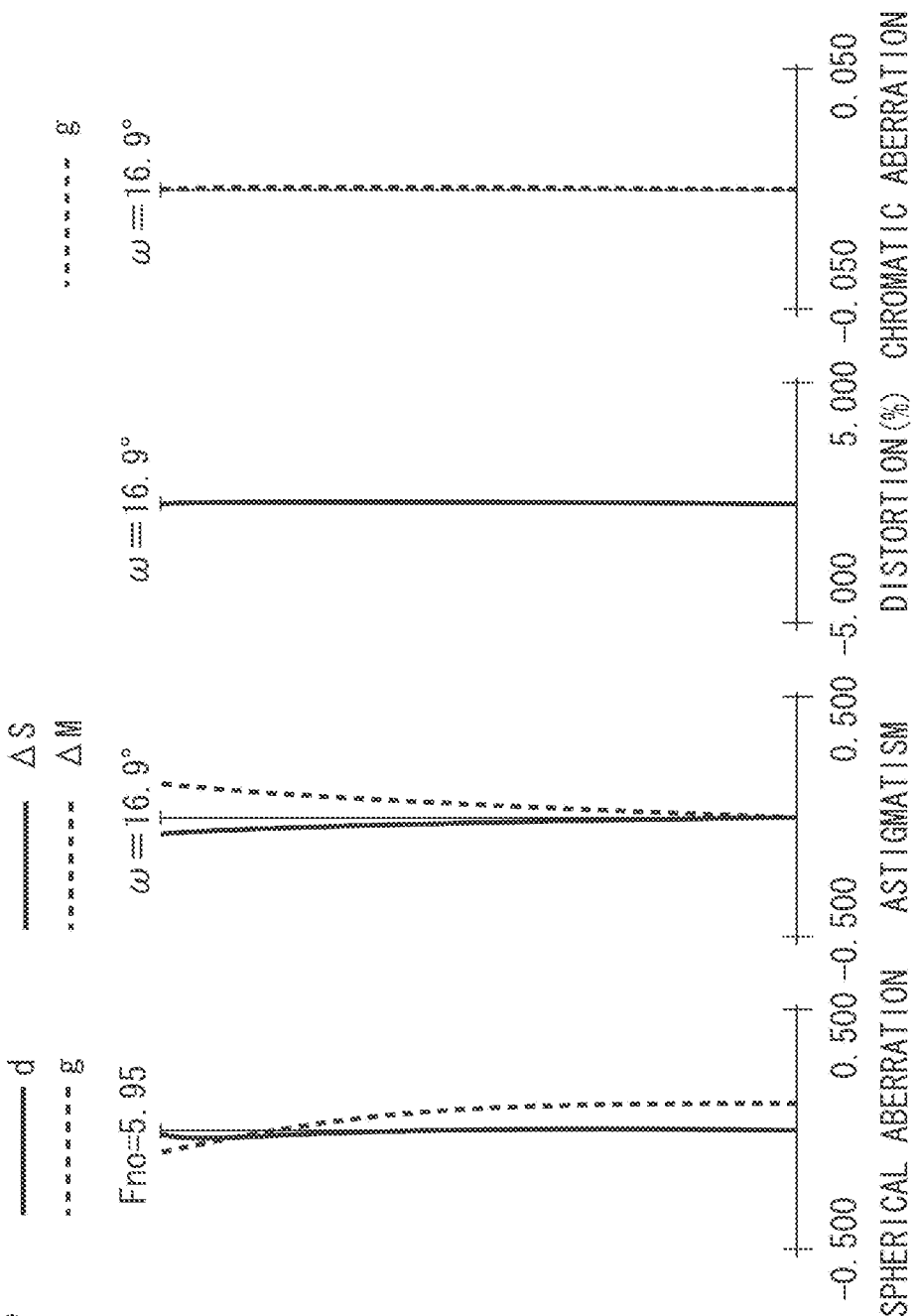

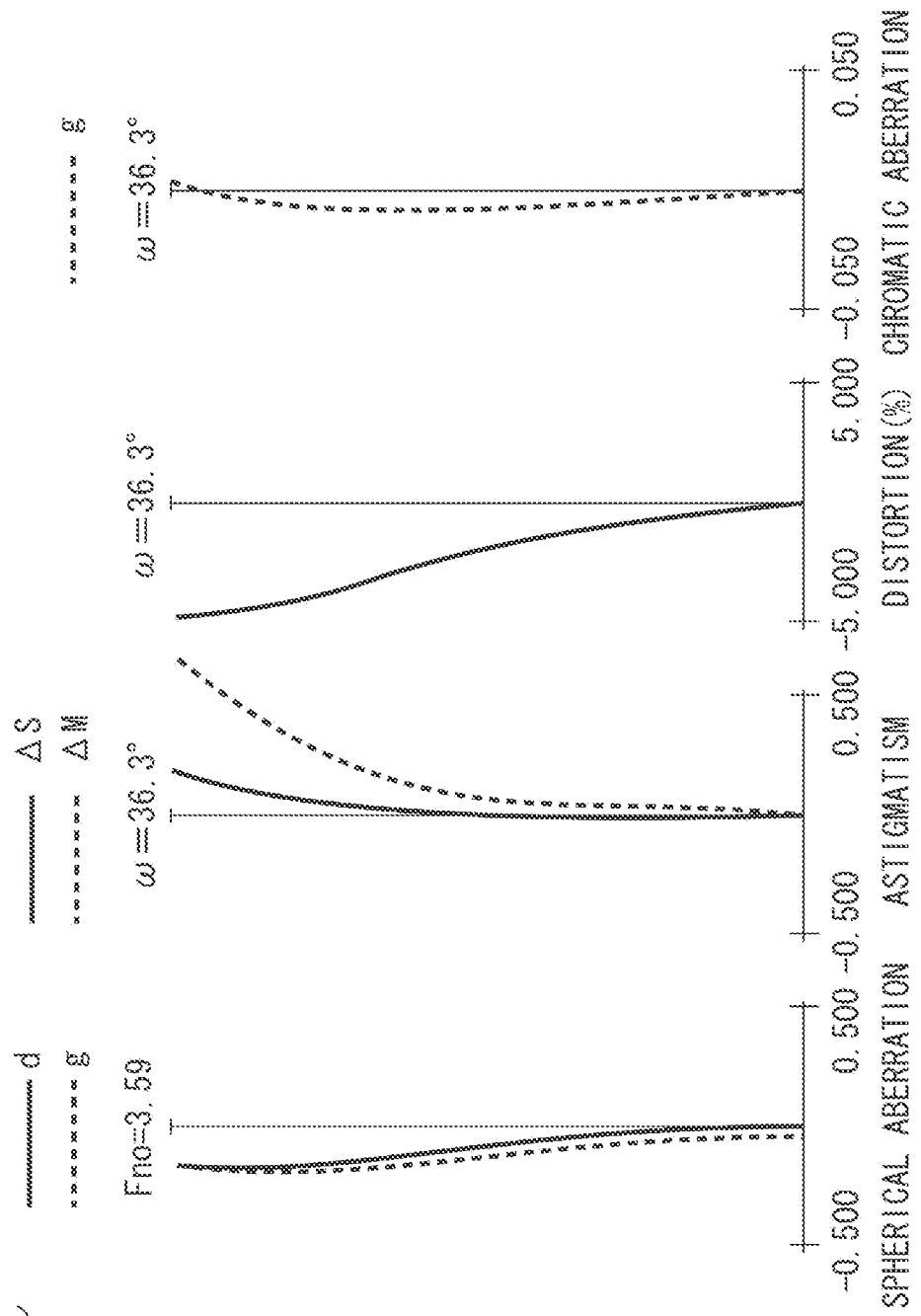

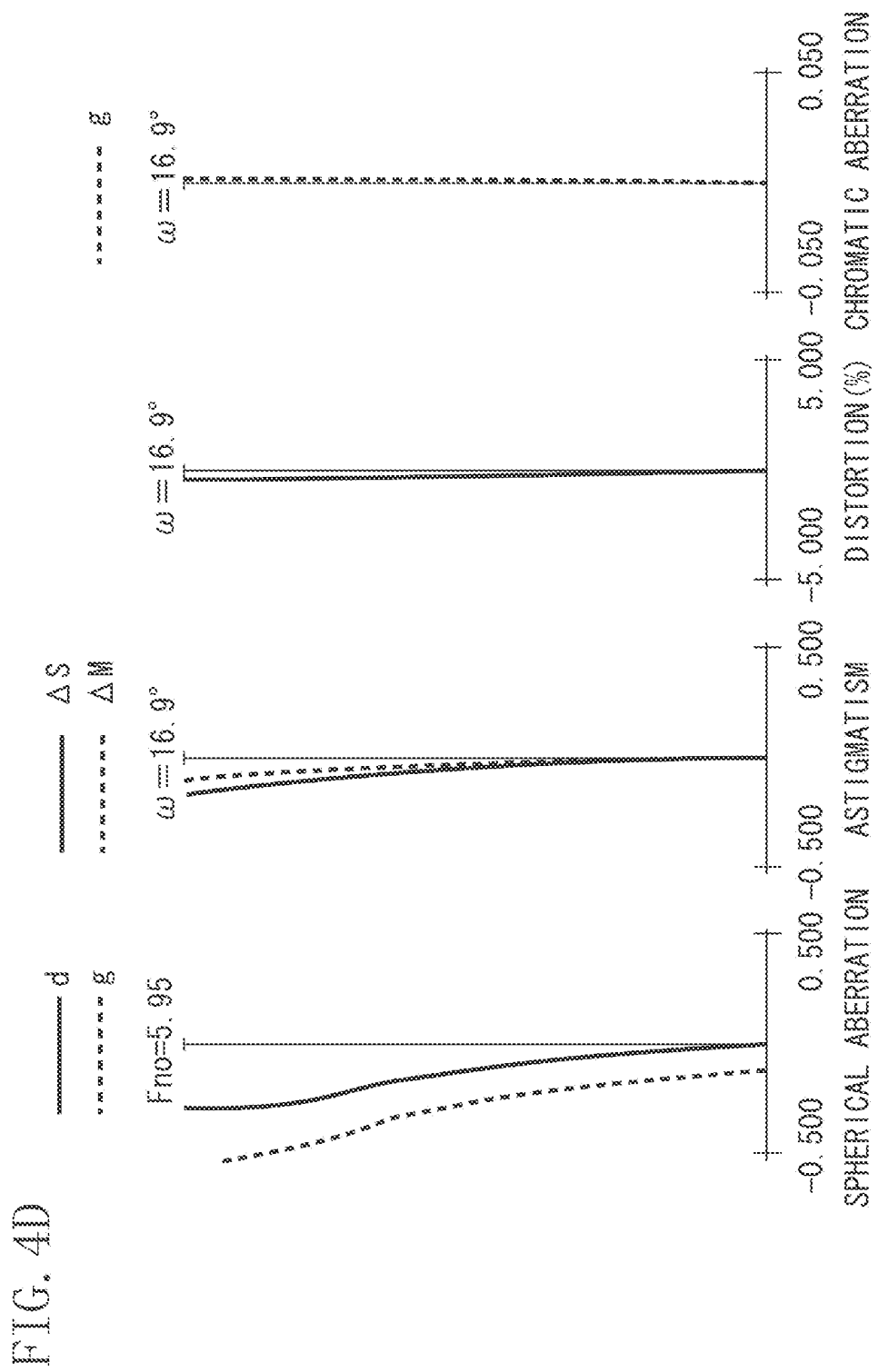

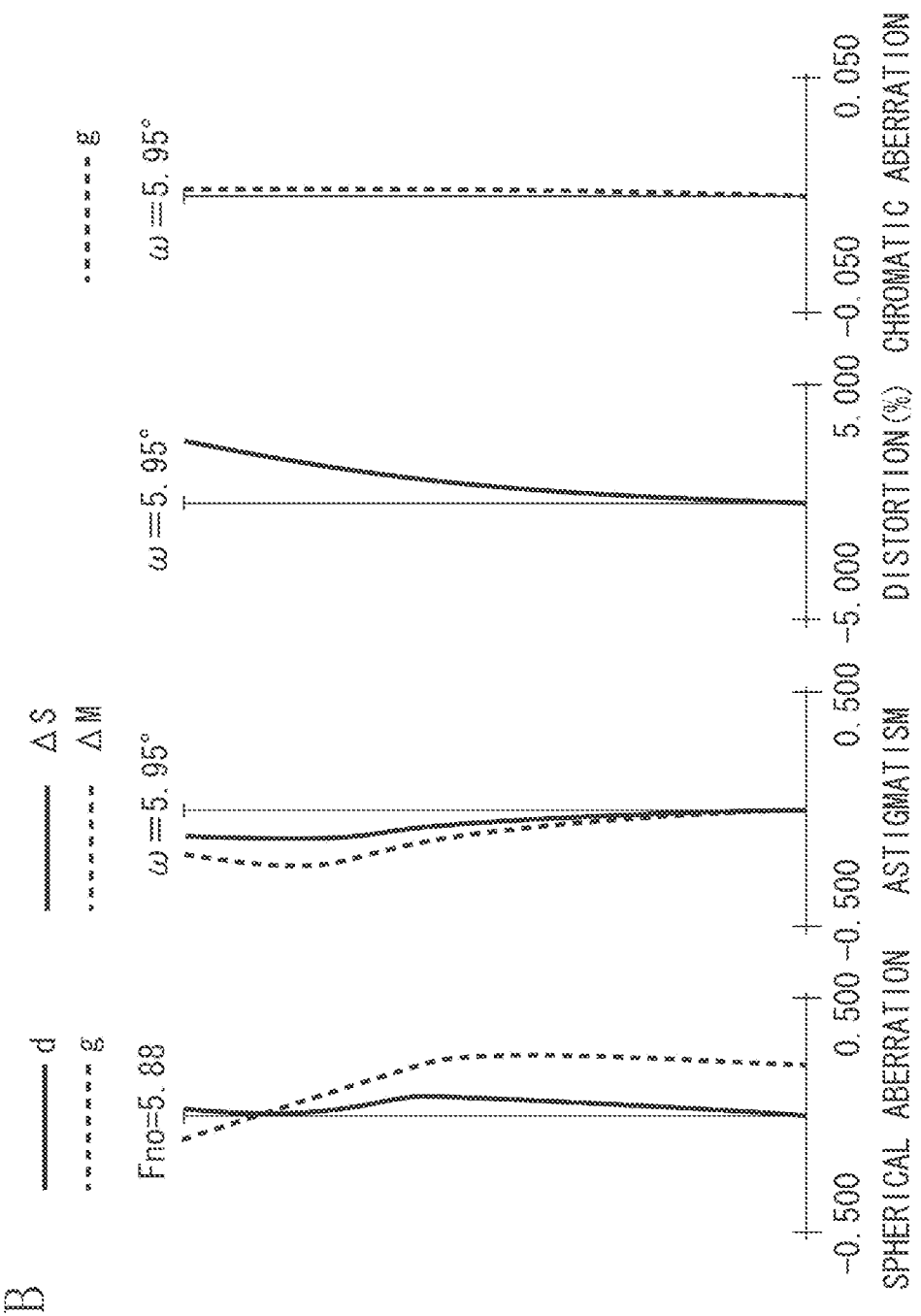

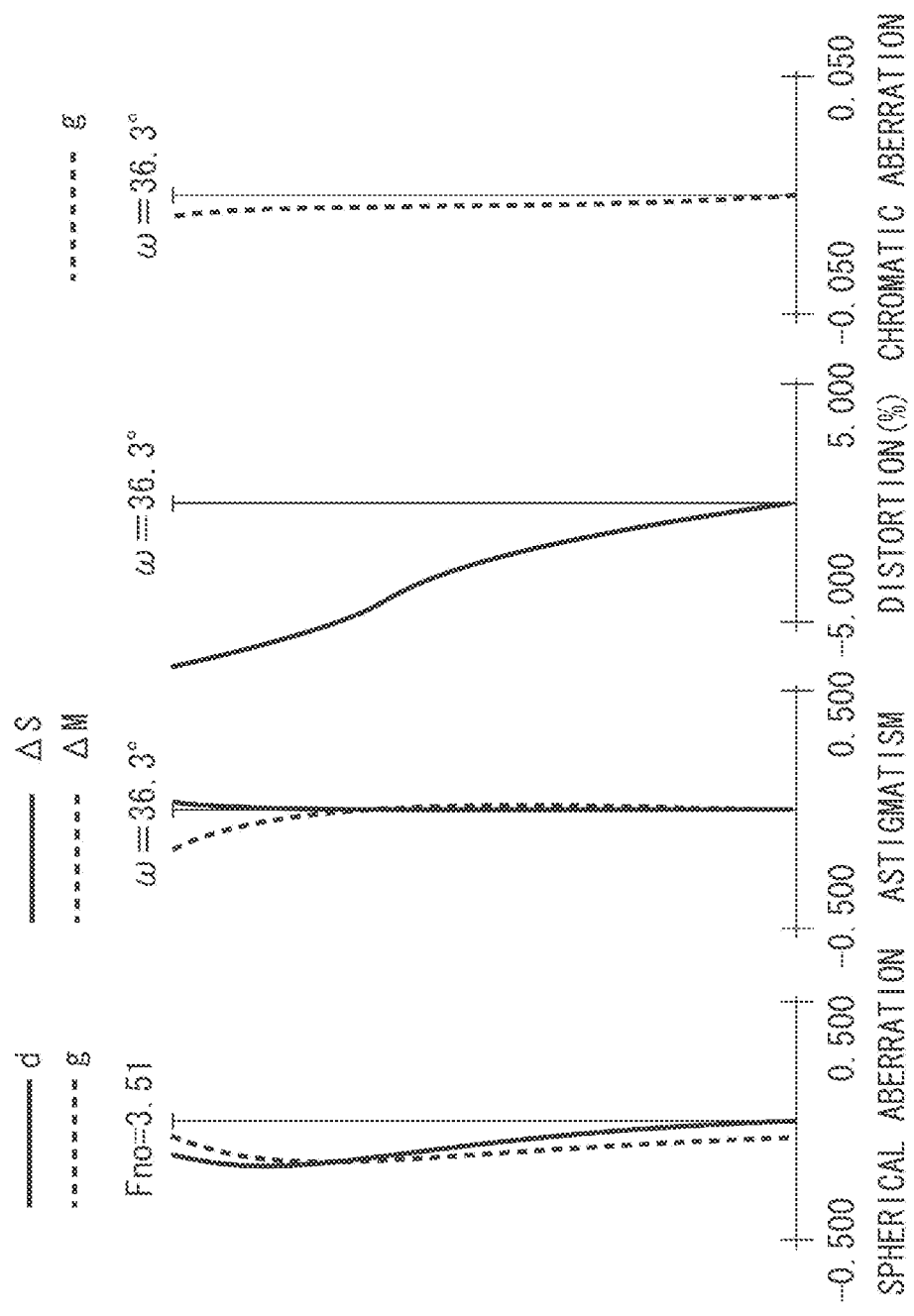

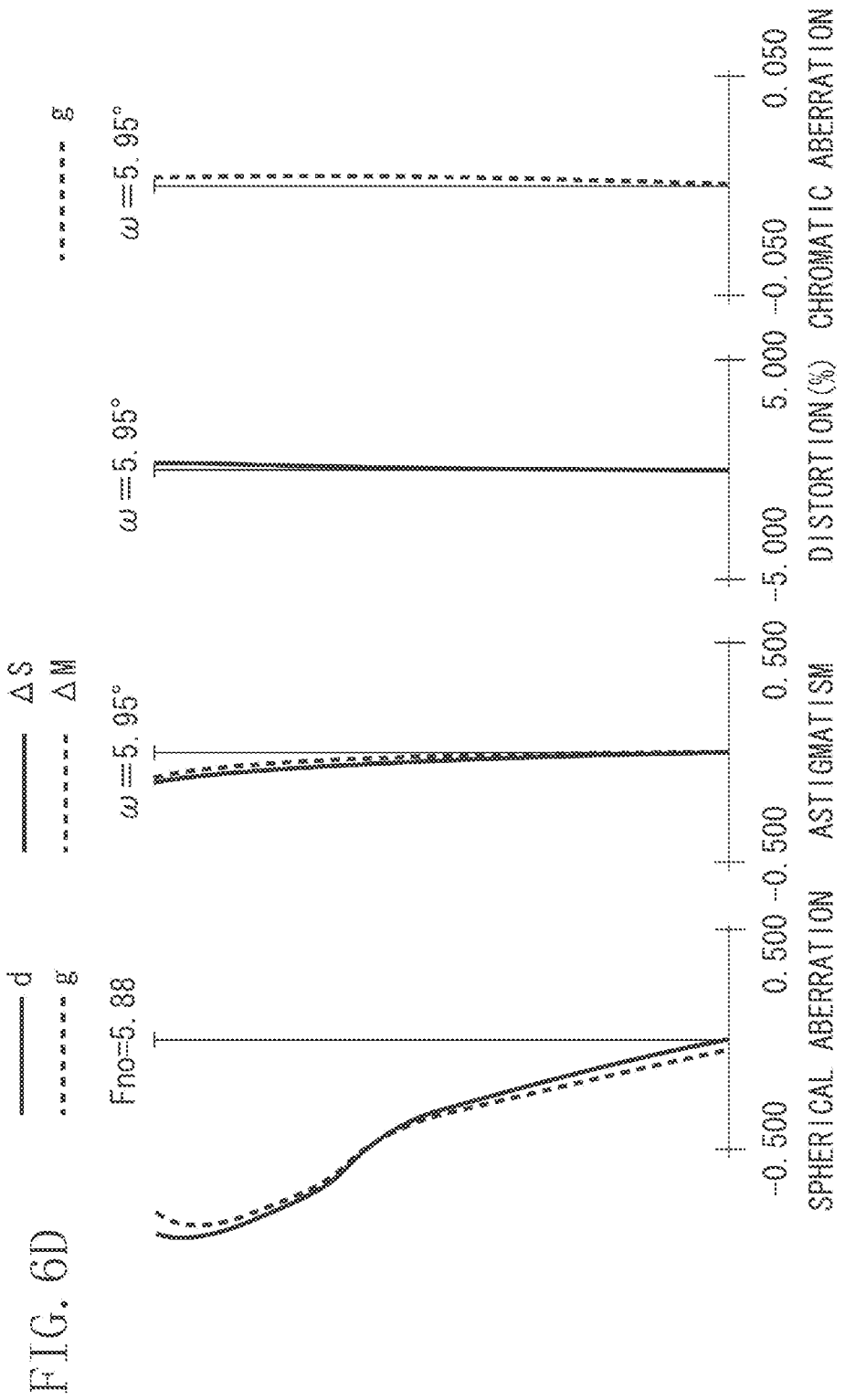

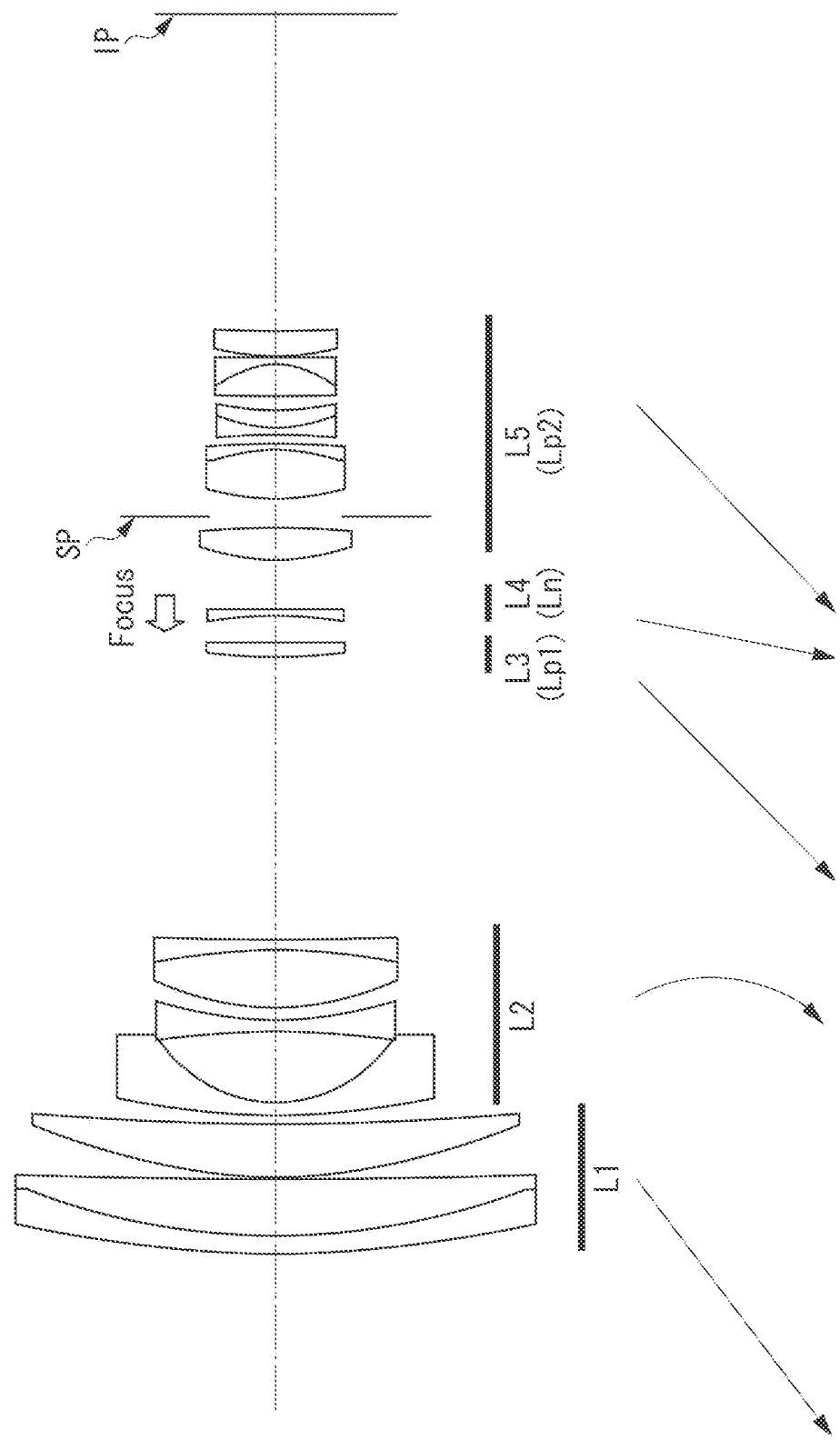

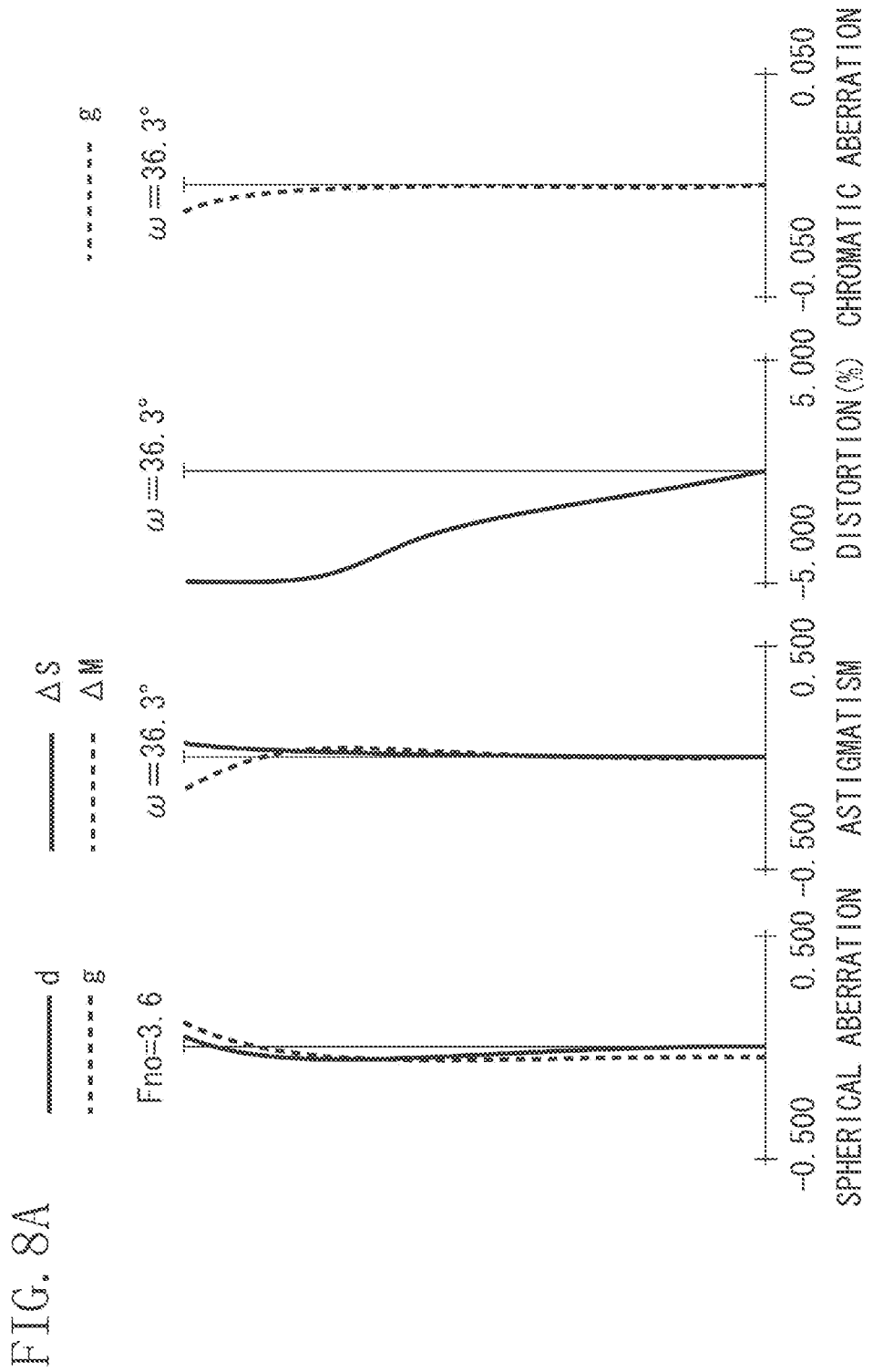

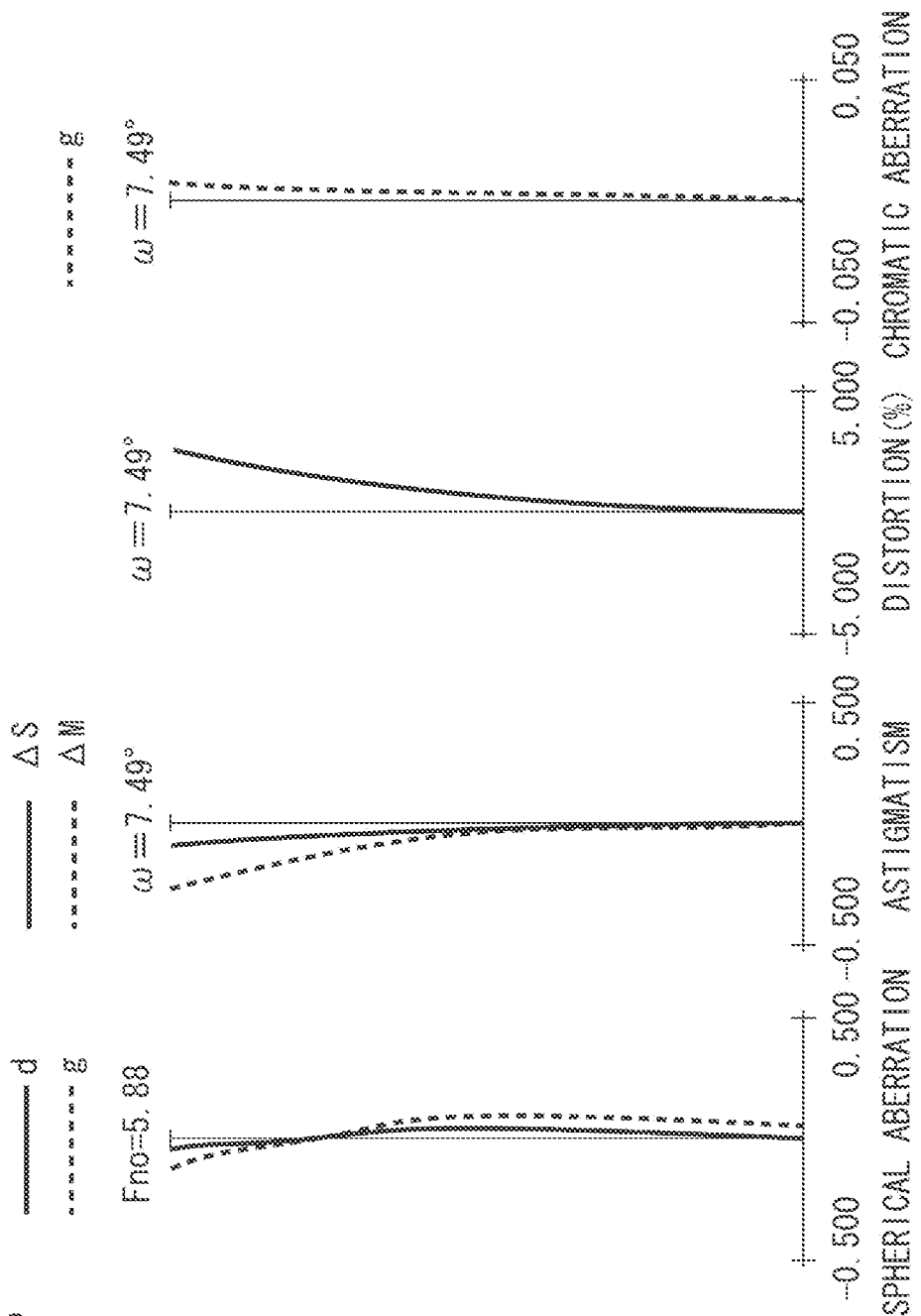

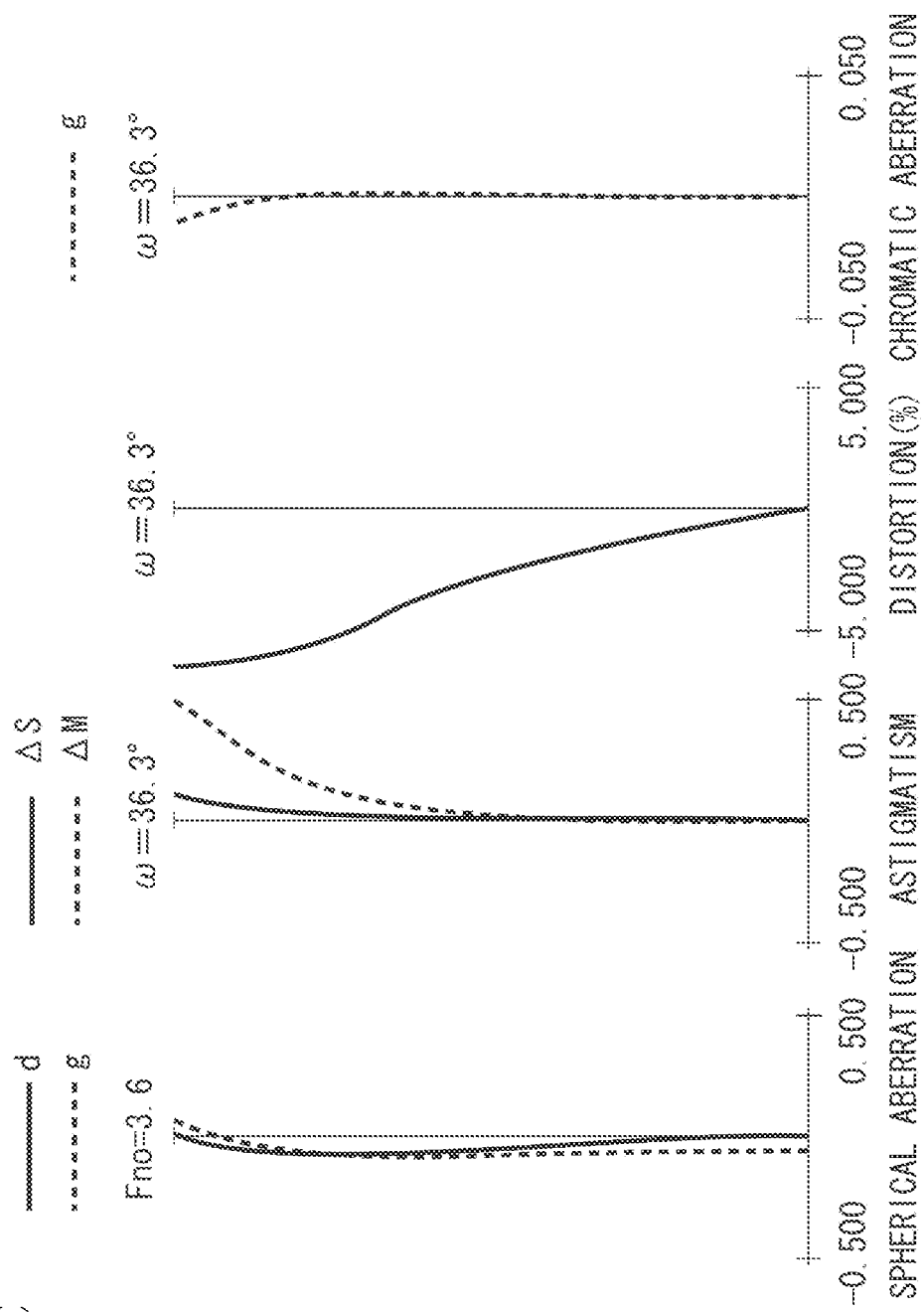

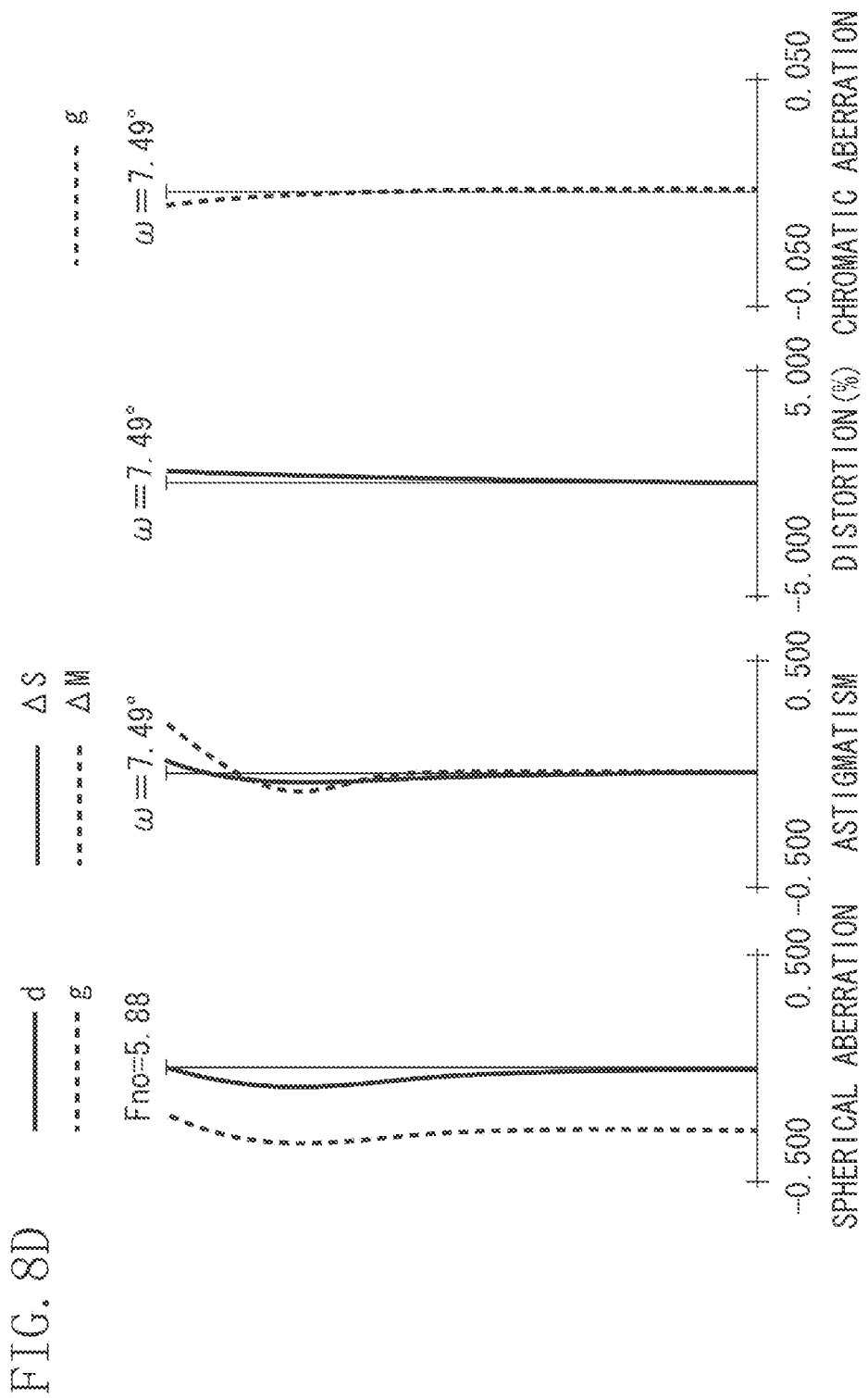

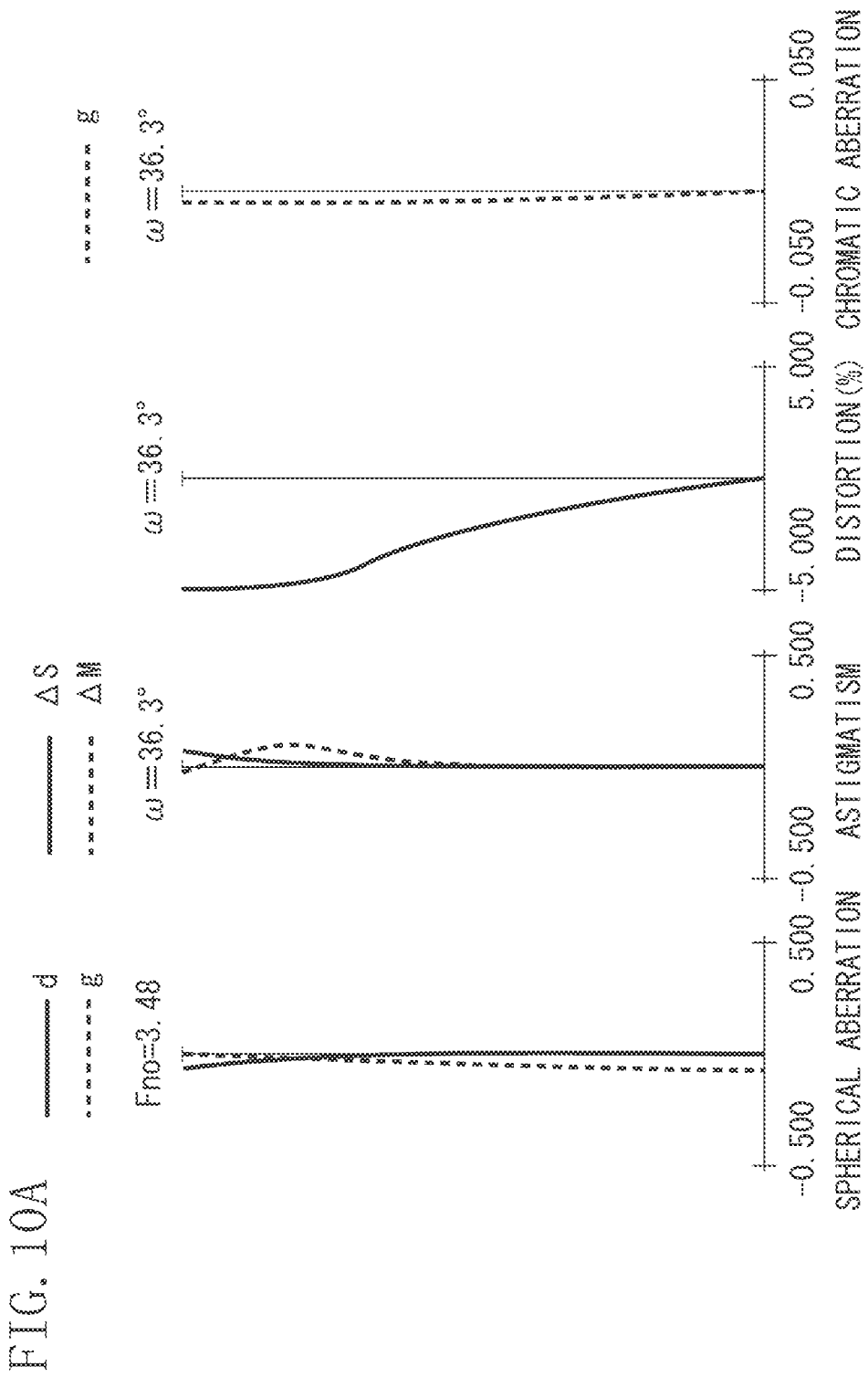

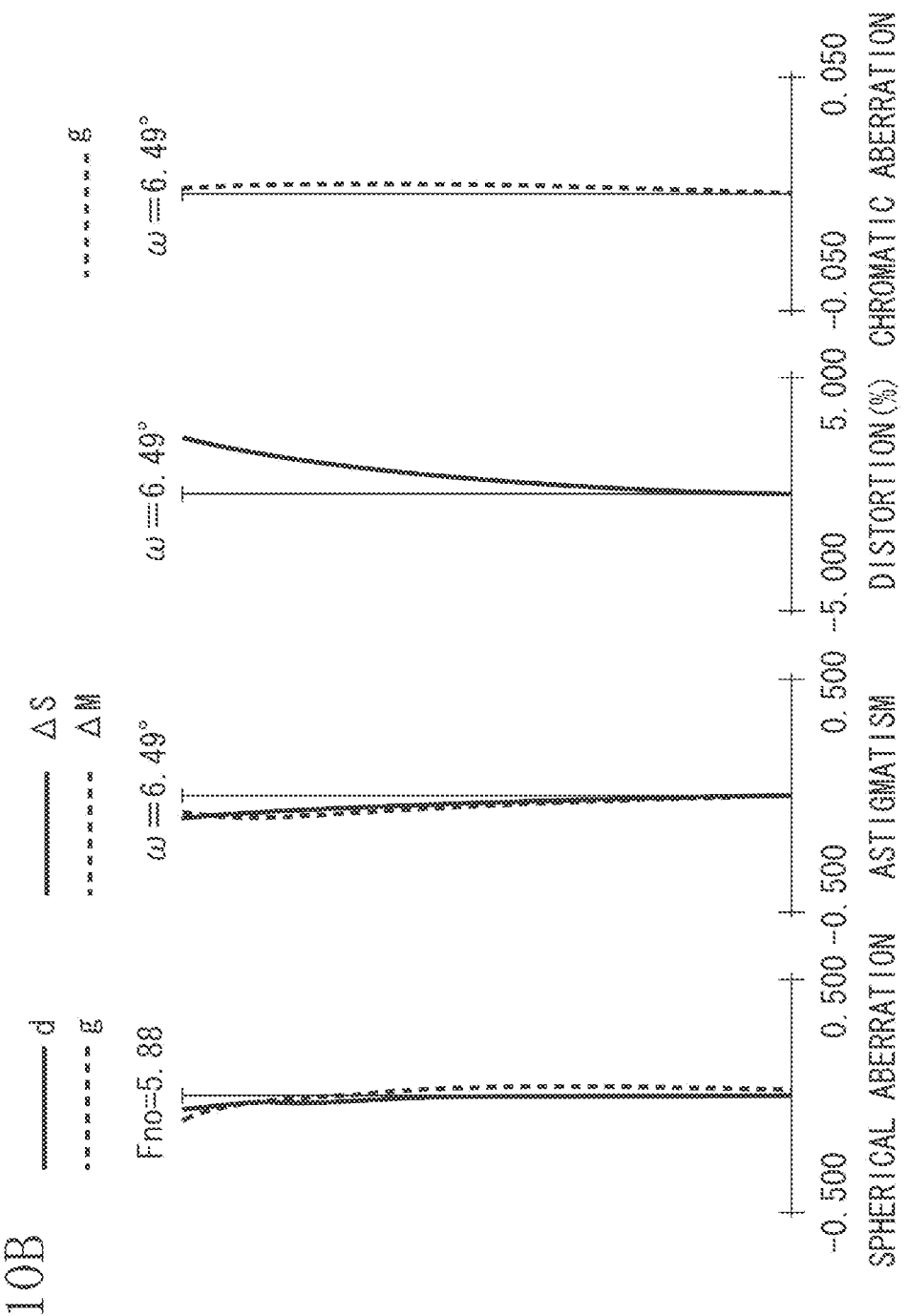

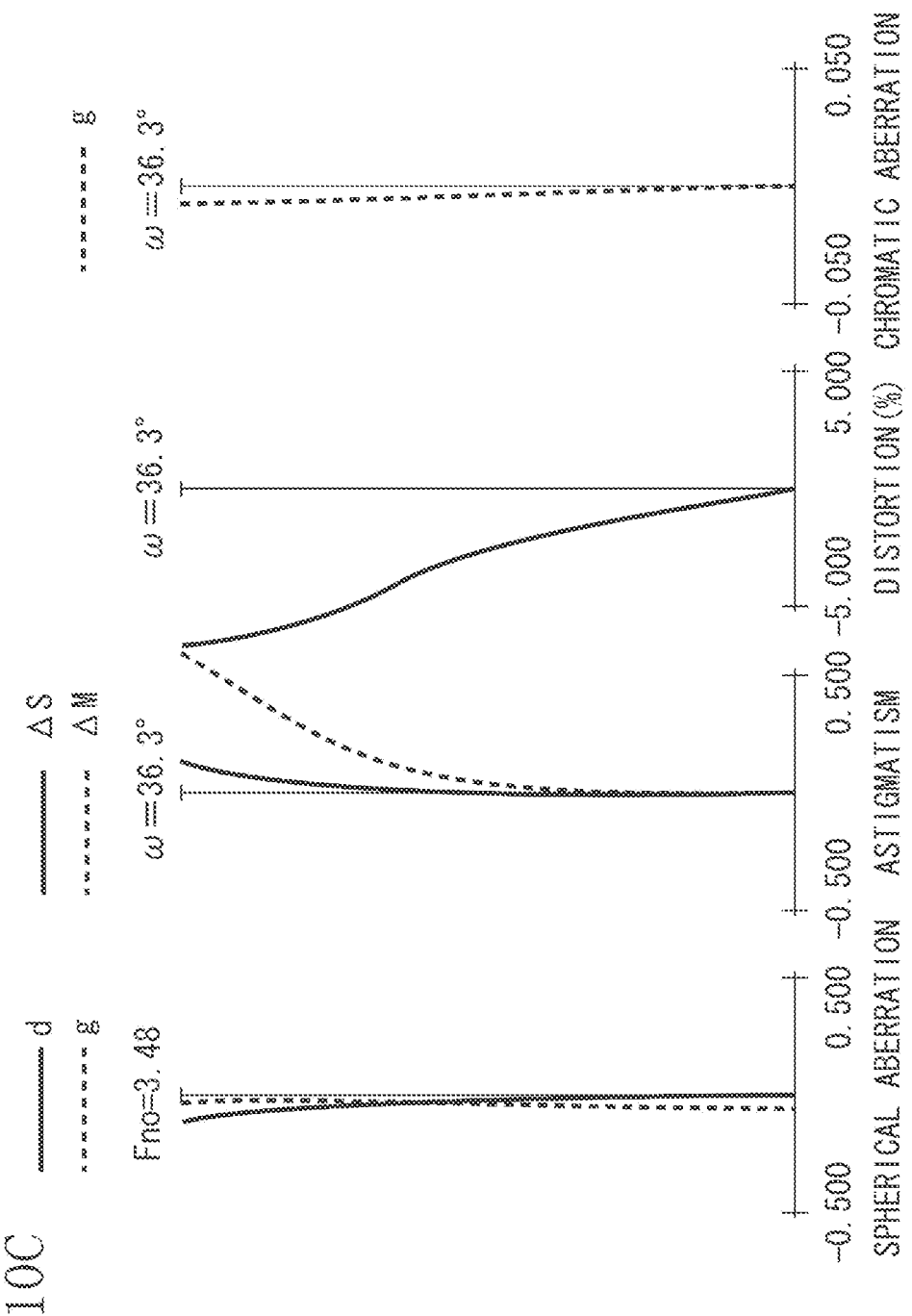

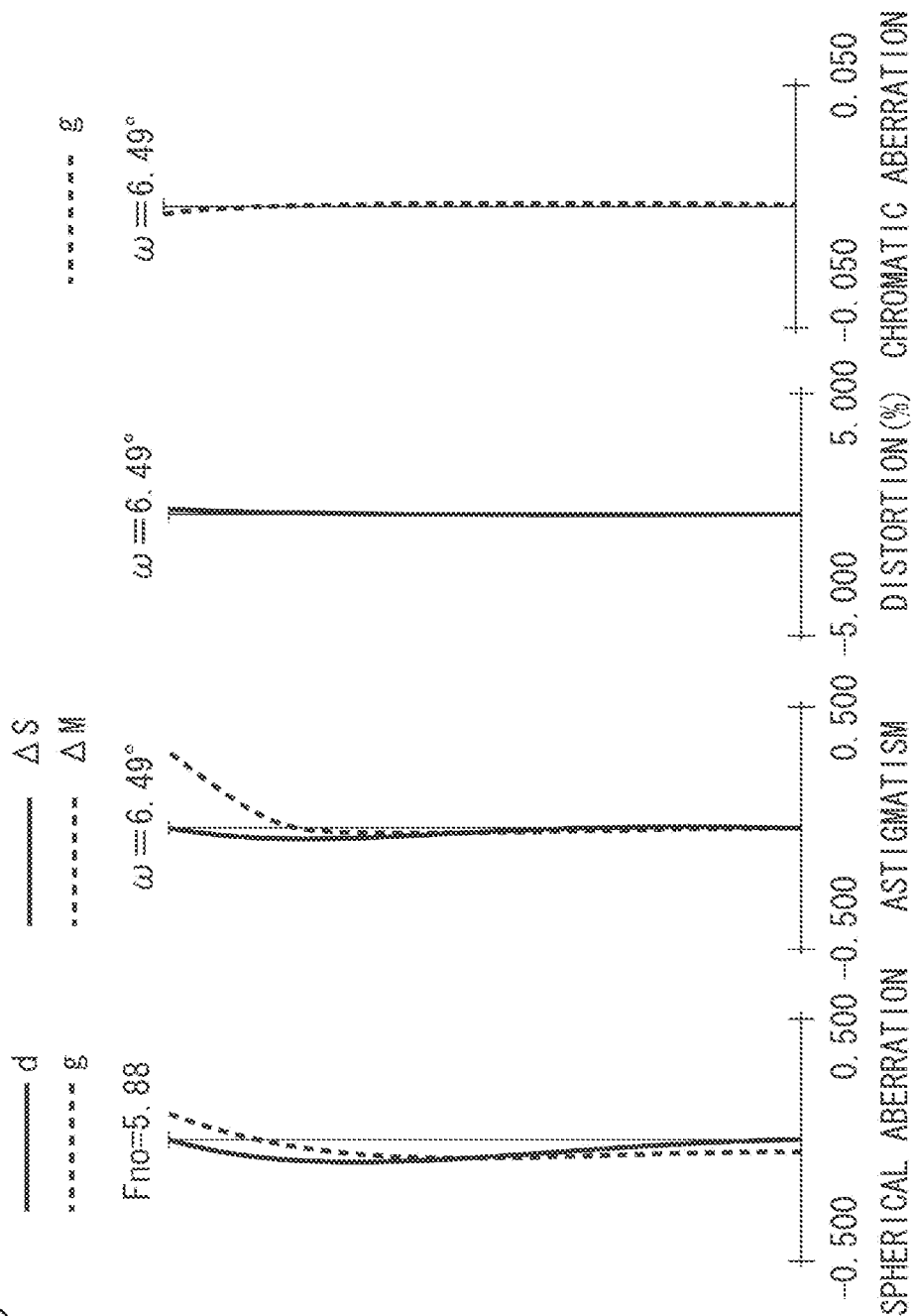

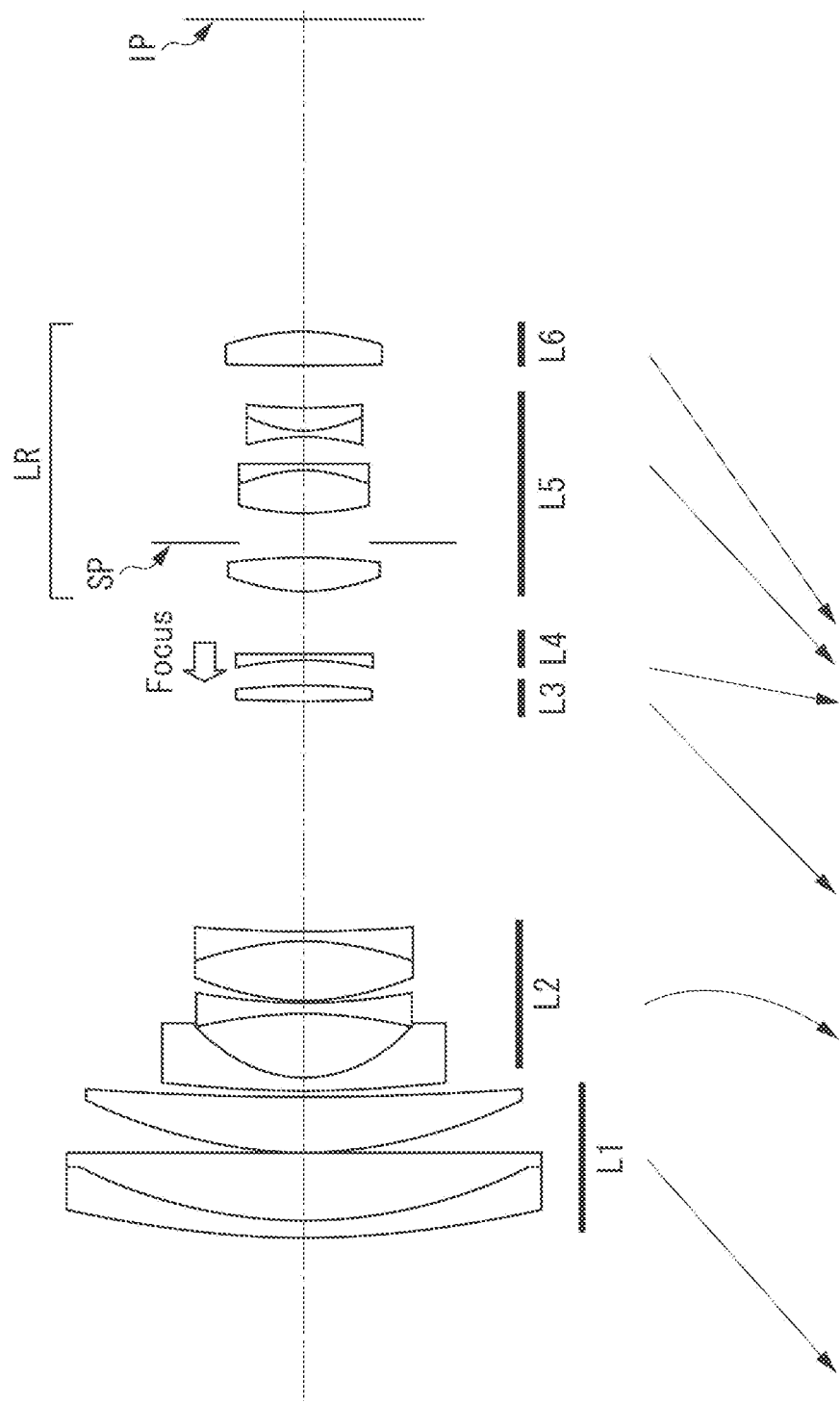

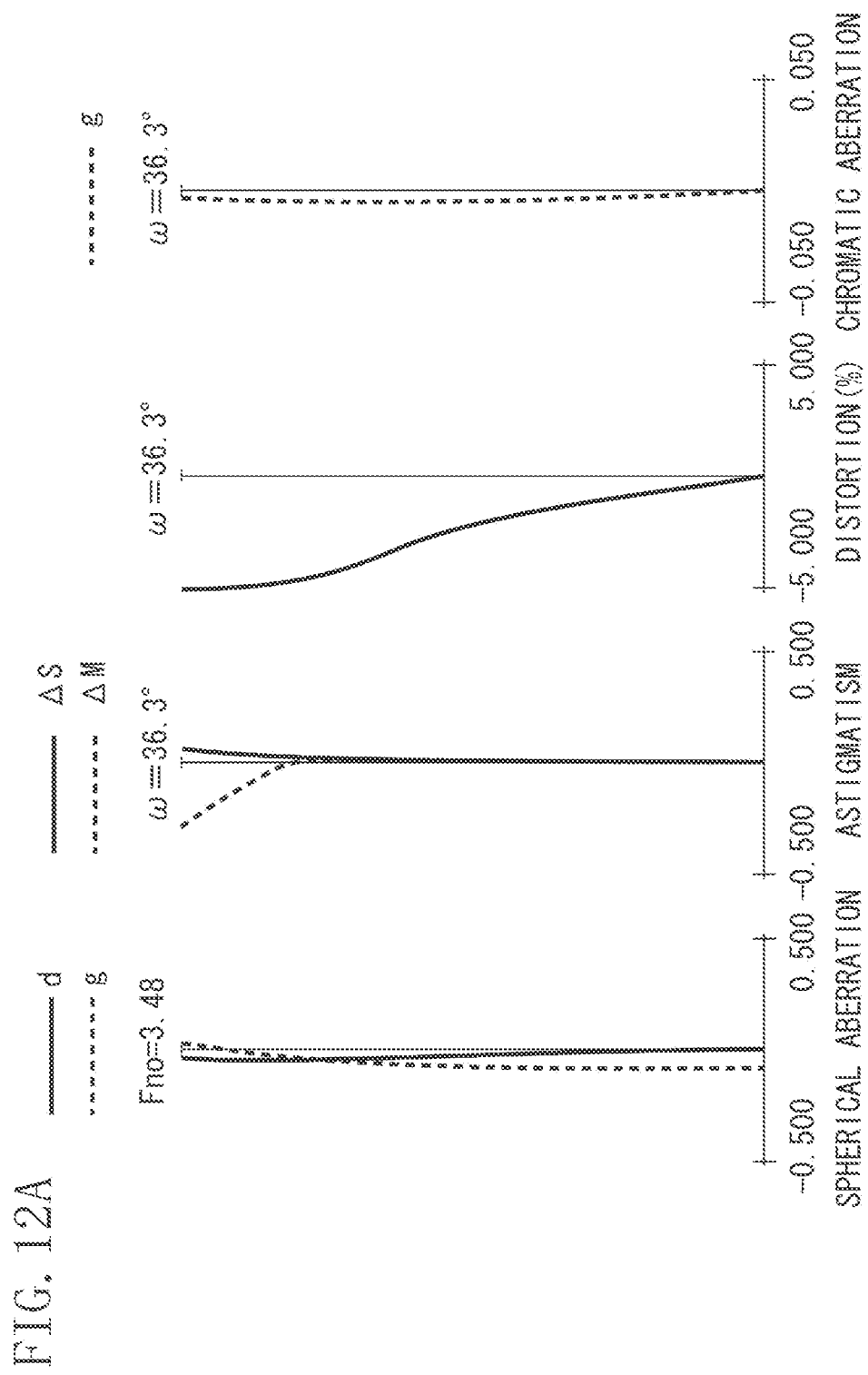

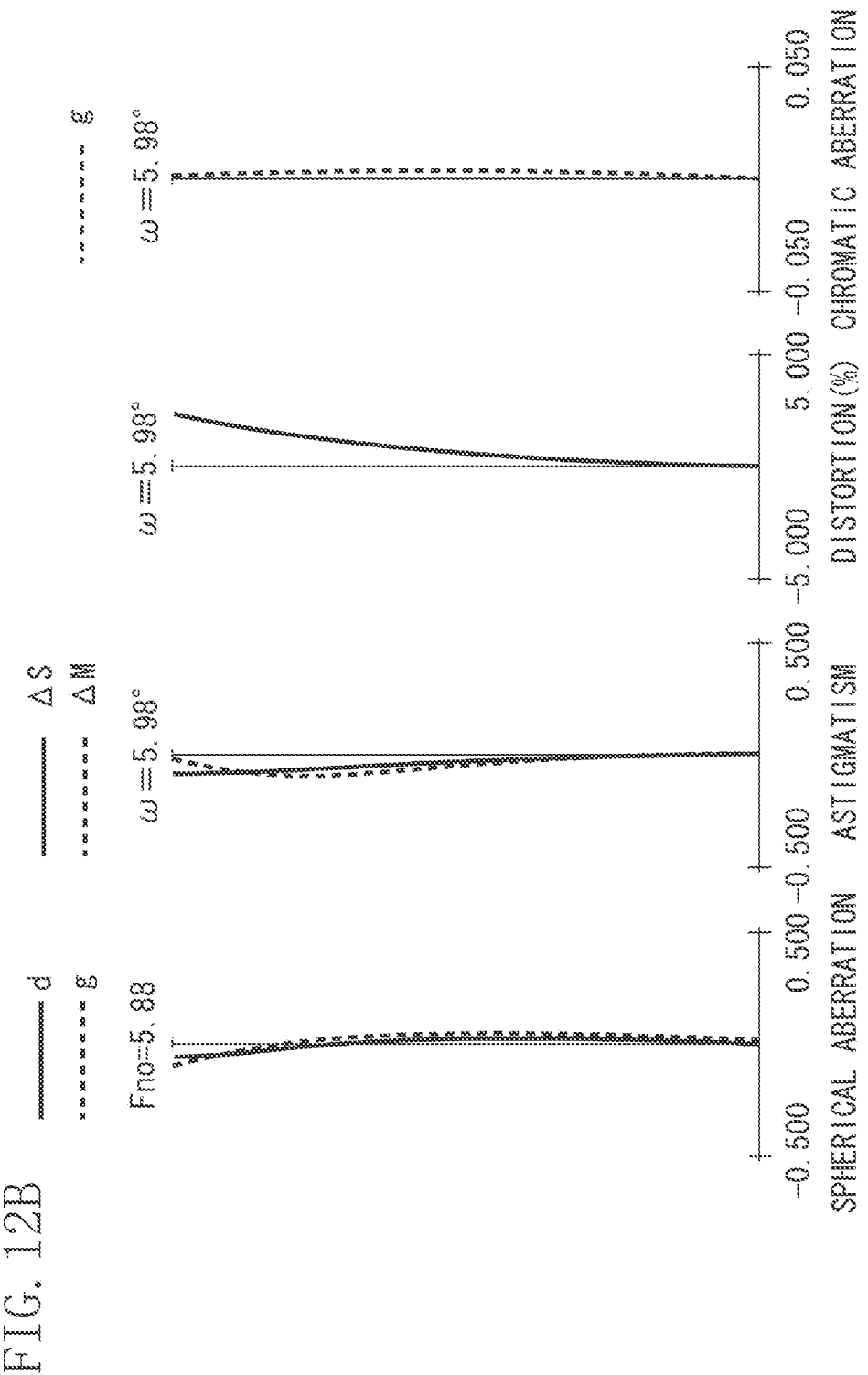

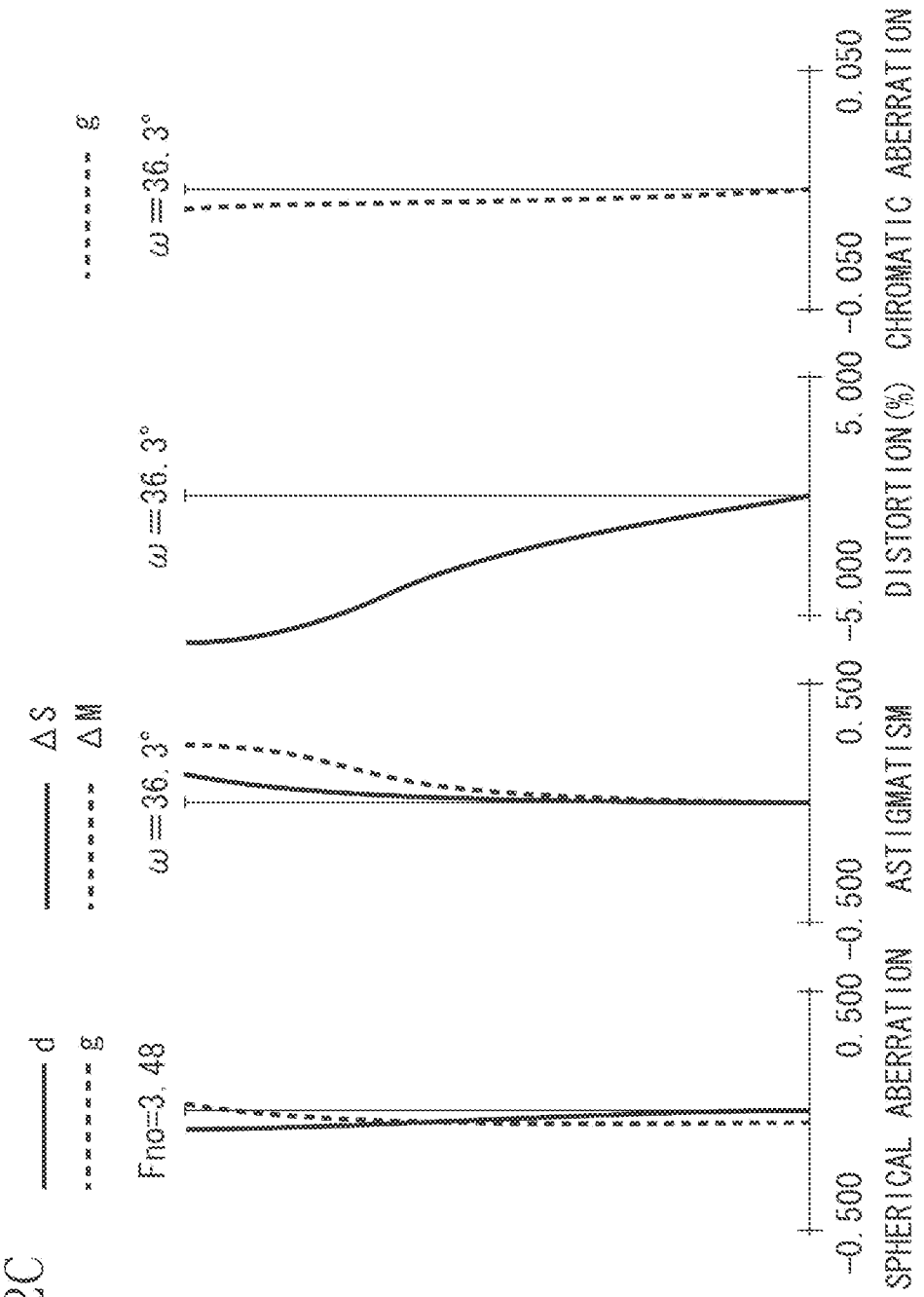

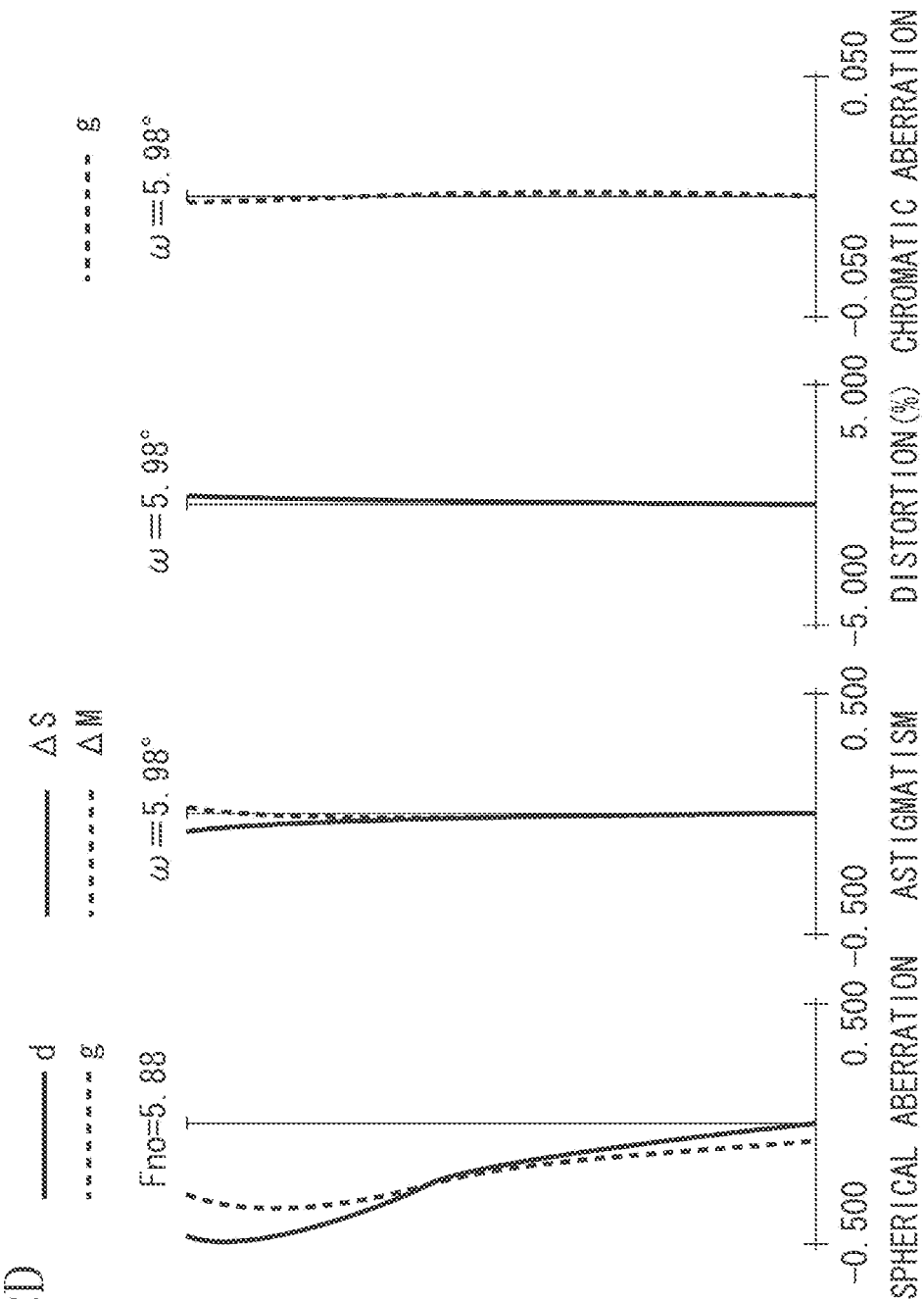

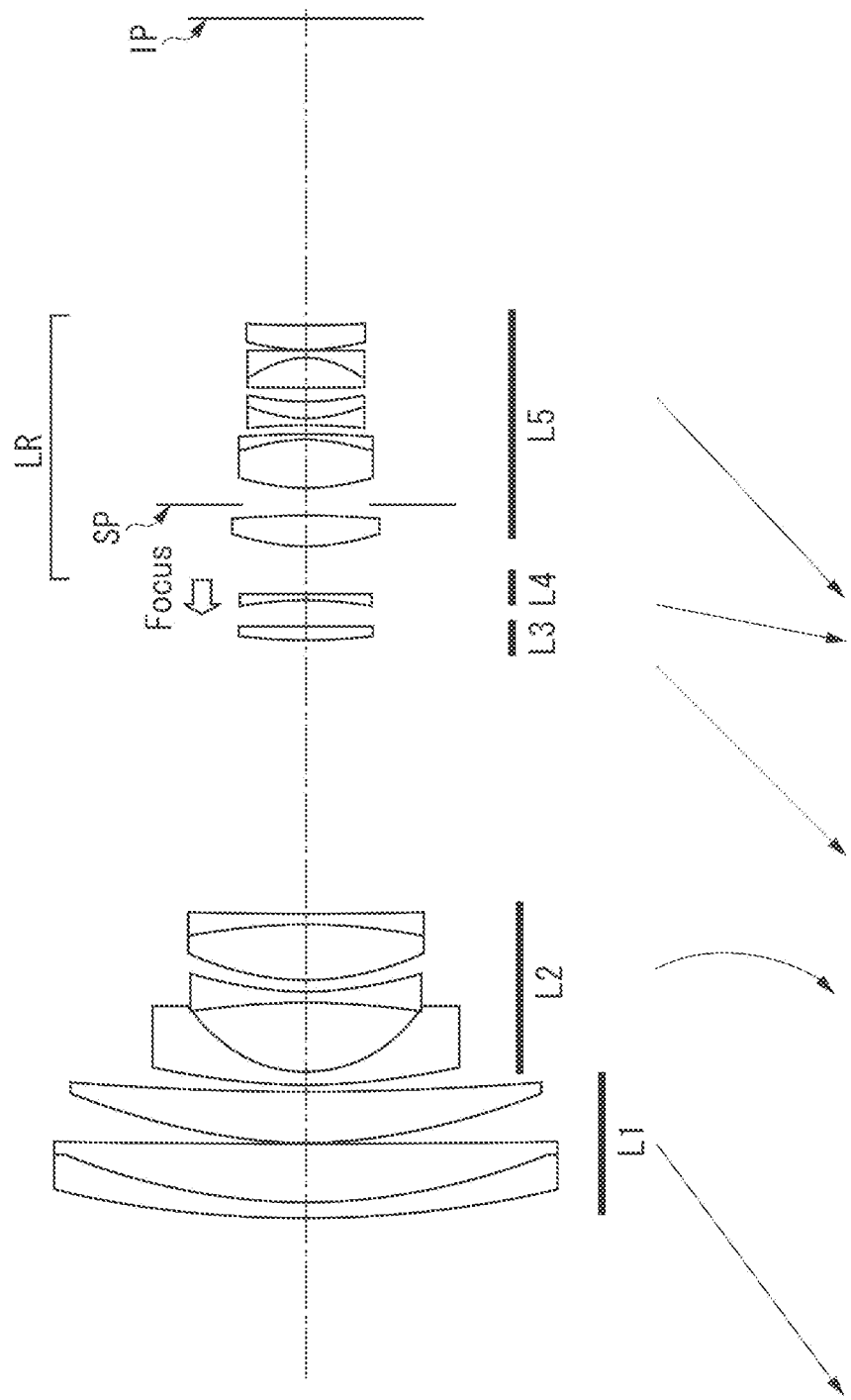

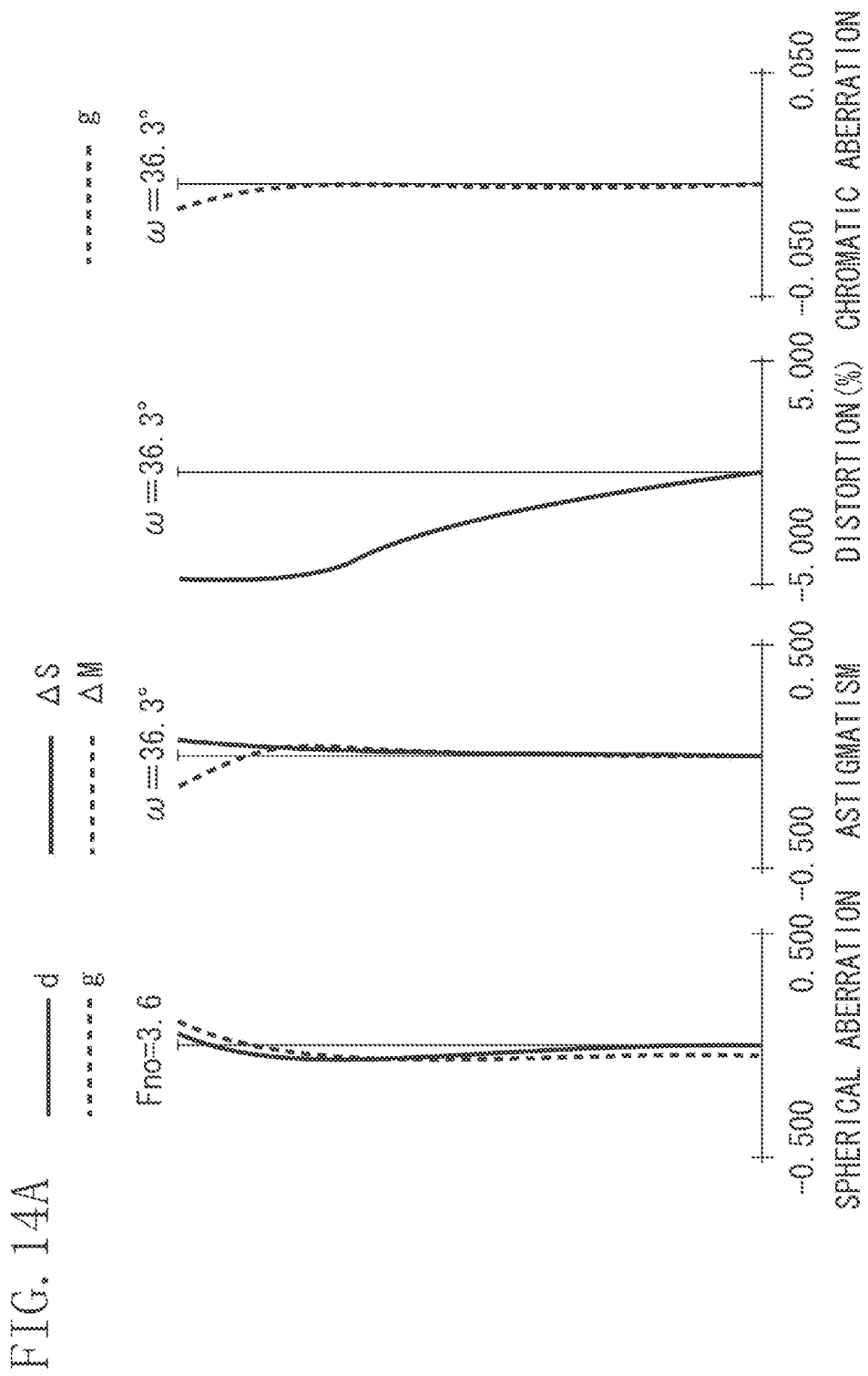

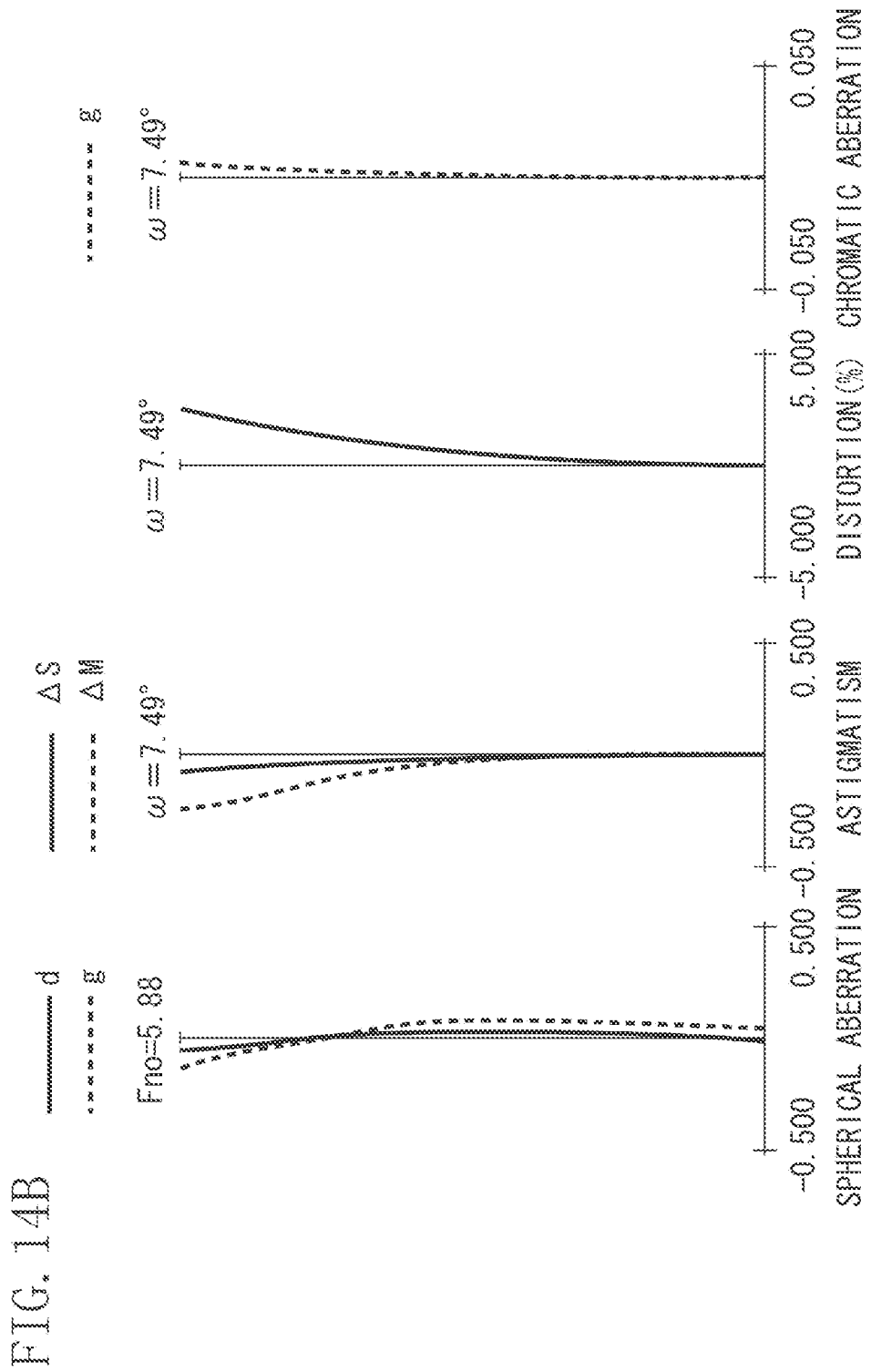

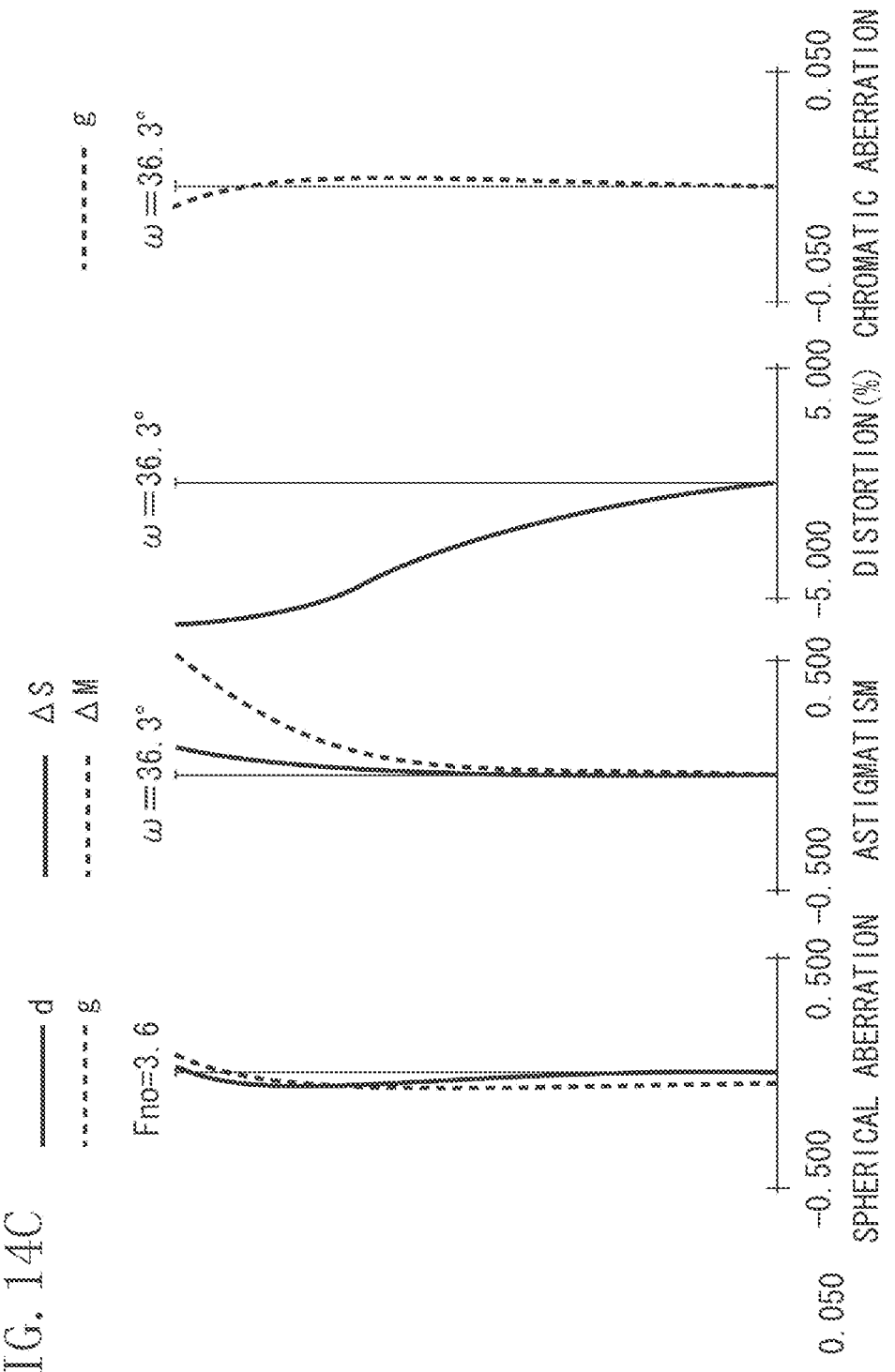

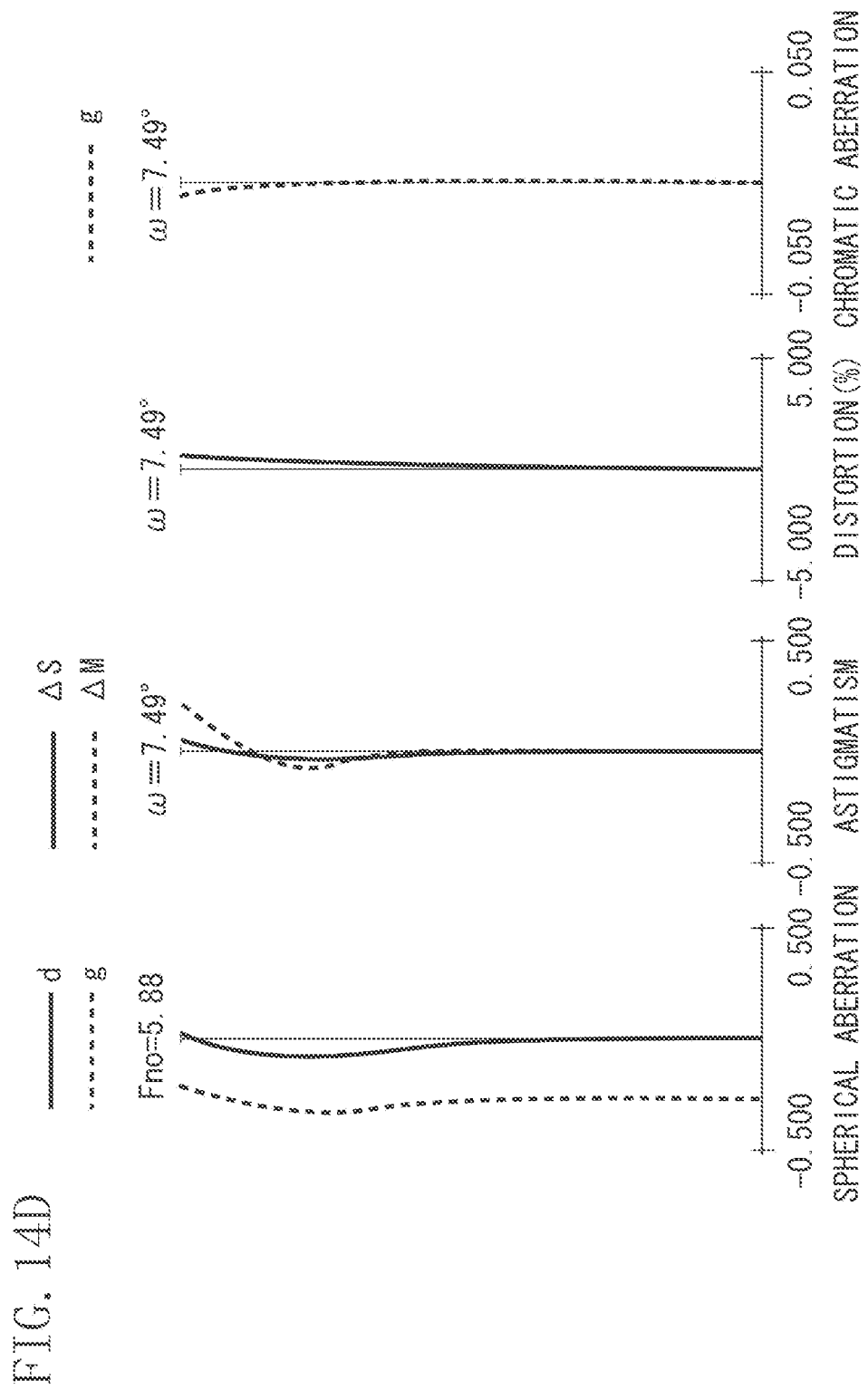

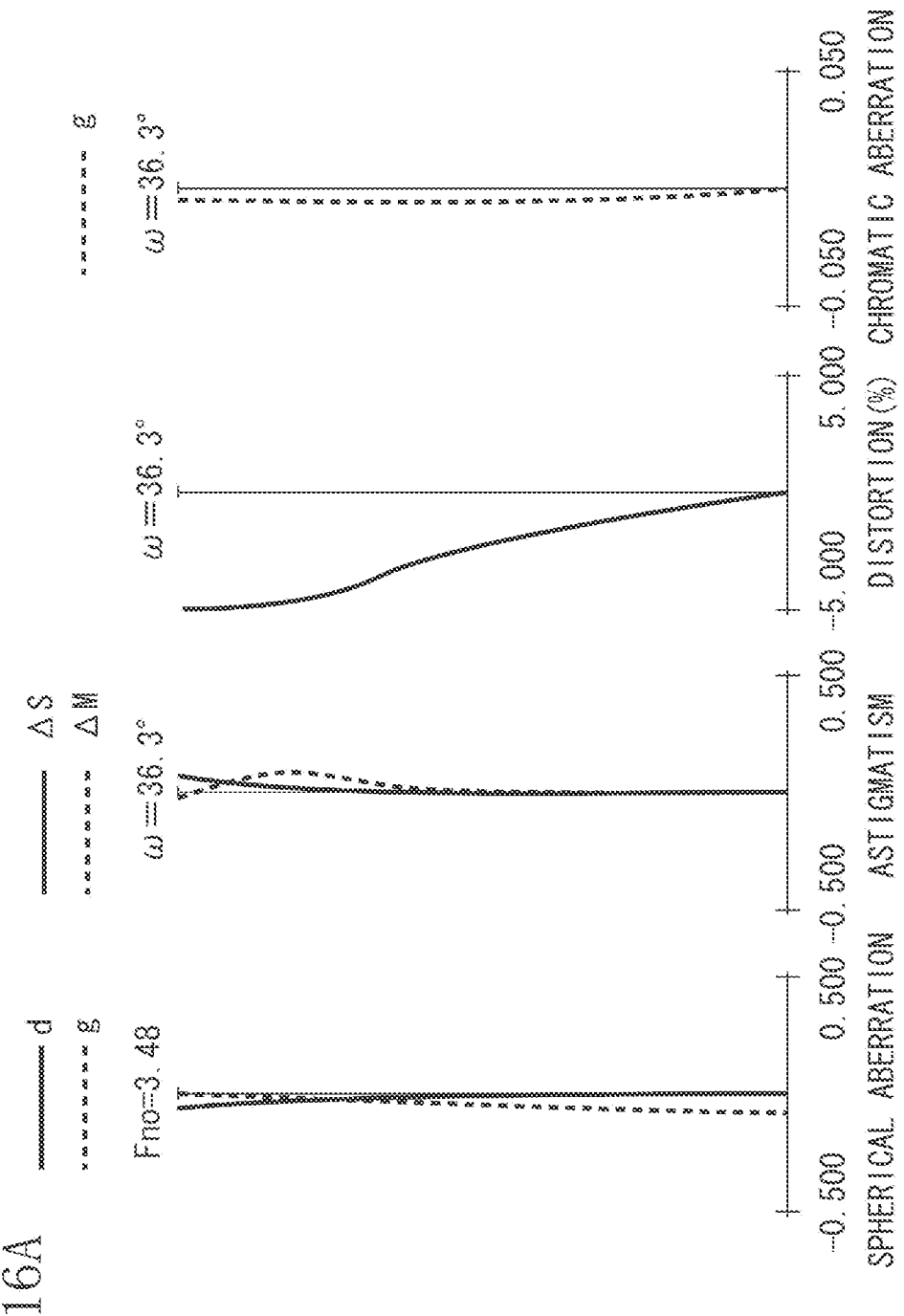

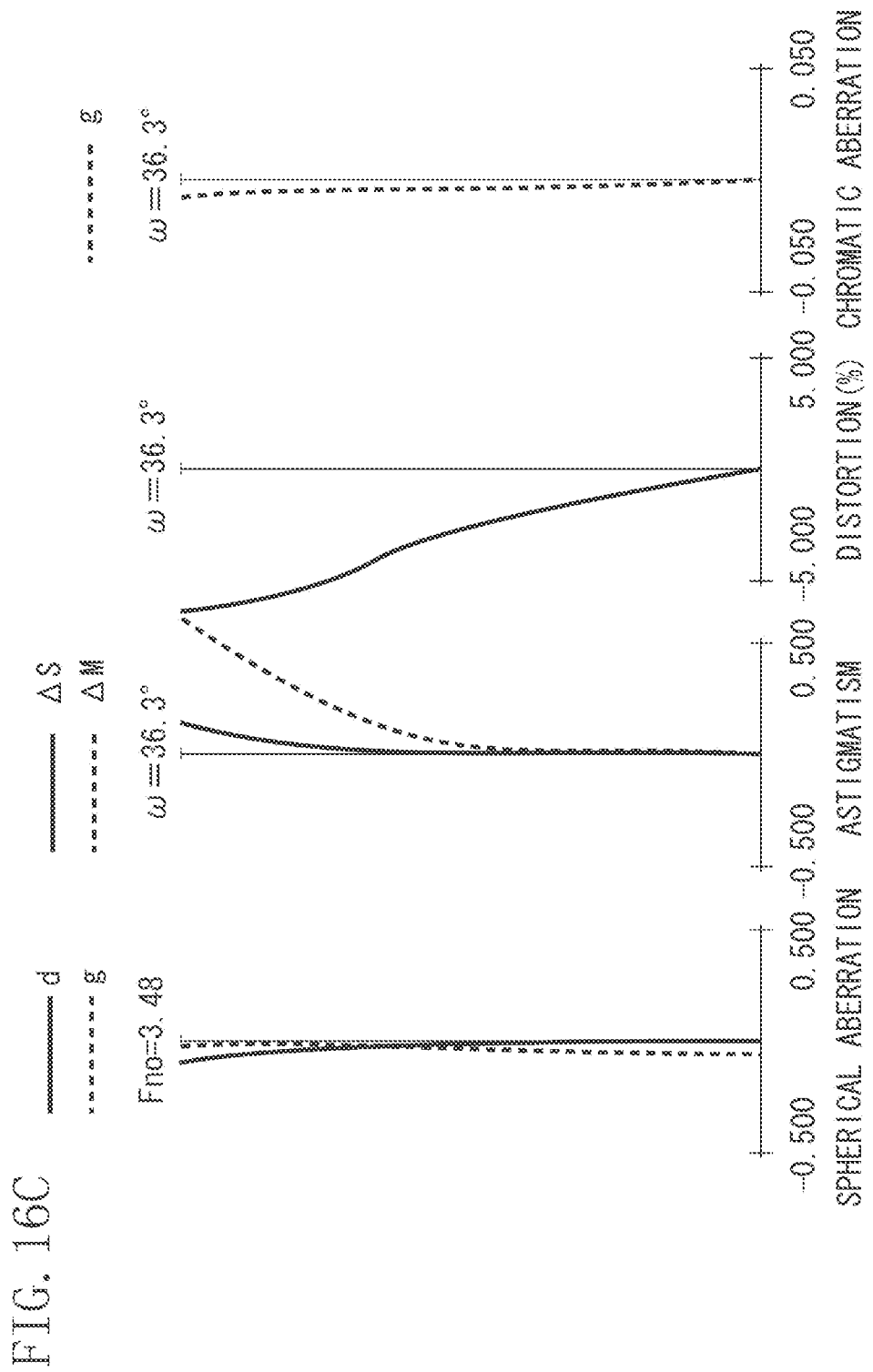

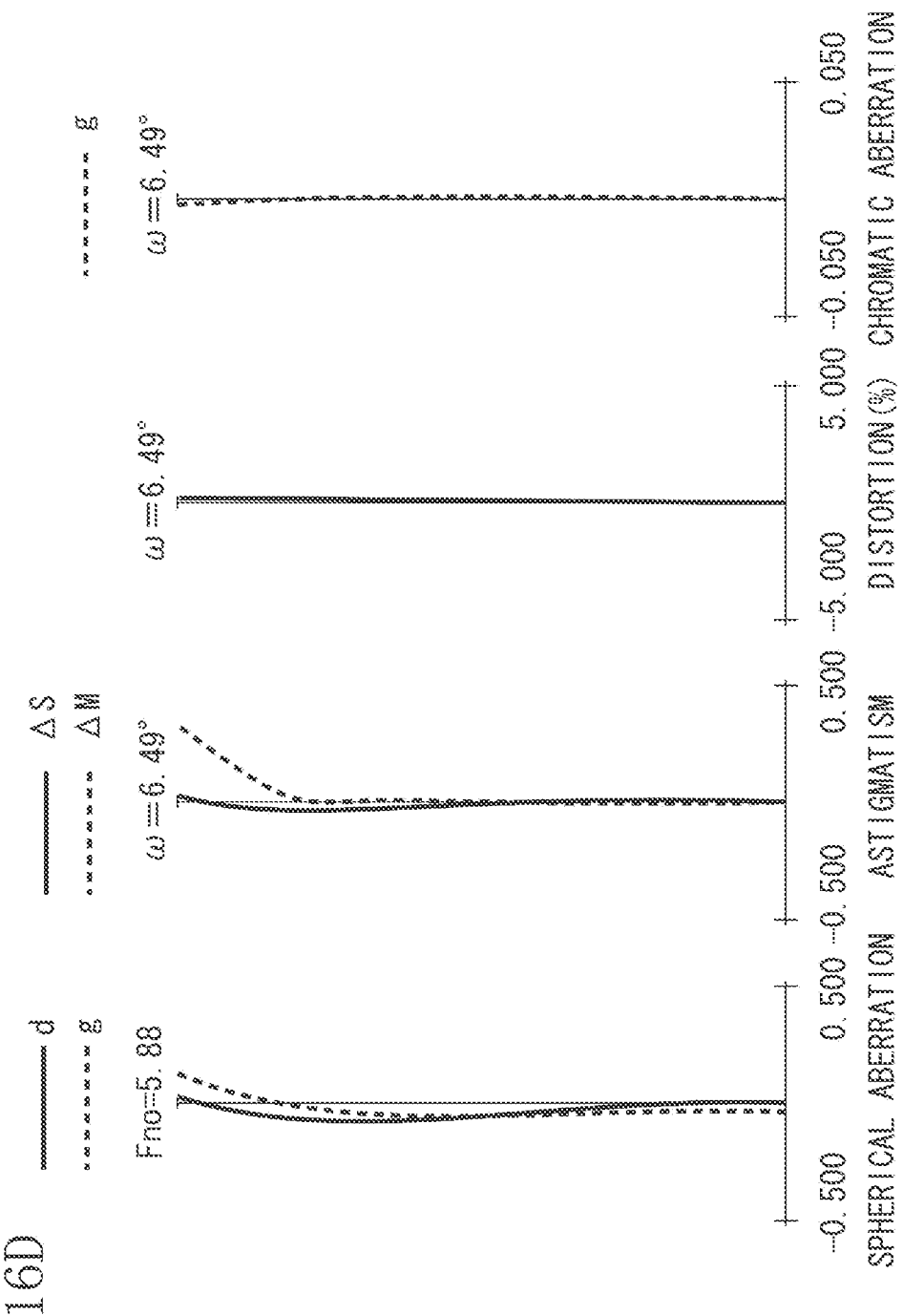

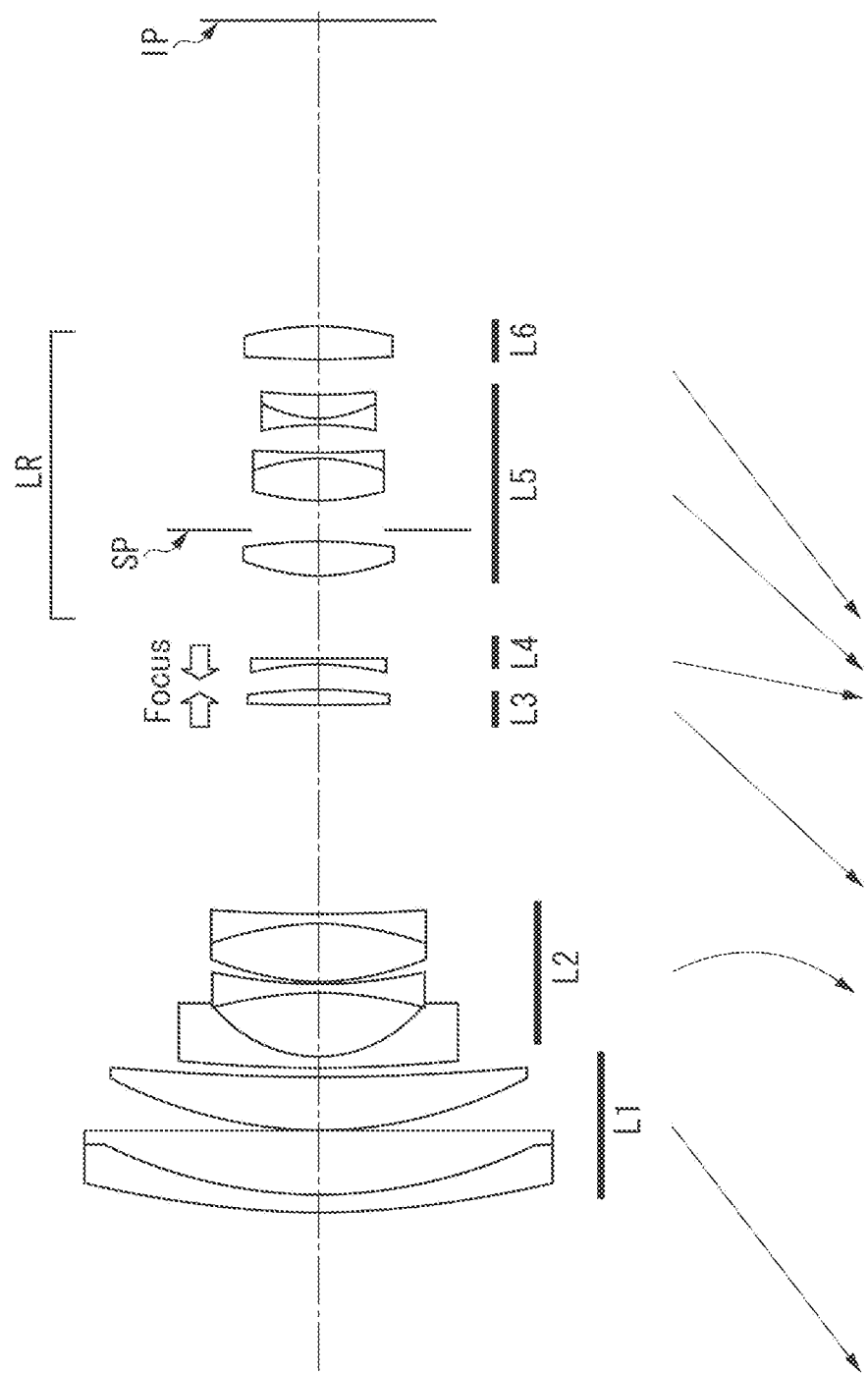

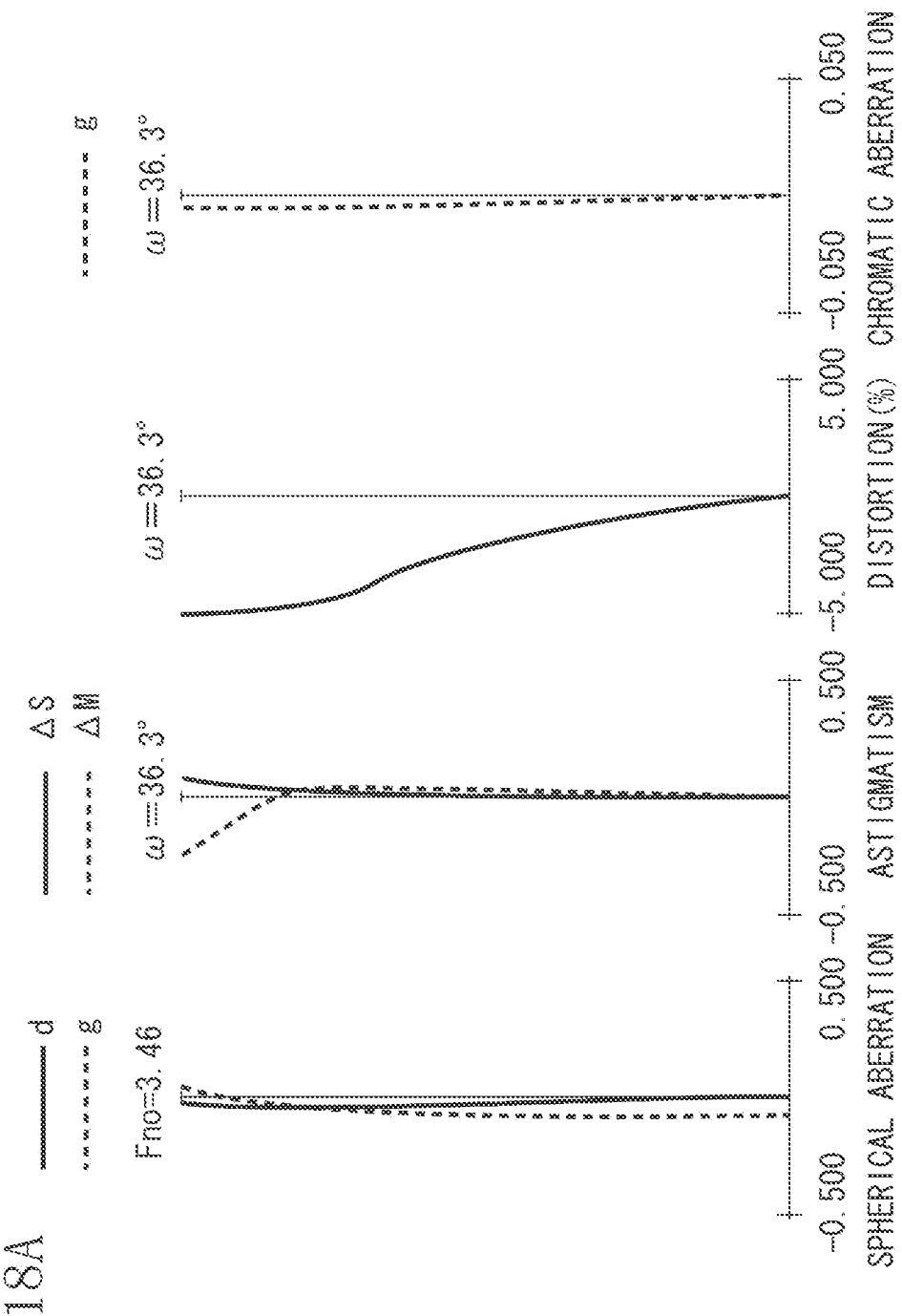

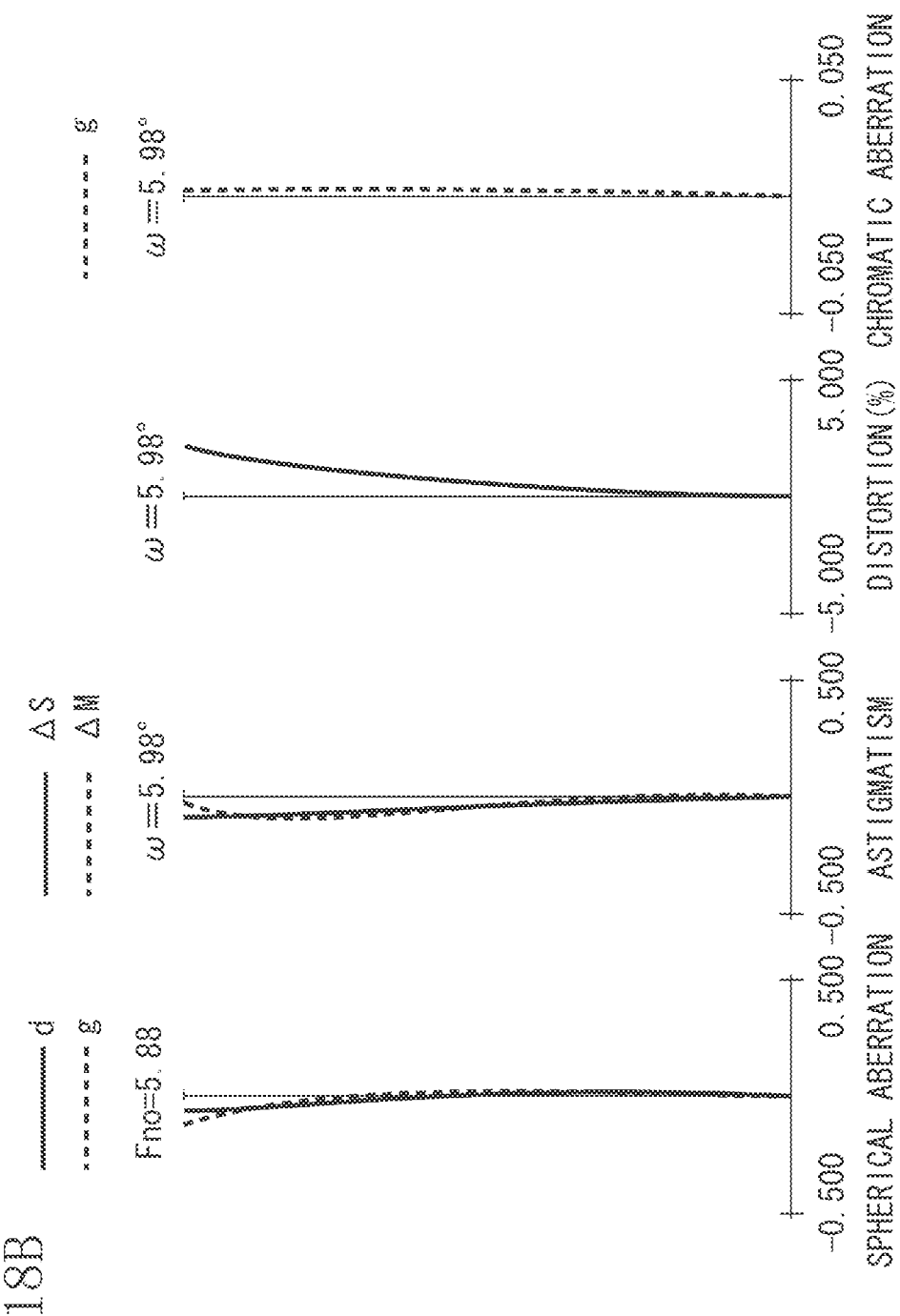

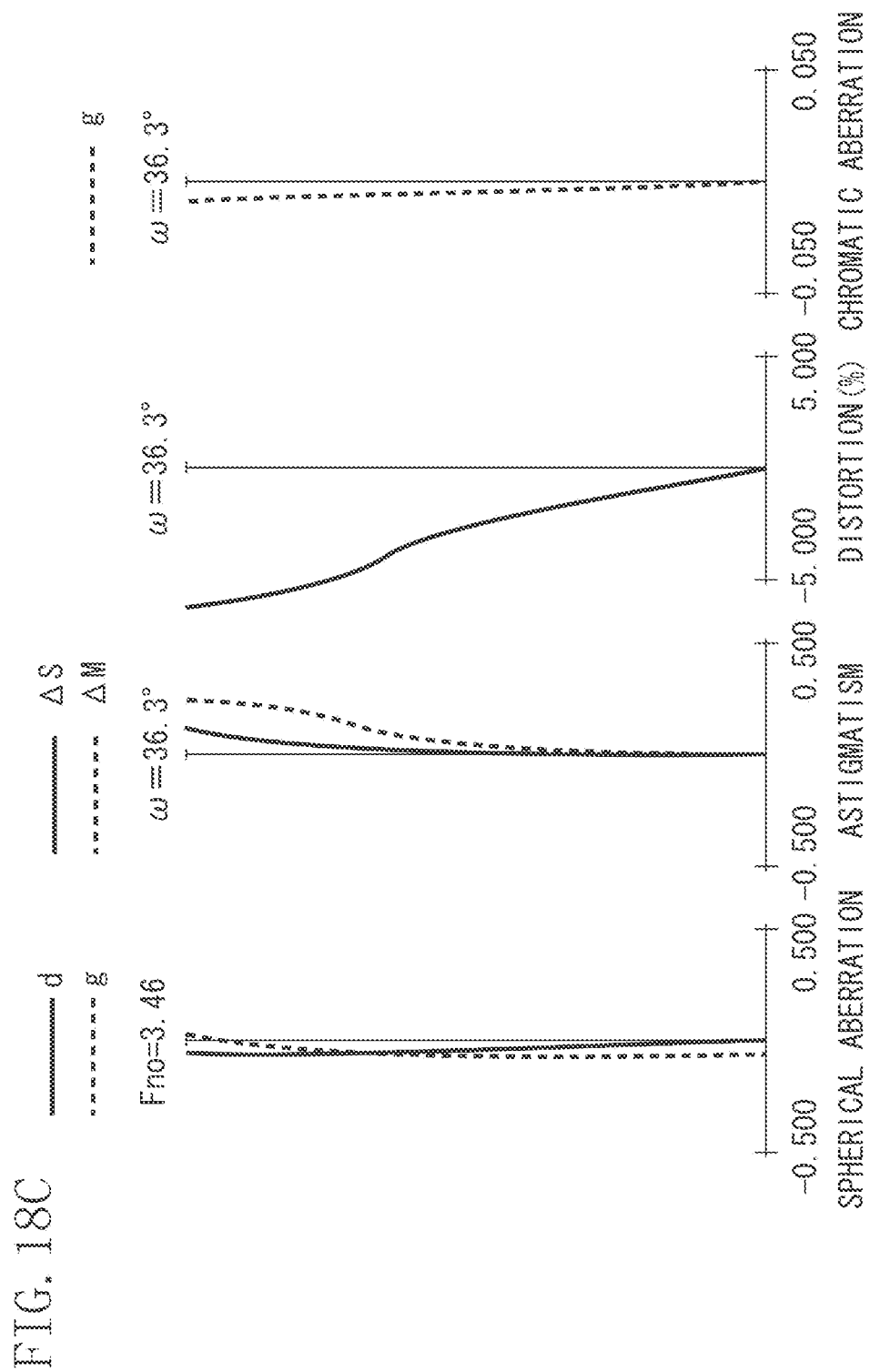

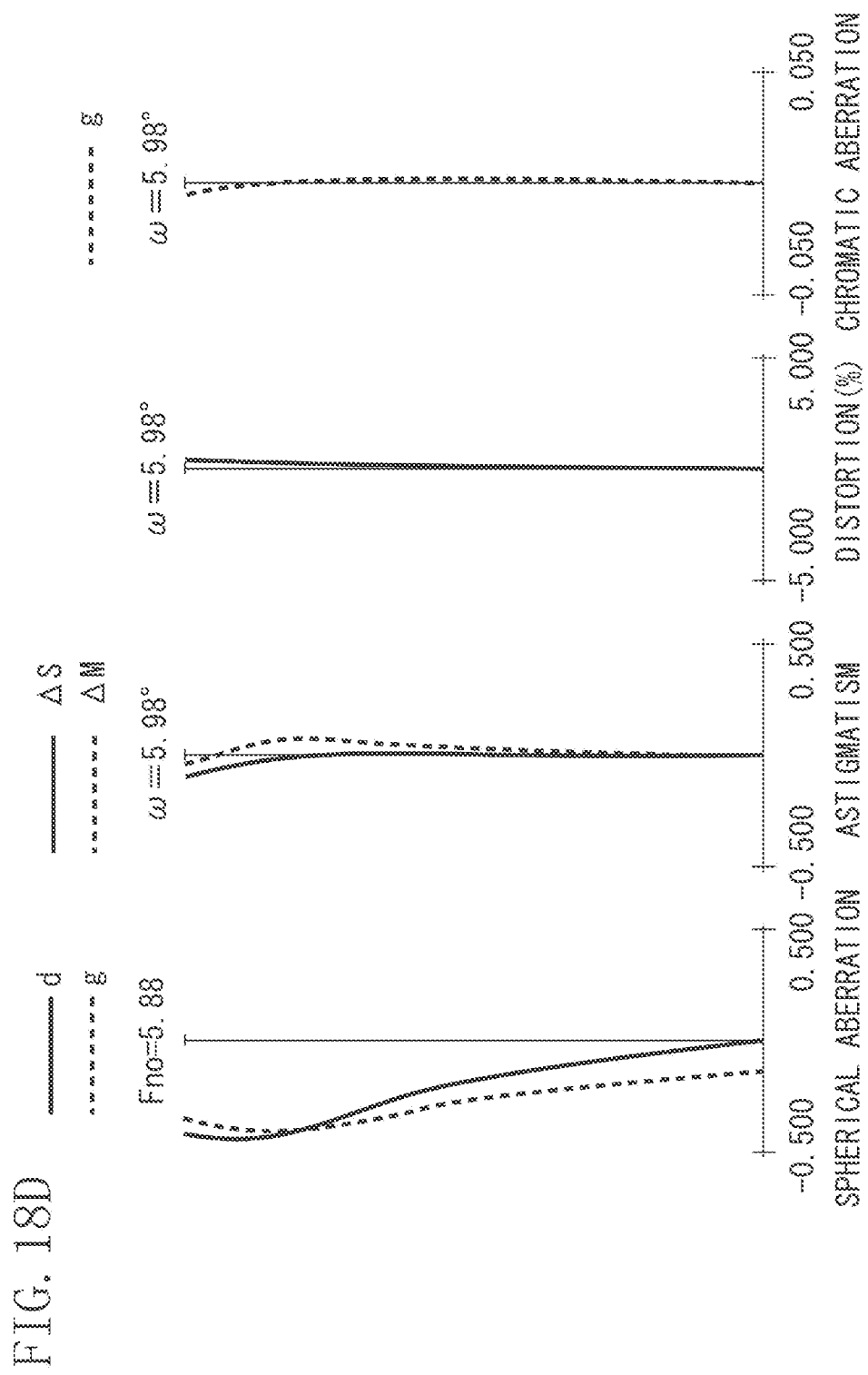

ZOOM LENS AND IMAGE PICKUP APPARATUS HAVING THE SAME

BACKGROUND OF THE INVENTION

1. Field of the Invention

The present invention relates to a zoom lens and an image pickup apparatus having the same. More particularly, the invention relates to a photographic optical system such as a single-lens reflex camera, a digital still camera, a digital video camera, a TV camera, and a monitoring camera, for example.

2. Description of the Related Art

An image pickup apparatus such as a single-lens reflex camera or a video camera is required to be capable of fast and high-precision automatic focusing. A rear-focus zoom lens is known as being capable of easily performing fast automatic focusing. The rear-focus zoom lens performs focusing by moving a small, lightweight lens unit other than a first lens unit at the object side.

A recent single-lens reflex camera has a moving image capturing function and is required to be capable of automatic focusing during moving image capturing. The high-frequency detection system (TV-AF system) is often used as an automatic focusing system to capture a moving image. The high-frequency detection system detects high-frequency components in an image capture signal to evaluate an in-focus state of the photographic optical system.

An image pickup apparatus using the TV-AF system wobbles or fast vibrates a focus lens unit in the optical axis direction to detect a direction of deviation from the in-focus state. After the wobbling, the image pickup apparatus detects signal components corresponding to a specific frequency band for an image region in an output signal from an image sensor to calculate an optimal position of the focus lens unit for the in-focus state. The image pickup apparatus then moves the focus lens unit to complete the focusing. The focus lens unit needs to be small and lightweight so that the focus lens unit can be wobbled. A known zoom lens includes lens units part of which is a small and lightweight lens unit for focusing.

As discussed in U.S. Pat. No. 7,184,221, a six-unit zoom lens includes first through sixth lens units having respective negative, positive, negative, positive, negative, and positive refractive powers. The small, lightweight fifth lens unit performs focusing.

As discussed in U.S. Patent Application Publication No. 2010/0091170, a zoom lens includes first through fifth lens units having respective positive, negative, negative, positive, and positive refractive powers. The third lens unit performs focusing.

As discussed in U.S. Patent Application Publication No. 2010/0091171, a zoom lens includes first through fifth lens units having respective positive, negative, positive, positive, and positive refractive powers. The third lens unit performs focusing.

As discussed in U.S. Pat. No. 6,556,356, a zoom lens includes first through fourth lens units having respective positive, negative, positive, and positive refractive powers. The second lens unit performs focusing.

As discussed in Japanese Patent Application Laid-Open No. 2001-033697, a zoom lens includes first through fifth lens units having respective positive, negative, positive, negative, and positive refractive powers. The fourth lens unit performs focusing.

The focus lens unit can use a small, lightweight lens unit having a small number of lenses to improve the automatic focus speed. Further, the focus lens unit can use a lens unit having high refractive power to reduce the amount of movement during focusing. If the focus lens unit includes a small number of lenses, however, increasing the refractive power for the focus lens unit generally increases residual aberration for the focus lens unit and increases an aberration variation due to focusing. Accordingly, the power for the focus lens unit cannot be fully increased.

By contrast, decreasing the power for the focus lens unit increases the amount of movement of the focus lens unit during focusing. As a result, the space for the focus lens unit to move increases to unsuccessfully ensure a sufficient space for a zooming lens unit to move. Miniaturizing the entire zoom lens is difficult while high optical performance is maintained.

Generally, a zoom lens needs to enable fast focusing and minimize an aberration variation during focusing. It is important to appropriately configure the zoom type, the focus lens unit, and lens units preceding and subsequent to the same to ensure high optical performance over an entire object distance.

SUMMARY OF THE INVENTION

The present invention is directed to a zoom lens capable of fast focusing and an image pickup apparatus having the same.

According to an aspect of the present invention, a zoom lens includes a lens unit Ln having negative refractive power, a lens unit Lp1 having positive refractive power, and a lens unit Lp2 having positive refractive power. The lens unit Ln includes two or less lenses and moves during focusing and zooming. The lens unit Lp1 is disposed adjacent to an object side of the lens unit Ln. The lens unit Lp2 is disposed adjacent to an image side of the lens unit Ln. The lens unit Lp1 and the lens unit Lp2 move during zooming. The zoom lens satisfies the following conditions:

$$0.2 < (Dnw - bfw)/(Tlw - bfw) < 0.8$$

$$0.3 < -Mnz/Mfnt < 1.0$$

where Tlw denotes a distance between a lens surface of the entire zoom lens nearest to the object side and an image plane at a wide-angle end, Dnw denotes a distance between a lens surface of the lens unit Ln nearest to the image side and the image plane at the wide-angle end, bfw denotes a back focus at the wide-angle end, Mfnt denotes a maximum amount of focusing movement of the lens unit Ln at a telephoto end by assuming movement from the object side to the image side to be positive, and Mnz denotes an amount of change in distance between the lens unit Ln and the lens unit Lp1 during zooming from the wide-angle end to the telephoto end by assuming an increase in the distance to be positive.

According to another aspect of the present invention, a zoom lens includes, in order from an object side to an image side, a first lens unit having positive refractive power, a second lens unit having negative refractive power, a third lens unit having positive refractive power, a fourth lens unit having negative refractive power, and a rear group that includes one or more lens units and has positive refractive power as a whole. The lens units move during zooming and the fourth lens unit moves during focusing. The zoom lens satisfies the following condition:

$$|ft/f_{123}t| < 0.6$$

where ft denotes a focal length of the entire zoom lens at a telephoto end and $f_{123}t$ denotes a composite focal length ranging from the first lens unit to the third lens unit at the telephoto end.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a sectional view of a zoom lens according to a first exemplary embodiment of the invention at a wide-angle end.

FIGS. 2A, 2B, 2C, and 2D are aberration diagrams of the zoom lens according to the first exemplary embodiment at a wide-angle end and a telephoto end during focusing on an infinitely distant object and an object distance of 420 mm.

FIG. 3 is a sectional view of a zoom lens according to a second exemplary embodiment of the invention at a wide-angle end.

FIGS. 4A, 4B, 4C, and 4D are aberration diagrams of the zoom lens according to the second exemplary embodiment at a wide-angle end and a telephoto end during focusing on an infinitely distant object and an object distance of 300 mm.

FIGS. 6A, 6B, 6C, and 6D are aberration diagrams of the zoom lens according to the third exemplary embodiment at a wide-angle end and a telephoto end during focusing on an infinitely distant object and an object distance of 390 mm.

FIG. 7 is a sectional view of a zoom lens according to a fourth exemplary embodiment of the invention at a wide-angle end.

FIGS. 8A, 8B, 8C, and 8D are aberration diagrams of the zoom lens according to the fourth exemplary embodiment at a wide-angle end and a telephoto end during focusing on an infinitely distant object and an object distance of 420 mm.

FIGS. 10A, 10B, 10C, and 10D are aberration diagrams of the zoom lens according to the fifth exemplary embodiment at a wide-angle end and a telephoto end during focusing on an infinitely distant object and an object distance of 420 mm.

FIG. 11 is a sectional view of a zoom lens according to a sixth exemplary embodiment of the invention at a wide-angle end.

FIGS. 12A, 12B, 12C, and 12D are aberration diagrams of the zoom lens according to the sixth exemplary embodiment at a wide-angle end and a telephoto end during focusing on an infinitely distant object and a closest object.

FIG. 13 is a sectional view of a zoom lens according to a seventh exemplary embodiment of the invention at a wide-angle end.

FIGS. 14A, 14B, 14C, and 14D are aberration diagrams of the zoom lens according to the seventh exemplary embodiment at a wide-angle end and a telephoto end during focusing on an infinitely distant object and a closest object.

FIGS. 16A, 16B, 16C, and 16D are aberration diagrams of the zoom lens according to the eighth exemplary embodiment at a wide-angle end and a telephoto end during focusing on an infinitely distant object and a closest object.

FIG. 17 is a sectional view of a zoom lens according to a ninth exemplary embodiment of the invention at a wide-angle end.

FIGS. 18A, 18B, 18C, and 18D are aberration diagrams of the zoom lens according to the ninth exemplary embodiment at a wide-angle end and a telephoto end during focusing on an infinitely distant object and a closest object.

DESCRIPTION OF THE EMBODIMENTS

Various exemplary embodiments, features, and aspects of the invention will be described in detail below with reference to the drawings.

A zoom lens according to an exemplary embodiment of the invention includes a lens unit Ln that has negative refractive power, contains two or less lenses, and moves during focusing and zooming. The zoom lens further includes lens units Lp1 and Lp2. The lens unit Lp1 has positive refractive power and is disposed adjacent to the object side of the lens unit Ln. The lens unit Lp2 has positive refractive power and is disposed adjacent to the image side of the lens unit Ln. The lens units Lp1 and Lp2 move for zooming.

In addition, a zoom lens according to another exemplary embodiment of the invention includes lens unit Lp that has positive refractive power, contains two or less lenses, and moves during focusing and zooming. The zoom lens further includes lens units Ln1 and Ln2. The lens unit Ln1 has negative refractive power and is disposed adjacent to the object side of the lens unit Ln. The lens unit Ln2 has negative refractive power and is disposed adjacent to the image side of the lens unit Ln. The lens units Ln1 and Ln2 move for zooming.

FIG. 1 is a sectional view of a zoom lens according to a first exemplary embodiment of the invention at a wide-angle end. FIGS. 2A, 2B, 2C, and 2D are aberration diagrams of the zoom lens according to the first exemplary embodiment at wide-angle end and a telephoto end during focusing on an infinitely distant object and a closest object (shooting distance of 420 mm). The shooting distance of 420 mm represents a numeric value of a numerical example (to be described) in units of millimeters. The same applies to the description below.

FIG. 3 is a sectional view of a zoom lens according to a second exemplary embodiment of the invention at a wide-angle end. FIGS. 4A, 4B, 4C, and 4D are aberration diagrams of the zoom lens according to the second exemplary embodiment at wide-angle end and a telephoto end during focusing on an infinitely distant object and a closest object (shooting distance of 300 mm).

Figure 5:
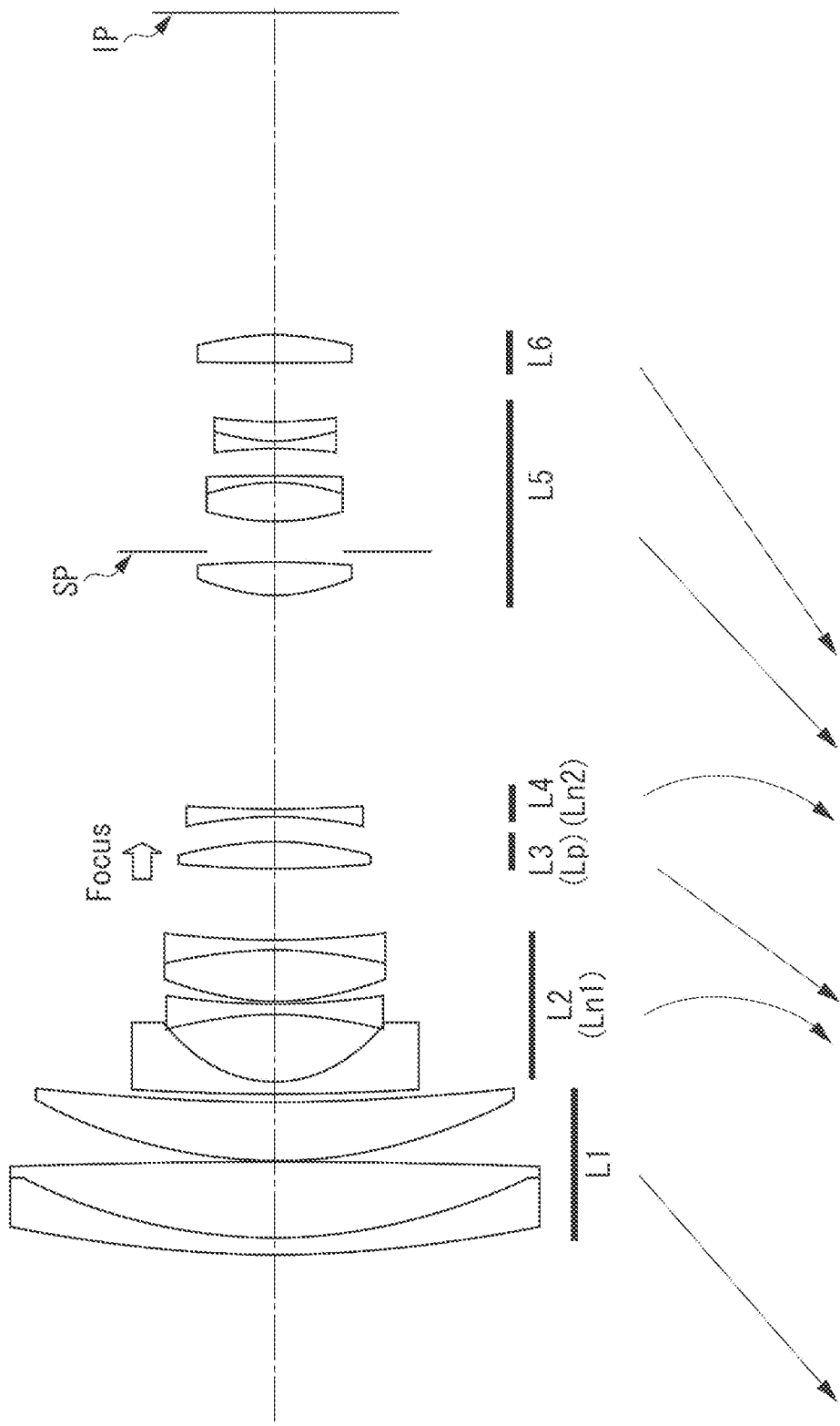
FIG. 5 is a sectional view of a zoom lens according to a third exemplary embodiment of the invention at a wide-angle end.
Figure 6A:
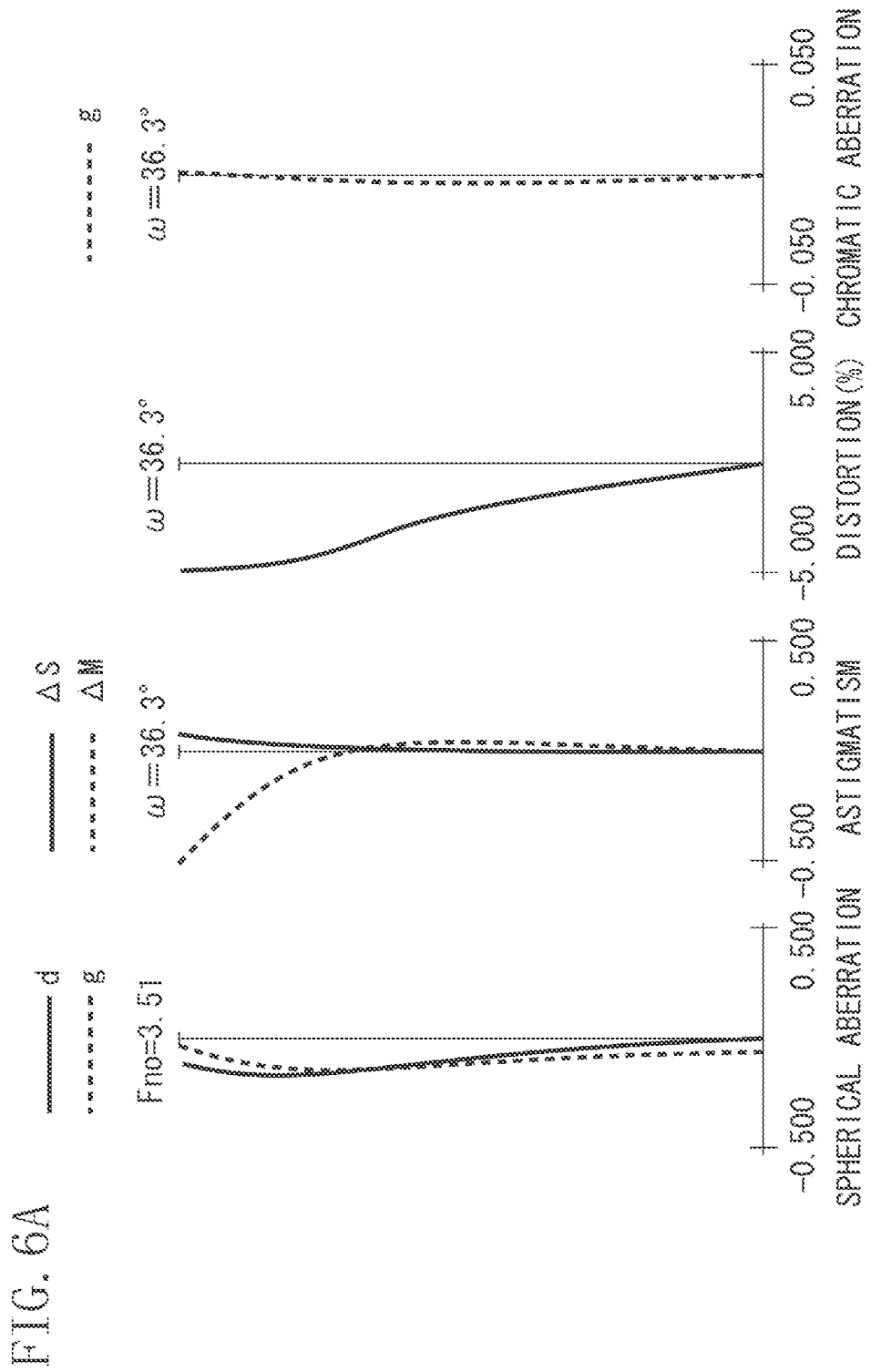

FIG. 5 is a sectional view of a zoom lens according to a third exemplary embodiment of the invention at a wide-angle end. FIGS. 6A, 6B, 6C, and 6D are aberration diagrams of the zoom lens according to the third exemplary embodiment at wide-angle end and a telephoto end during focusing on an infinitely distant object and a closest object (shooting distance of 390 mm).

FIG. 7 is a sectional view of a zoom lens according to a fourth exemplary embodiment of the invention at a wide-angle end. FIGS. 8A, 8B, 8C, and 8D are aberration diagrams of the zoom lens according to the fourth exemplary embodiment at wide-angle end and a telephoto end during focusing on an infinitely distant object and a closest object (shooting distance of 420 mm).

Figure 9:
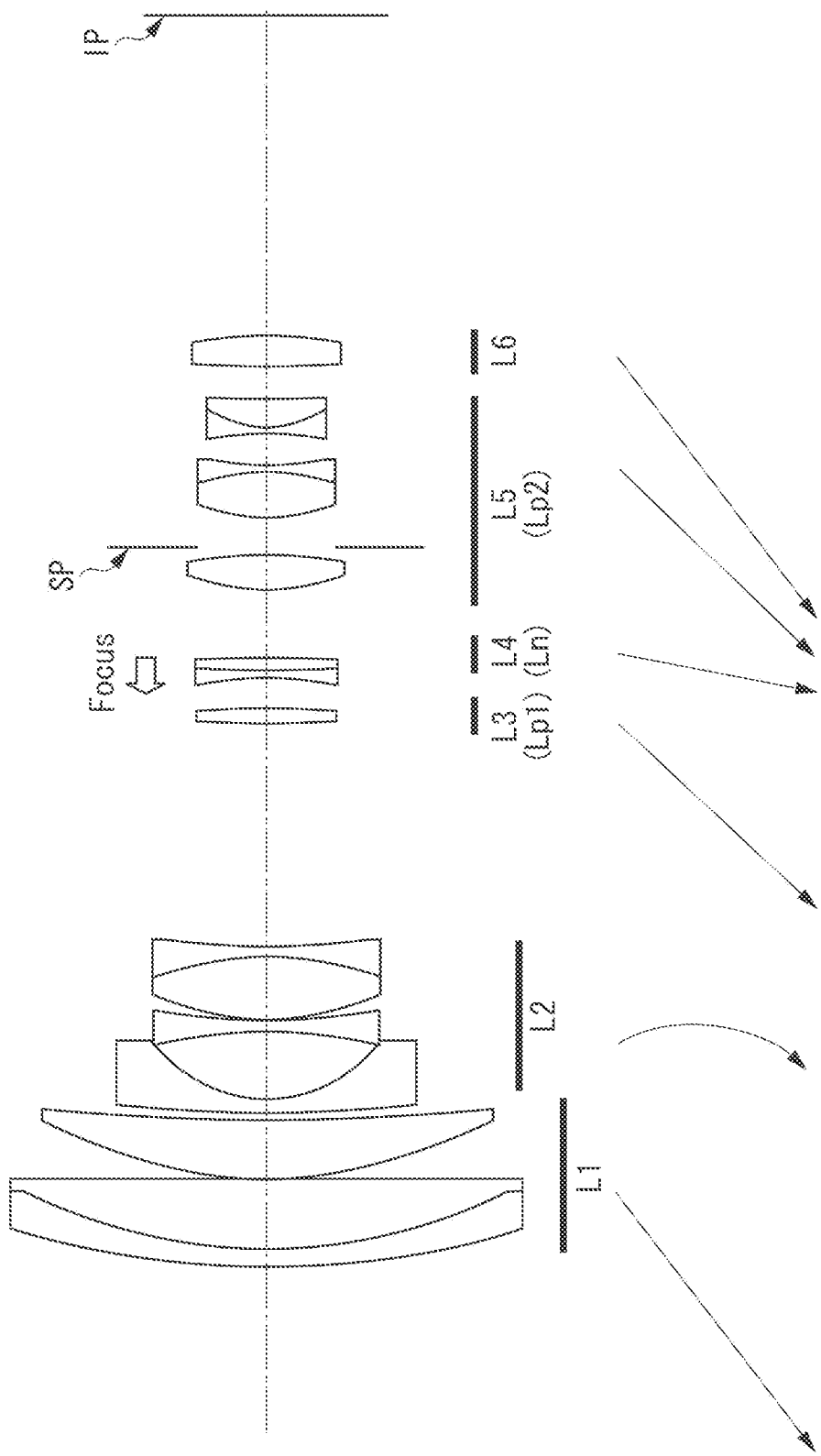
FIG. 9 is a sectional view of a zoom lens according to a fifth exemplary embodiment of the invention at a wide-angle end.

FIG. 9 is a sectional view of a zoom lens according to a fifth exemplary embodiment of the invention at a wide-angle end. FIGS. 10A, 10B, 10C, and 10D are aberration diagrams illustrating a wide-angle end and a telephoto end of the zoom lens according to a fifth numerical example focused on an infinitely distant object and a closest object (shooting distance of 420 mm).

The zoom lens in each exemplary embodiment represents a photographic lens system (optical system) used for an image pickup apparatus such as a video camera, a digital camera, or a silver-halide film camera. In the sectional views, the left side represents an object side (front) and the right side represents an image side (rear). In the sectional views, the i-th lens unit is represented as Li counted from the object side. An aperture stop is represented as SP. Image plane IP is equivalent to an imaging plane of a solid-state image sensor (photoelectric conversion element) such as a CCD sensor or a CMOS sensor if the zoom lens is used for the photographic optical system such as a video camera or a digital still camera. The image plane IP is equivalent to a film surface if the zoom lens is used for a silver-halide film camera.

An arrow represents a moving locus of each lens unit during zooming from the wide-angle end to the telephoto end. A spherical aberration diagram illustrates d-line (solid line) and g-line (broken line). In an astigmatism diagram, a broken line represents meridional image plane ΔM with respect to d-line. A solid line represents sagittal image plane ΔS with respect to d-line. A diagram illustrating distortion is associated with the d-line. Lateral chromatic aberration is associated with the g-line. An F-number is represented as Fno. A half angle of view is represented as ω. In the exemplary embodiments described below, the wide-angle end and the telephoto end correspond to zoom positions reached when the zoom lens unit is mechanically positioned to the respective ends of a movable range along the optical axis.

To miniaturize the entire zoom lens, an ordinary zoom lens is configured to increase as much as possible the power (refractive power) of a focus lens unit for movement during focusing and reduce a movement range for focusing. The following describes differences between the zoom lens according to an exemplary embodiment of the invention and the zoom lenses discussed in the above-mentioned patent documents.

Suppose that a zoom lens includes a focus lens unit that uses a small number of lenses. In such a case, excessively increasing the focus lens unit power increases residual aberration for the focus lens unit. A change in the object distance considerably increases an aberration variation. There may be an attempt to concurrently provide a small, lightweight focus lens unit and reduce an aberration variation due to a change in the object distance. Such an attempt increases the amount of focusing movement and reduces the space for the zooming lens unit to move. For example, the six-unit zoom lens described in U.S. Pat. No. 7,184,221 includes the small, lightweight fifth lens unit having negative refractive power. The fifth lens unit is used for focusing.

According to U.S. Pat. No. 7,184,221, the fourth and sixth lens units have positive refractive power. The fourth through sixth lens units form a composite lens unit having positive refractive power to increase the power for the focus lens unit. Even in this case, a principal point for the composite lens unit having positive refractive power can be positioned as intended.

According to U.S. Pat. No. 7,184,221, the composite lens unit including the fourth through sixth lens units uses the fifth lens unit having high negative power as a focus lens unit and ensures a large space for its movement. A four-unit zoom lens includes lens units having negative, positive, negative, and positive refractive powers. The composite lens unit provides lower power than the fourth lens unit having positive refractive power. As a result, the retrofocus power arrangement tends to be unbalanced.

In addition, a lens unit having high negative refractive power is positioned where an off-axis principal ray causes a large height of incidence near the image plane. An off-axis ray is greatly raised to change the height of incidence for the off-axis principal ray in a positive lens at the image side. A change in the object distance tends to vary off-axis aberration.

The zoom lens described in U.S. Patent Application Publication No. 2010/0091170 may increase the power for the third lens unit as a focus lens unit to restrict the amount of focusing movement. The result is to move the front principal point position of a lens unit having negative refractive power, that is, a combination of the second and third lens units, to the third lens unit. The movement is equivalent to increasing the distance between the focus lens unit and the second lens unit as a variator at the wide-angle end of the four-unit zoom lens including lens units having positive, negative, positive, and positive refractive powers. This is considerably disadvantageous to the wide-angle scheme.

According to U.S. Patent Application Publication No. 2010/0091170, the third lens unit as a focus lens unit is moved toward the second lens unit at the wide-angle end or to the fourth lens unit at the telephoto end to decrease the distance during zooming. A variable power effect results. However, the distance between the second and third lens units needs to be ensured to satisfy the movement of the focus lens unit. The result is to restrict movement of the second lens unit toward the fourth lens unit. The second lens unit as a variator considerably degrades a variable power effect compared to the above-mentioned four-unit zoom lens.

The zoom lens according to the U.S. Patent Application Publication No. 2010/0091171 distributes positive power (refractive power) of the fourth lens unit to the third lens unit as a focus lens unit. Principal point positions of the third and fourth lens units move toward the third lens unit. This hampers ensuring a long back focus at the wide-angle end. The third lens unit moves toward the second lens unit during zooming from the wide-angle end to the telephoto end to provide the variable power. Consequently, the fourth lens unit cannot move toward the second lens unit as much as the movement of the third lens unit as a focus lens unit. Again, a variable power effect degrades compared to the above-mentioned four-unit zoom lens.

By contrast, the following describes zoom lenses according to the first, second, fourth, and fifth exemplary embodiments of the invention. A focus lens unit Ln having negative power is sandwiched between the lens unit Lp1 having positive power and the lens unit Lp2 having negative power to provide a composite lens unit (Lp1, Ln, and Lp2) having positive power. The composite lens unit is positioned far from the image plane.

Increasing the power for the lens unit Ln does not significantly change the principal point position of the composite lens unit having positive refractive power. It is possible to easily decrease the amount of focusing movement of the focus lens unit Ln and make the entire zoom lens small and lightweight. The lens unit Ln is positioned somewhat far from the image side to prevent a large height of incidence for the off-axis principal ray. As a result, focusing decreases a change in the height of incidence for the lens units Lp1 and Lp2 at both ends of the lens unit Ln. A change in the object distance decreases a variation in the off-axis aberration.

An afocal relation is easily established between the lens unit Ln and one of the lens units Lp1 and Lp2 at both ends. The lens unit Ln can decrease a change in the height of incidence for an axial ray during focusing. As a result, a change in the object distance decreases a variation in axial aberration such as the spherical aberration or the axial chromatic aberration (longitudinal chromatic aberration).

In the zoom lens according to an exemplary embodiment of the invention, the lens unit Ln moves closer to the lens unit Lp1 during focusing from an infinitely distant object to a closest object. The lens unit Ln moves away from the lens unit Lp1 during zooming from the wide-angle end to the telephoto end. As a result, a variable power effect is ensured. Providing a space for movement of the focus lens unit compensates loads on the zoom lens units. The zoom lens thereby features excellent optical performance over full zoom and focus ranges and easily miniaturizes the entire zoom lens while maintaining the small, lightweight focusing mechanism.

The third exemplary embodiment of the invention reverses the positive-negative relationship between refractive powers for the above-mentioned lens units Ln, Lp1, and Lp2. The third exemplary embodiment ensures an effect similar to the above by providing a focus lens unit Lp having positive refractive power and adjacent lens units Ln1 and Ln2 having negative refractive power at the respective sides thereof.

The following describes zoom lenses according to the exemplary embodiments. First, features of zoom lenses according to the first, second, fourth, and fifth exemplary embodiments will be described. The first, second, fourth, and fifth exemplary embodiments provide a lens unit Ln that has negative refractive power, contains two or less lenses, and moves during focusing and zooming. The zoom lens further includes lens units Lp1 and Lp2. The lens unit Lp1 has positive refractive power and is disposed adjacent to the object side of the lens unit Ln. The lens unit Lp2 has positive refractive power and is disposed adjacent to the image side of the lens unit Ln. The lens units Lp1 and Lp2 move for zooming.

The lens unit Ln moves closer to the lens unit Lp1 during focusing from an infinitely distant object to a closest object. The lens unit Ln moves away from the lens unit Lp1 during zooming from the wide-angle end to the telephoto end.

Distance Tlw is assumed between the lens surface nearest to the object side in the entire zoom lens and the image plane at the wide-angle end. Distance Dnw is assumed between the lens surface nearest to the image side of the lens unit Ln and the image plane at the wide-angle end. Back focus bfw is assumed at the wide-angle end. The maximum amount of movement Mfnt is assumed during focusing of the lens unit Ln at the telephoto end. Movement from the object side to the image side is assumed positive. The amount of change in the distance Mnz is assumed between the lens units Ln and Lp1 during zooming from the wide-angle end to the telephoto end. An increase in the distance is assumed positive. The following conditions are satisfied:

$$0.2 < (Dnw - bfw)/(Tlw - bfw) < 0.8 \quad (1)$$

$$0.3 < -Mnz/Mfnt < 1.0 \quad (2)$$

The lens unit Ln having negative refractive power for focusing is sandwiched between the lens units Lp1 and Lp2 each having positive refractive power. Even increasing the power of the lens unit Ln can appropriately position the principal point of a composite lens unit including the lens units Lp1, Ln, and Lp2. The power of the focus lens unit is increased. The amount of movement is decreased during focusing.

The lens unit Ln is positioned to satisfy condition (1). Focusing decreases a change in the height of incidence for an off-axis principal ray on the lens units Lp1 and Lp2 at the respective sides of the lens unit Ln. Consequently, a change in the object distance decreases a variation in the off-axis aberration. Deviation from the lower limit for condition (1) positions the negative-power lens unit toward the image plane that requires a positive power at the wide-angle end. The retrofocus power arrangement is unbalanced to hamper providing a wide viewing angle and miniaturize the entire zoom lens.

In addition, the height of incidence for an off-axis principal ray increases at the image side. Strong negative power raises an off-axis beam. A change in the object distance increases a variation in the off-axis aberration. Deviation from the upper limit for the condition (1) moves the lens unit Ln too close to the object side. The height of incidence for an off-axis principal ray increases in a direction opposite the image plane. A change in the object distance increases a variation in the off-axis aberration. Based on condition (2), the lens unit Ln moves during zooming as well as focusing. The space for the lens unit Ln to move during focusing can be effectively used for zooming. The entire zoom lens can be easily miniaturized.

Deviation from the upper limit for the condition (2) provides too large a space for the amount of focusing movement of the lens unit Ln at the telephoto end. The entire zoom lens size increases. Deviation from the lower limit for the condition (2) decreases the variable power effect due to the lens unit Ln. If conditions (1) and (2) are satisfied, the configuration of a few lenses such as two or less lenses for the lens unit Ln can easily decrease the amount of focusing movement, increase the variable power effect during zooming, and decrease an aberration variation during focusing. More advantageously, conditions (1) and (2) can be set to the following values:

$$0.25 < (Dnw - bfw)/(Tlw - bfw) < 0.6 \quad (1a)$$

$$0.35 < -Mnz/Mfnt < 0.95 \quad (2a)$$

More advantageously, the first, second, fourth, and fifth exemplary embodiments can satisfy one or more of the following conditions. Focal lengths fn, fp1, and fp2 are assumed for the lens units Ln, Lp1, and Lp2, respectively. Effective diameters ea_nf and ea_nr are assumed for the object side and the image side of the lens unit Ln, respectively. Effective diameters ea_p1r and ea_p2f are assumed for the image side of the lens unit Lp1 and the object side of the lens unit Lp2, respectively.

Rear principal point position okw is assumed for the composite lens unit including the lens units Lp1, Ln, and Lp2 at the wide-angle end. Rear principal point position okp2 is assumed for the lens unit Lp2. Focal length fp2 is assumed for the lens unit Lp2. Lateral magnifications βnw and βnt are assumed for the lens unit Ln at the wide-angle end and the telephoto end, respectively. One or more of the following conditions can be satisfied:

$$0.4 < -fp1/fn < 2.5 \quad (3)$$

$$0.4 < -fp2/fn < 2.5 \quad (4)$$

$$0.7 < ea\_p1r/ea\_nf < 1.4 \quad (5)$$

$$0.7 < ea\_p2f/ea\_nr < 1.4 \quad (6)$$

$$|(okw - okp2)/fp2| < 0.3 \quad (7)$$

$$|\beta nw| < 1.0 \quad (8)$$

$$|\beta nt| < 1.0 \quad (9)$$

Conditions (3) and (4) allow the lens units Lp1 and Lp2 to appropriately correct aberrations occurring in the lens unit Ln and an aberration variation due to a change in the object distance.

Deviation from the upper limits for conditions (3) and (4) decreases power for the lens units Lp1 and Lp2, respectively. Aberrations excessively occur on the lens unit Ln. A change in the object distance causes an excessive aberration variation. The optical performance degrades. Deviation from the lower limits for the conditions (3) and (4) causes too low a power for the lens unit Ln. The amount of focusing movement increases. The entire zoom lens size increases.

Conditions (5) and (6) concern effective diameters of the lens units Ln, Lp1, and Lp2. Conditions (5) and (6) specify effective diameter ratios of the lens unit Ln to the lens units Lp1 and Lp2, respectively. Approximating values for conditions (5) and (6) to "1" decreases a change in the height of incidence for the off-axis principal ray and decreases a variation in off-axis aberration such as the curvature of field and the lateral chromatic aberration (chromatic aberration of magnification) due to a change in the object distance.

Deviation from the upper limits for conditions (5) and (6) causes too large effective diameters for the lens units Lp1 and Lp2, respectively, in relation to the lens unit Ln. Deviation from the lower limits for conditions (5) and (6) causes too small effective diameters for the lens units Lp1 and Lp2, respectively. Either case increases a change in the height of incidence for the off-axis principal ray on the lens unit Ln. A change in the object distance increases a variation in the off-axis aberration.

The composite lens unit includes the lens units Lp1, Ln, and Lp2. Condition (7) appropriately corrects an aberration during zooming by approximating the rear principal point position of the composite lens unit at the wide-angle end to the rear principal point position of the lens unit Lp2. Deviation from the upper limit for the condition (7) may increase the rear principal point position okw to cause a low power on the lens unit Lp1 and too high a power on the lens unit Ln. Focusing increases an aberration variation.

Deviation from the upper limit for the condition (7) may decrease the rear principal point position okw to position the principal point of the composite lens unit having positive refractive power too distant from the image side. The retrofocus power arrangement is unbalanced. The entire zoom lens size increases.

Condition (8) concerns lateral magnification of the lens unit Ln at the wide-angle end. Satisfying condition (8) provides an afocal relation between the lens units Lp1 and Ln. A change in the object distance decreases a variation in axial aberration such as the spherical aberration or the axial chromatic aberration. Deviation from condition (8) unbalances an afocal relation between the lens units Lp1 and Ln. A change in the object distance increases a variation in the axial aberration.

Similar to condition (8), condition (9) appropriately specifies the lateral magnification of the lens unit Ln at the telephoto end as well as the wide-angle end. Satisfying condition (9) provides an afocal relation between the lens units Lp1 and Ln at the telephoto end as well as the wide-angle end. A change in the object distance decreases a variation in the axial aberration. More advantageously, conditions (3) through (9) can be set to the following numeric ranges:

$$0.7 < -fp1/fn < 2.0 \tag{3a}$$

$$0.5 < -fp2/fn < 1.6 \tag{4a}$$

$$0.83 < ea\_p1r/ea\_nf < 1.2 \tag{5a}$$

$$0.83 < ea\_p2f/ea\_nr < 1.2 \tag{6a}$$

$$|(okw-okp2)/fp2| < 0.2 \tag{7a}$$

$$|\beta nw| < 0.4 \tag{8a}$$

$$|\beta nt| < 0.5 \tag{9a}$$

According to the first, second, fourth, and fifth exemplary embodiments, the lens units Lp1 and Lp2 can be moved together during zooming to suppress relative decentration for the lens units. A manufacturing error can be decreased. The mechanical structure can be simplified.

The following describes features of a zoom lens according to the third exemplary embodiment. The zoom lens according to the third exemplary embodiment includes a lens unit Lp that has positive refractive power, contains two or less lenses, and moves during focusing and zooming. The zoom lens further includes lens units Ln1 and Ln2. The lens unit Ln1 has negative refractive power and is disposed adjacent to the object side of the lens unit Lp. The lens unit Ln2 has negative refractive power and is disposed adjacent to the image side of the lens unit Lp. The lens units Ln1 and Ln2 move for zooming.

The lens unit Lp moves closer to the lens unit Ln2 during focusing from an infinitely distant object to a closest object. The lens unit Lp moves away from the lens unit Ln2 during zooming from the wide-angle end to the telephoto end.

Distance Tlw is assumed between the lens surface nearest to the object side in the entire zoom lens and the image plane at the wide-angle end. Distance Dn2w is assumed between the lens surface nearest to the image side of the lens unit Ln2 and the image plane at the wide-angle end. Back focus bfw is assumed at the wide-angle end. The maximum amount of movement Mfpt is assumed during focusing of the lens unit Lp at the telephoto end. Movement from the object side to the image side is assumed positive. The amount of change in the distance Mpz is assumed between the lens units Lp and Ln2 during zooming from the wide-angle end to the telephoto end. A decrease in the distance is assumed positive. The following conditions are satisfied:

$$0.2 < (Dn2w-bfw)/(Tlw-bfw) < 0.8 \tag{10}$$

$$0.3 < -Mpz/Mfpt < 1.0 \tag{11}$$

The lens unit Lp having positive refractive power for focusing is sandwiched between the lens units Ln1 and Ln2 each having negative refractive power. Even increasing the power of the lens unit Lp can appropriately position the principal point of a composite lens unit including the lens units Ln1, Lp, and Ln2. The power of the focus lens unit is increased. The amount of movement is decreased during focusing.

The lens unit Lp is positioned to satisfy condition (10). Focusing decreases a change in the height of incidence for an off-axis principal ray on the lens units Ln1 and Ln2 at the respective sides of the lens unit Lp. Consequently, a change in the object distance decreases a variation in the off-axis aberration. Deviation from the lower limit for condition (10) positions the negative-power lens unit having a high negative power toward the image plane that requires a high positive power at the wide-angle end. The retrofocus power arrangement is unbalanced to hamper providing a wide viewing angle and miniaturize the entire zoom lens.

In addition, the height of incidence for an off-axis principal ray increases at the image side. Strong negative power raises an off-axis beam. A change in the object distance increases a variation in the off-axis aberration. Deviation from the upper limit for the condition (10) moves the lens unit Ln2 too close to the object side. The height of incidence for an off-axis principal ray increases in a direction opposite the image plane. A change in the object distance increases a variation in the off-axis aberration.

Based on condition (11), the lens unit Lp moves during zooming as well as focusing. The space for the lens unit Lp to move during focusing can be effectively used for zooming. The entire zoom lens can be easily miniaturized. Deviation from the upper limit for the condition (11) provides too large a space for the amount of focusing movement of the lens unit Lp at the telephoto end. The entire zoom lens size increases. Deviation from the lower limit for the condition (11) decreases the variable power effect due to the lens unit Lp.

If conditions (10) and (11) are satisfied, the configuration of a few lenses such as two or less lenses for the lens unit Lp can easily decrease the amount of focusing movement, increase the variable power effect during zooming, and decrease an aberration variation during focusing. More advantageously, conditions (10) and (11) can be set to the following numeric ranges:

$$0.3 < (Dn2w - bfw)/(Tlw - bfw) < 0.7 \quad (10a)$$

$$0.35 < -Mpz/Mfpt < 0.95 \quad (11a)$$

More advantageously, one or more of the following conditions can be satisfied. Focal lengths fp, fn1, and fn2 are assumed for the lens units Lp, Ln1, and Ln2, respectively. Effective diameters ea_pf and ea_pr are assumed for the object side and the image side of the lens unit Lp, respectively. Effective diameters ea_n1r and ea_n2f are assumed for the image side of the lens unit Ln1 and the object side of the lens unit Ln2, respectively.

Front principal point position o1w is assumed for the composite lens unit including the lens units Ln1, Lp, and Ln2 at the wide-angle end. Front principal point position o1n1 is assumed for the lens unit Ln1. Focal length fn1 is assumed for the lens unit Ln1. Lateral magnifications βn2w and βn2t are assumed for the lens unit Ln2 at the wide-angle end and the telephoto end, respectively. One or more of the following conditions can be satisfied:

$$0.3 < -fn1/fp < 2.5 \quad (12)$$

$$0.3 < -fn2/fp < 2.5 \quad (13)$$

$$0.7 < ea\_n1r/ea\_pf < 1.4 \quad (14)$$

$$0.7 < ea\_n2f/ea\_pr < 1.4 \quad (15)$$

$$|(o1w - o1n1)/fn1| < 0.3 \quad (16)$$

$$|\beta n2w| < 1.0 \quad (17)$$

$$|\beta n2t| < 1.0 \quad (18)$$

Conditions (12) and (13) allow the lens units Ln1 and Ln2 to appropriately correct aberrations occurring in the lens unit Lp and an aberration variation due to a change in the object distance.

Deviation from the upper limits for conditions (12) and (13) decreases power for the lens units Ln1 and Ln2, respectively. Aberrations excessively occur on the lens unit Lp. A change in the object distance causes an excessive aberration variation. The optical performance degrades. Deviation from the lower limits for the conditions (12) and (13) causes too low a power for the lens unit Lp. The amount of focusing movement increases. The entire zoom lens size increases.

Conditions (14) and (15) concern effective diameters of the lens units Lp, Ln1, and Ln2. Conditions (14) and (15) specify effective diameter ratios of the lens unit Ln to the lens units Ln1 and Ln2, respectively. Approximating values for conditions (14) and (15) to "1" decreases a change in the height of incidence for the off-axis principal ray and decreases a variation in off-axis aberration such as the curvature of field and the lateral chromatic aberration due to a change in the object distance.

Deviation from the upper limits for conditions (14) and (15) causes too large effective diameters for the lens units Ln1 and Ln2, respectively, in relation to the lens unit Lp. Deviation from the lower limits for conditions (14) and (15) causes too small effective diameters for the lens units Ln1 and Ln2, respectively. Either case increases a change in the height of incidence for the off-axis principal ray on the lens unit Lp. A change in the object distance increases a variation in the off-axis aberration.

The composite lens unit includes the lens units Ln1, Lp, and Ln2. Condition (16) appropriately corrects an aberration during zooming by approximating the front principal point position of the composite lens unit at the wide-angle end to the front principal point position of the lens unit Ln1. Deviation from the upper limit for the condition (16) may decrease the front principal point position o1w to cause a low power on the lens unit Ln2 and too high a power on the lens unit Lp. Focusing increases an aberration variation.

Deviation from the upper limit for the condition (16) may increase the front principal point position o1w to position the principal point of the composite lens unit having negative refractive power too close to the image side. The retrofocus power arrangement is unbalanced. The entire zoom lens size increases.

Condition (17) concerns lateral magnification of the lens unit Ln2 at the wide-angle end. Satisfying condition (17) provides an afocal relation between the lens units Lp and Ln2. A change in the object distance decreases a variation in axial aberration such as the spherical aberration or the axial chromatic aberration. Deviation from condition (17) unbalances an afocal relation between the lens units Lp and Ln2. A change in the object distance increases a variation in the axial aberration.

Similar to condition (17), condition (18) appropriately specifies the lateral magnification of the lens unit Ln2 at the telephoto end as well as the wide-angle end. Satisfying condition (18) provides an afocal relation between the lens units Lp and Ln2 at the telephoto end as well as the wide-angle end. A change in the object distance decreases a variation in the axial aberration. More advantageously, conditions (10) through (18) can be set to the following numeric ranges:

$$0.35 < -fn1/fp < 1.6 \quad (12a)$$

$$0.6 < -fn2/fp < 2.0 \quad (13a)$$

$$0.83 < ea\_n1r/ea\_pf < 1.2 \quad (14a)$$

$$0.83 < ea\_n2f/ea\_pr < 1.2 \quad (15a)$$

$$|(o1w - o1n1)/fn1| < 0.2 \quad (16a)$$

$$|\beta n2w| < 0.4 \quad (17a)$$

$$|\beta nt| < 0.4 \quad (18a)$$

According to the third exemplary embodiment, the lens units Ln1 and Ln2 can be moved together during zooming to suppress relative decentration for the lens units. A manufacturing error can be decreased. The mechanical structure can be simplified.

The above-mentioned exemplary embodiments can provide the zoom lens that features excellent optical performance over full zoom and focus ranges and easily miniaturizes the entire zoom lens while maintaining the small, lightweight focusing mechanism.

The following describes the exemplary embodiments in detail. A zoom lens according to the first exemplary embodiment includes a first lens unit L1, a second lens unit L2, a third lens unit L3, a fourth lens unit L4, a fifth lens unit L5, and a sixth lens unit L6. The first lens unit L1 has positive refractive power. The second lens unit L2 has negative refractive power. The third lens unit L3 has positive refractive power. The fourth lens unit L4 has negative refractive power. The fifth lens unit L5 has positive refractive power and includes an aperture stop SP. The sixth lens unit L6 has positive refractive power. During zooming from the wide-angle end to the telephoto end, the first lens unit L1 and the third lens unit L3 through the sixth lens unit L6 move toward the object side. The second lens unit L2 moves along a locus that is convex toward the image side.

The first exemplary embodiment provides the positive-lead type six-unit zoom lens with a zoom ratio of 7.02. The fourth lens unit L4 moves toward the object side as indicated by the Focus arrow during focusing from an infinitely distant object to a closest object. The fourth lens unit L4 is equivalent to the lens unit Ln. The third lens unit L3 is equivalent to the lens unit Lp1. The fifth lens unit L5 is equivalent to the lens unit Lp2.

According to the first exemplary embodiment, the focus lens unit Ln uses one lens to provide a small, lightweight lens unit. The lens units Lp1 and Lp2 each having positive refractive power are disposed adjacent to the respective sides of the lens unit Ln. Even if a power for the lens unit Ln is increased, the zoom lens can appropriately position the principal point of the positive composite lens unit including the lens units Lp1, Ln, and Lp2 during zooming. The entire zoom lens is designed to be small and high-performance.

Specifically, the principal point of the composite lens unit having positive refractive power is disposed at a position that satisfies condition (7). The negative lens unit Ln is disposed distant from the image plane at a position that satisfies condition (1). As a result, a sufficient positive power is provided toward the image plane. The retrofocus power arrangement is appropriately provided to effectively enable a wide viewing angle and miniaturize the entire zoom lens. The zoom lens suppresses a variation in the height of incidence for an off-axis principal ray in the composite lens unit including the lens units Lp1, Ln, and Lp2 due to a change in the object distance and ensures excellent optical performance over full zoom and focus ranges.

The lens unit Ln moves in a direction (toward the object side) to decrease the distance to the lens unit Lp1 during focusing. The lens unit Ln moves to increase the distance to the lens unit Lp1 during zooming from the wide-angle end to the telephoto end. The movement space for focusing is effectively used for zooming if condition (2) is satisfied.

The power relationship among the lens units Ln, Lp1, and Lp2 satisfies conditions (3) and (4). A change in the object distance decreases a variation in the height of incidence of an axial ray on the composite lens unit including the lens units Ln, Lp1, and Lp2. In addition, the lateral magnification of the lens unit Ln satisfies conditions (8) and (9). An afocal relationship is ensured between the lens units Ln and Lp1 at the wide-angle end and the telephoto end. A change in the object distance further decreases a variation in the height of incidence for the axial ray.

A relationship among the effective diameters of the lens units Ln, Lp1, and Lp2 satisfies conditions (5) and (6). A change in the object distance also decreases a variation in the height of incidence for the axial ray. The lens units Lp1 and Lp2 are moved together during zooming. The mechanical structure is simplified to decrease a manufacturing error in the composite lens unit including the lens units Lp1, Ln, and Lp2.

A zoom lens according to the second exemplary embodiment includes the first lens unit L1, the second lens unit L2, the third lens unit L3, the fourth lens unit L4, and the fifth lens unit L5 in order from the object side to the image side. The first lens unit L1 has negative refractive power. The second lens unit L2 has positive refractive power. The third lens unit L3 has negative refractive power. The fourth lens unit L4 has positive refractive power and includes the aperture stop SP. The fifth lens unit L5 has positive refractive power. During zooming from the wide-angle end to the telephoto end, the first lens unit L1 moves along a locus that is convex toward the image side. The second lens unit L2 through the fifth lens unit L5 move toward the object side.

The second exemplary embodiment provides the negative-lead type five-unit zoom lens with a zoom ratio of 2.42. The third lens unit L3 moves toward the object side as indicated by the Focus arrow during focusing from an infinitely distant object to a closest object. The third lens unit L3 is equivalent to the lens unit Ln. The second lens unit L2 is equivalent to the lens unit Lp1. The fourth lens unit L4 is equivalent to the lens unit Lp2. According to the second exemplary embodiment, the focus lens unit Ln uses one lens to provide a small, lightweight lens unit. Optical effects of the lens units Ln, Lp1, and Lp2 are similar to those of the first exemplary embodiment.

A zoom lens according to the third exemplary embodiment includes the first lens unit L1, the second lens unit L2, the third lens unit L3, the fourth lens unit L4, the fifth lens unit L5, and the sixth lens unit L6. The first lens unit L1 has positive refractive power. The second lens unit L2 has negative refractive power. The third lens unit L3 has positive refractive power. The fourth lens unit L4 has negative refractive power. The fifth lens unit L5 has positive refractive power and includes the aperture stop SP. The sixth lens unit L6 has positive refractive power. During zooming from the wide-angle end to the telephoto end, the first, third, fifth, and sixth lens units L1, L3, L5, and L6 move toward the object side. The second and fourth lens units L2 and L4 move along loci that are convex toward the object side.

The third exemplary embodiment provides the positive-lead type six-unit zoom lens with a zoom ratio of 7.05. The third lens unit L3 moves toward the object side during focusing from an infinitely distant object to a closest object. The third lens unit L3 is equivalent to the lens unit Lp. The second lens unit L2 is equivalent to the lens unit Ln1. The fourth lens unit L4 is equivalent to the lens unit Ln2.

According to the third exemplary embodiment, the focus lens unit Lp uses one lens to provide a small, lightweight lens unit. The lens units Ln1 and Ln2 each having negative refractive power are disposed adjacent to the respective sides of the lens unit Lp. Even if a power for the lens unit Lp is increased, the zoom lens can appropriately position the principal point of the negative composite lens unit including the lens units Ln1, Lp, and Ln2 during zooming. The entire zoom lens is designed to be small and high-performance.

Specifically, the principal point of the composite lens unit having negative refractive power is disposed at a position that satisfies condition (16). The lens unit Ln2 is disposed distant from the image plane at a position that satisfies condition (10). As a result, a sufficient positive power is provided toward the image plane. The retrofocus power arrangement is appropriately provided to effectively enable a wide viewing angle and miniaturize the entire zoom lens. The zoom lens suppresses a variation in the height of incidence for an off-axis principal ray in the composite lens unit including the lens units Ln1, Lp, and Ln2 due to a change in the object distance and ensures excellent optical performance over a full focus range.

The lens unit Lp moves in a direction to decrease the distance to the lens unit Ln2 during focusing. The lens unit Lp moves to increase the distance to the lens unit Ln2 during zooming from the wide-angle end to the telephoto end. The movement space for focusing is effectively used for zooming if condition (11) is satisfied. The power relationship among the lens units Lp, Ln1, and Ln2 satisfies conditions (12) and (13). A change in the object distance decreases a variation in the height of incidence of an axial ray on the composite lens unit.

In addition, the lateral magnification of the lens unit Ln2 satisfies conditions (17) and (18). An afocal relationship is ensured between the lens units Lp and Ln2 at the wide-angle end and the telephoto end. A change in the object distance further decreases a variation in the height of incidence for the axial ray. A relationship among the effective diameters of the lens units Lp, Ln1, and Ln2 satisfies conditions (14) and (15). A change in the object distance also decreases a variation in the height of incidence for the axial ray.

The lens units Ln1 and Ln2 are moved together during zooming. The mechanical structure is simplified to decrease a manufacturing error in the composite lens unit including the lens units Ln1, Lp, and Ln2.

A zoom lens according to the fourth exemplary embodiment includes the first lens unit L1, the second lens unit L2, the third lens unit L3, the fourth lens unit L4, and the fifth lens unit L5 in order from the object side to the image side. The first lens unit L1 has positive refractive power. The second lens unit L2 has negative refractive power. The third lens unit L3 has positive refractive power. The fourth lens unit L4 has negative refractive power. The fifth lens unit L5 has positive refractive power and includes the aperture stop SP. During zooming from the wide-angle end to the telephoto end, the first lens unit L1 and the third lens unit L3 through the fifth lens unit L5 move toward the object side. The second lens unit L2 moves along a locus that is convex toward the image side.

The fourth exemplary embodiment provides the positive-lead type five-unit zoom lens with a zoom ratio of 5.59. The fourth lens unit L4 moves toward the object side as indicated by the Focus arrow during focusing from an infinitely distant object to a closest object. The fourth lens unit L4 is equivalent to the lens unit Ln. The third lens unit L3 is equivalent to the lens unit Lp1. The fifth lens unit L5 is equivalent to the lens unit Lp2. According to the fourth exemplary embodiment, the focus lens unit Ln uses one lens to provide a small, lightweight lens unit. Optical effects of the lens units Ln, Lp1, and Lp2 are similar to those of the first exemplary embodiment.

A zoom lens according to the fifth exemplary embodiment includes the first lens unit L1, the second lens unit L2, the third lens unit L3, the fourth lens unit L4, the fifth lens unit L5, and the sixth lens unit L6. The first lens unit L1 has positive refractive power. The second lens unit L2 has negative refractive power. The third lens unit L3 has positive refractive power. The fourth lens unit L4 has negative refractive power. The fifth lens unit L5 has positive refractive power and includes the aperture stop SP. The sixth lens unit L6 has positive refractive power. During zooming from the wide-angle end to the telephoto end, the first lens unit L1 and the third lens unit L3 through the sixth lens unit L6 move toward the object side. The second lens unit L2 moves along a locus that is convex toward the image side. The fifth exemplary embodiment provides the positive-lead type six-unit zoom lens with a zoom ratio of 6.45.

The fourth lens unit L4 moves toward the object side as indicated by the arrow during focusing from an infinitely distant object to a closest object. The fourth lens unit L4 is equivalent to the lens unit Ln. The third lens unit L3 is equivalent to the lens unit Lp1. The fifth lens unit L5 is equivalent to the lens unit Lp2. According to the fifth exemplary embodiment, the focus lens unit Ln uses two lenses to provide a small, lightweight lens unit. Optical effects of the lens units Ln, Lp1, and Lp2 are similar to those of the first exemplary embodiment.

While there have been described specific exemplary embodiments of the present invention, it is to be distinctly understood that the invention is not limited thereto but may be otherwise variously embodied within the spirit and scope of the invention. The lens unit according to the exemplary embodiments ranges from the frontmost surface of the optical system to the rearmost surface thereof. Alternatively, the lens unit ranges from a surface having a distance from a forward adjacent lens to a surface having a distance from a backward adjacent lens while each of the distances varies with zooming or focusing.

The zoom lens according to any of the exemplary embodiments of the invention is diversely applicable to image pickup apparatuses, image projection apparatuses, and other optical apparatuses, for example.

The following describes numerical examples 1 to 5 corresponding to the first through fifth exemplary embodiments. In the numerical examples, the i-th surface is sequentially counted from the object side. In the numerical examples, the radius of curvature ri is assumed for the i-th lens surface sequentially counted from the object side. Lens thickness and air distance di is assumed for the i-th lens sequentially counted from the object side. Refractive index ndi and Abbe number vdi are assumed for a material of the i-th lens sequentially counted from the object side. BF denotes a back focus. An aspheric shape is assumed to have the X-axis in the optical axis direction and the H-axis perpendicular to the optical axis. The direction of light travel is assumed positive. The aspheric shape is assumed to have a paraxial radius of curvature r and aspheric coefficients A4, A6, A8, A10, and A12. Then, the aspheric shape is expressed as follows:

$$X = \frac{H^2/r}{1+(1-(H/r)^2)^{1/2}} + A4 \cdot H^4 + A6 \cdot H^6 + A8 \cdot H^8 + A10 \cdot H^{10} + A12 \cdot H^{12}$$

In each aspheric coefficient, e-x denotes $10^{-x}$. In addition to specifications such as the focal length and the F-number, the angle of view is equivalent to a half angle of view for the entire zoom lens. The image height is equivalent to the maximum image height that determines the half angle of view. The total lens length represents a distance between the first lens surface and the image plane. Back focus BF represents a length between the last lens surface and the image plane. Each lens unit data contains the focal length, the length along the optical axis, the front principal point position, and the rear principal point position of each lens unit. Distance d between optical surfaces is occasionally represented as (variable). In this case, the distance varies during zooming. An appendix provides surface distances corresponding to focal lengths.

Surface number 1 represents a dummy surface used for the design. The dummy surface is excluded from the zoom lens. Table 1 lists calculation results of the conditions based on the lens data according to the numerical examples 1 to 5 described below.

Numerical Example 1

| Unit mm | | | | | |
|---|---|---|---|---|---|
| Surface data | | | | | |
| Surface number | r | d | nd | vd | Effective diameter |
| 1 | ∞ | 1.50 | | | 60.02 |
| 2 | 111.698 | 2.00 | 1.84666 | 23.9 | 52.66 |
| 3 | 55.370 | 7.65 | 1.49700 | 81.5 | 50.01 |
| 4 | 3384.032 | 0.15 | | | 49.68 |
| 5 | 53.774 | 6.23 | 1.66672 | 48.3 | 48.11 |
| 6 | 295.614 | (variable) | | | 47.31 |
| 7 | 152.605 | 1.45 | 1.91082 | 35.3 | 30.90 |
| 8 | 15.649 | 7.30 | | | 23.59 |
| 9 | −48.289 | 1.20 | 1.77250 | 49.6 | 23.35 |
| 10 | 64.582 | 0.29 | | | 23.25 |
| 11 | 31.507 | 6.72 | 1.84666 | 23.8 | 23.64 |
| 12 | −34.468 | 1.10 | 1.77250 | 49.6 | 23.08 |
| 13 | 145.612 | (variable) | | | 22.11 |
| 14 | 87.716 | 1.95 | 1.78472 | 25.7 | 14.57 |
| 15 | −58.571 | (variable) | | | 14.57 |
| 16 | −34.608 | 0.70 | 1.90366 | 31.3 | 14.18 |
| 17 | 579.002 | (variable) | | | 14.45 |
| 18 | 22.161 | 4.00 | 1.60311 | 60.6 | 16.08 |
| 19 | −55.101 | 1.61 | | | 15.76 |
| 20(stop) | ∞ | 3.30 | | | 14.77 |
| 21 | 30.440 | 4.91 | 1.60311 | 60.6 | 13.77 |
| 22 | −17.452 | 0.75 | 1.84666 | 23.8 | 12.84 |
| 23 | −494.346 | 3.07 | | | 12.52 |
| 24 | −24.672 | 0.70 | 1.80000 | 29.8 | 11.77 |
| 25 | 13.389 | 2.54 | 1.84666 | 23.8 | 11.95 |
| 26 | 53.386 | (variable) | | | 12.01 |
| 27* | 94.305 | 3.99 | 1.68893 | 31.1 | 15.40 |
| 28 | −27.400 | | | | 16.47 |

Aspheric surface data

27th surface

K = 0.00000e+000  A4 = −2.62044e−005  A6 = 2.02686e−009
A8 = −4.13481e−011  A10 = −7.33645e−012  A12 = 7.19025e−014

Various data

Zoom ratio 7.02

| | Wide-angle | Middle | Telephoto |
|---|---|---|---|
| Focal length | 18.60 | 51.00 | 130.50 |
| F-number | 3.48 | 4.84 | 5.88 |
| Angle of view | 36.29 | 14.99 | 5.98 |
| Image height | 13.66 | 13.66 | 13.66 |
| Total lens length | 140.52 | 160.20 | 190.00 |
| BF | 35.60 | 56.40 | 71.56 |
| d6 | 0.90 | 21.92 | 42.41 |
| d13 | 26.18 | 6.70 | 1.50 |
| d15 | 2.83 | 4.19 | 8.87 |
| d17 | 7.09 | 5.73 | 1.05 |
| d26 | 4.80 | 2.15 | 1.50 |

Zoom lens unit data

| Lens unit | Beginning surface | Focal length | Lens configuration length | Front principal point position | Rear principal point position |
|---|---|---|---|---|---|
| 1 | 1 | 88.69 | 17.53 | 5.86 | −5.78 |
| 2 | 7 | −17.44 | 18.06 | 1.34 | −11.69 |
| 3 | 14 | 45.02 | 1.95 | 0.66 | −0.44 |
| 4 | 16 | −36.12 | 0.70 | 0.02 | −0.35 |
| 5 | 18 | 37.72 | 20.89 | −21.54 | −23.56 |
| 6 | 27 | 31.24 | 3.99 | 1.85 | −0.54 |

Numerical Example 2

| Unit mm | | | | | |
|---|---|---|---|---|---|
| Surface data | | | | | |
| Surface number | r | d | nd | vd | Effective diameter |
| 1 | ∞ | 1.50 | | | 50.25 |
| 2 | 57.445 | 4.55 | 1.60311 | 60.6 | 41.82 |
| 3 | 219.037 | 0.50 | | | 39.96 |
| 4 | 36.443 | 1.45 | 1.83481 | 42.7 | 32.01 |
| 5 | 14.175 | 7.58 | | | 24.39 |
| 6 | −619.065 | 1.20 | 1.77250 | 49.6 | 24.02 |
| 7 | 25.691 | 3.98 | | | 22.57 |
| 8 | 23.423 | 4.90 | 1.80518 | 25.4 | 22.94 |
| 9 | 200.752 | 1.10 | 1.80400 | 46.6 | 21.98 |
| 10 | 41.851 | (variable) | | | 21.04 |
| 11 | −229.585 | 1.73 | 1.60311 | 60.6 | 13.06 |
| 12 | −34.650 | (variable) | | | 13.21 |
| 13 | −32.574 | 0.70 | 1.83400 | 37.2 | 13.12 |
| 14 | −276.813 | (variable) | | | 13.34 |
| 15 | 28.173 | 3.13 | 1.63854 | 55.4 | 13.98 |
| 16 | −53.605 | 1.04 | | | 13.99 |
| 17(stop) | ∞ | 3.30 | | | 13.66 |
| 18 | 22.851 | 4.24 | 1.60311 | 60.6 | 13.49 |
| 19 | −21.794 | 0.75 | 1.85026 | 32.3 | 12.87 |
| 20 | −162.935 | 2.71 | | | 12.64 |
| 21 | −40.305 | 0.70 | 1.74950 | 35.3 | 11.89 |
| 22 | 15.099 | 1.99 | 1.84666 | 23.8 | 11.81 |
| 23 | 25.535 | (variable) | | | 11.71 |
| 24* | 103.888 | 3.69 | 1.58313 | 59.4 | 14.34 |
| 25 | −22.955 | | | | 15.38 |

Aspheric surface data

24th surface $K = 0.00000e+000$    $A4 = -2.73707e-005$    $A6 = -2.63537e-008$
$A8 = 1.01748e-009$    $A10 = -1.40793e-011$    $A12 = -1.53554e-022$ Various data Zoom ratio 2.42

| | Wide-angle | Middle | Telephoto |
|---|---|---|---|
| Focal length | 18.59 | 24.00 | 45.00 |
| F-number | 3.59 | 4.06 | 5.95 |
| Angle of view | 36.31 | 29.65 | 16.89 |
| Image height | 13.66 | 13.66 | 13.66 |
| Total lens length | 118.97 | 117.26 | 127.42 |
| BF | 35.70 | 42.77 | 68.38 |
| d10 | 23.35 | 15.60 | 2.10 |
| d12 | 3.02 | 3.73 | 3.73 |
| d14 | 1.88 | 1.16 | 1.17 |
| d23 | 4.27 | 3.24 | 1.30 |

Zoom lens unit data

| Lens unit | Beginning surface | Focal length | Lens configuration length | Front principal point position | Rear principal point position |
|---|---|---|---|---|---|
| 1 | 1 | −24.19 | 26.76 | 10.07 | −10.77 |
| 2 | 11 | 67.44 | 1.73 | 1.26 | 0.19 |
| 3 | 13 | −44.32 | 0.70 | −0.05 | −0.43 |
| 4 | 15 | 32.81 | 17.87 | −13.46 | −18.43 |
| 5 | 24 | 32.59 | 3.69 | 1.93 | −0.43 |

Numerical Example 3

| | | Unit mm | | | |
|---|---|---|---|---|---|
| | | Surface data | | | |
| Surface number | r | d | nd | vd | Effective diameter |
| 1 | ∞ | 1.50 | | | 59.50 |
| 2 | 136.714 | 1.90 | 1.84666 | 23.8 | 57.10 |
| 3 | 61.723 | 8.41 | 1.49700 | 81.5 | 54.57 |
| 4 | −712.008 | 0.15 | | | 53.99 |
| 5 | 55.292 | 6.38 | 1.77250 | 49.6 | 51.49 |
| 6 | 218.242 | (variable) | | | 50.63 |
| 7 | 239.607 | 1.45 | 1.83481 | 42.7 | 30.66 |
| 8 | 14.432 | 7.38 | | | 22.80 |
| 9 | −44.308 | 1.20 | 1.77250 | 49.6 | 22.69 |
| 10 | 71.255 | 0.15 | | | 22.79 |
| 11 | 30.488 | 5.77 | 1.84666 | 23.8 | 23.27 |
| 12 | −48.245 | 1.10 | 1.83481 | 42.7 | 22.82 |
| 13 | 105.391 | (variable) | | | 22.15 |
| 14 | 114.988 | 2.94 | 1.83481 | 42.7 | 20.08 |
| 15 | −38.856 | (variable) | | | 19.84 |
| 16 | −42.545 | 0.70 | 1.80610 | 40.9 | 18.21 |
| 17 | 104.476 | (variable) | | | 17.74 |
| 18 | 20.554 | 3.70 | 1.53996 | 59.5 | 15.88 |
| 19 | −92.362 | 1.18 | | | 15.50 |
| 20(stop) | ∞ | 3.30 | | | 14.91 |
| 21 | 25.900 | 4.34 | 1.48749 | 70.2 | 14.11 |
| 22 | −21.604 | 0.75 | 1.84666 | 23.8 | 13.39 |
| 23 | −213.343 | 3.09 | | | 13.20 |
| 24 | −46.278 | 0.70 | 1.76200 | 40.1 | 12.48 |
| 25 | 19.900 | 2.11 | 1.84666 | 23.8 | 12.47 |
| 26 | 52.323 | (variable) | | | 12.42 |
| 27* | 114.978 | 3.14 | 1.58313 | 59.4 | 15.12 |
| 28 | −31.788 | | | | 15.82 |

Aspheric surface data

27th surface

K = 0.00000e+000   A4 = −3.32763e−005   A6 = 7.41615e−008
A8 = −3.14564e−009   A10 = 4.14055e−011   A12 = −2.46577e−013

Various data

Zoom ratio 7.05

| | Wide-angle | Middle | Telephoto |
|---|---|---|---|
| Focal length | 18.59 | 50.00 | 131.00 |
| F-number | 3.51 | 4.71 | 5.88 |
| Angle of view | 36.31 | 15.28 | 5.95 |
| Image height | 13.66 | 13.66 | 13.66 |
| Total lens length | 138.97 | 159.44 | 187.88 |
| BF | 35.70 | 55.36 | 72.74 |
| d6 | 1.00 | 22.00 | 40.44 |
| d13 | 7.85 | 6.05 | 1.52 |
| d15 | 2.91 | 4.71 | 9.25 |
| d17 | 23.69 | 7.04 | 1.05 |
| d26 | 6.47 | 2.94 | 1.55 |

Zoom lens unit data

| Lens unit | Beginning surface | Focal length | Lens configuration length | Front principal point position | Rear principal point position |
|---|---|---|---|---|---|
| 1 | 1 | 84.91 | 18.34 | 6.47 | −5.44 |
| 2 | 7 | −15.06 | 17.05 | 2.01 | −10.00 |
| 3 | 14 | 35.09 | 2.94 | 1.21 | −0.41 |
| 4 | 16 | −37.43 | 0.70 | 0.11 | −0.27 |
| 5 | 18 | 41.45 | 19.18 | −15.02 | −21.67 |
| 6 | 27 | 43.05 | 3.14 | 1.56 | −0.43 |

Numerical Example 4

| | | Unit mm | | | |
|---|---|---|---|---|---|
| | | Surface data | | | |
| Surface number | r | d | nd | vd | Effective diameter |
| 1 | ∞ | 1.50 | | | 64.10 |
| 2 | 127.922 | 2.00 | 1.84666 | 23.8 | 56.80 |
| 3 | 76.612 | 6.62 | 1.49700 | 81.5 | 55.32 |
| 4 | 1483.135 | 0.15 | | | 54.89 |
| 5 | 66.859 | 5.86 | 1.60738 | 56.8 | 52.97 |
| 6 | 325.080 | (variable) | | | 52.19 |
| 7 | 79.300 | 1.45 | 1.91082 | 35.3 | 34.09 |
| 8 | 15.595 | 8.10 | | | 25.60 |
| 9 | −84.291 | 1.20 | 1.83481 | 42.7 | 25.41 |
| 10 | 42.660 | 1.31 | | | 25.09 |
| 11 | 30.665 | 6.60 | 1.84666 | 23.8 | 25.97 |
| 12 | −61.686 | 1.10 | 1.77250 | 49.6 | 25.43 |
| 13 | 413.544 | (variable) | | | 24.76 |
| 14 | 55.003 | 1.64 | 1.80518 | 25.4 | 14.39 |
| 15 | 1371.106 | (variable) | | | 14.24 |
| 16 | −38.056 | 0.70 | 1.90366 | 31.3 | 13.97 |
| 17 | −408.051 | (variable) | | | 14.24 |
| 18 | 23.610 | 3.66 | 1.60311 | 60.6 | 15.70 |
| 19 | −91.277 | 1.17 | | | 15.49 |
| 20(stop) | ∞ | 2.00 | | | 14.83 |
| 21 | 26.328 | 5.54 | 1.60311 | 60.6 | 14.37 |
| 22 | −23.088 | 0.75 | 1.80000 | 29.8 | 13.27 |
| 23 | −67.471 | 0.99 | | | 12.99 |
| 24 | −65.002 | 0.70 | 1.74950 | 35.3 | 12.45 |
| 25 | 15.384 | 1.91 | 1.77250 | 49.6 | 11.97 |
| 26 | 22.891 | 1.68 | | | 11.65 |
| 27 | 335.732 | 3.52 | 1.66680 | 33.0 | 11.80 |
| 28 | −9.868 | 0.80 | 1.72047 | 34.7 | 11.95 |
| 29 | 630.852 | 0.15 | | | 12.47 |
| 30 | 27.288 | 2.71 | 1.85400 | 40.4 | 12.79 |
| 31* | 110.032 | | | | 12.83 |

Aspheric surface data

31st surface

K = 0.00000e+000   A4 = 2.99992e−005   A6 = −4.29579e−008
A8 = 2.42140e−009   A10 = −2.39016e−011   A12 = −6.58966e−014

Various data

Zoom ratio 5.59

| | Wide-angle | Middle | Telephoto |
|---|---|---|---|
| Focal length | 18.60 | 50.00 | 103.95 |
| F-number | 3.60 | 5.09 | 5.88 |
| Angle of view | 36.29 | 15.28 | 7.49 |
| Image height | 13.66 | 13.66 | 13.66 |
| Total lens length | 140.57 | 159.78 | 190.00 |
| BF | 35.64 | 56.33 | 67.17 |
| d6 | 0.90 | 24.00 | 48.93 |
| d13 | 31.63 | 7.05 | 1.50 |
| d15 | 3.12 | 4.63 | 7.52 |
| d17 | 5.45 | 3.94 | 1.05 |

Zoom lens unit data

| Lens unit | Beginning surface | Focal length | Lens configuration length | Front principal point position | Rear principal point position |
|---|---|---|---|---|---|
| 1 | 1 | 112.03 | 16.13 | 4.60 | −6.23 |
| 2 | 7 | −21.44 | 19.76 | 0.40 | −15.24 |
| 3 | 14 | 71.13 | 1.64 | −0.04 | −0.95 |
| 4 | 16 | −46.49 | 0.70 | −0.04 | −0.41 |
| 5 | 18 | 26.79 | 25.59 | 0.25 | −17.82 |

Numerical Example 5

| | Unit mm | | | | |
|---|---|---|---|---|---|
| | Surface data | | | | |
| Surface number | r | d | nd | vd | Effective diameter |
| 1 | ∞ | 1.50 | | | 64.00 |
| 2 | 95.457 | 2.00 | 1.84666 | 23.8 | 55.24 |
| 3 | 58.651 | 7.76 | 1.49700 | 81.5 | 51.80 |
| 4 | 6401.039 | 0.15 | | | 51.35 |
| 5 | 52.248 | 6.39 | 1.60311 | 60.6 | 49.00 |
| 6 | 239.934 | (variable) | | | 48.07 |
| 7 | 165.361 | 1.45 | 1.91082 | 35.3 | 31.91 |
| 8 | 15.531 | 7.54 | | | 23.98 |
| 9 | −49.402 | 1.20 | 1.77250 | 49.6 | 23.78 |
| 10 | 66.413 | 0.15 | | | 23.65 |
| 11 | 30.087 | 6.94 | 1.84666 | 23.8 | 24.00 |
| 12 | −34.011 | 1.10 | 1.80400 | 46.6 | 23.35 |
| 13 | 87.371 | (variable) | | | 22.18 |
| 14 | 100.574 | 1.83 | 1.80000 | 29.8 | 14.43 |
| 15 | −68.699 | (variable) | | | 14.33 |
| 16 | −34.220 | 0.70 | 1.90366 | 31.3 | 14.10 |
| 17 | 126.844 | 1.50 | 1.84666 | 23.8 | 14.46 |
| 18 | −120.827 | (variable) | | | 14.73 |
| 19 | 22.762 | 3.93 | 1.51633 | 64.1 | 16.22 |
| 20 | −47.446 | 0.83 | | | 15.96 |
| 21(stop) | ∞ | 3.30 | | | 15.30 |
| 22 | 21.131 | 5.11 | 1.60311 | 60.6 | 14.32 |
| 23 | −22.970 | 0.75 | 1.84666 | 23.8 | 13.16 |
| 24 | 34.807 | 3.44 | | | 12.56 |
| 25 | −39.697 | 0.70 | 1.80000 | 29.8 | 12.16 |
| 26 | 11.148 | 3.12 | 1.84666 | 23.8 | 12.29 |
| 27 | 89.644 | (variable) | | | 12.35 |
| 28* | 52.726 | 3.53 | 1.68893 | 31.1 | 14.48 |
| 29 | −45.855 | | | | 15.19 |

Aspheric surface data

28th surface

K = 0.00000e+000   A4 = −3.62046e−005   A6 = −6.64907e−009
A8 = −8.20333e−010   A10 = 3.23308e−012   A12 = 1.82226e−014

Various data

Zoom ratio 6.45

| | Wide-angle | Middle | Telephoto |
|---|---|---|---|
| Focal length | 18.60 | 50.00 | 120.00 |
| F-number | 3.48 | 4.90 | 5.88 |
| Angle of view | 36.29 | 15.28 | 6.49 |
| Image height | 13.66 | 13.66 | 13.66 |
| Total lens length | 140.51 | 161.85 | 190.00 |
| BF | 35.60 | 57.97 | 73.10 |
| d6 | 0.90 | 19.59 | 38.16 |
| d13 | 24.74 | 6.80 | 1.53 |
| d15 | 3.31 | 4.95 | 9.74 |
| d18 | 7.48 | 5.84 | 1.05 |
| d27 | 3.56 | 1.79 | 1.50 |

Zoom lens unit data

| Lens unit | Beginning surface | Focal length | Lens configuration length | Front principal point position | Rear principal point position |
|---|---|---|---|---|---|
| 1 | 1 | 84.52 | 17.79 | 5.05 | −6.91 |
| 2 | 7 | −15.67 | 18.38 | 2.05 | −10.62 |
| 3 | 14 | 51.27 | 1.83 | 0.61 | −0.42 |
| 4 | 16 | −50.94 | 2.20 | −0.41 | −1.61 |
| 5 | 19 | 44.31 | 21.18 | −20.88 | −25.10 |
| 6 | 28 | 36.13 | 3.53 | 1.13 | −0.99 |

TABLE 1

|  |  | numerical example 1 | numerical example 2 | numerical example 3 | numerical example 4 | numerical example 5 |
|---|---|---|---|---|---|---|
|  |  |  |  | Lens type |  |  |
|  |  | PNPNPP | NPNPP | PNPNPP | PNPNP | PNPNPP |
| Condition | Focus | Fourth lens unit | Third lens unit | Third lens unit | Fourth lens unit | Fourth lens unit |
|  | fw | 18.600 | 18.591 | 18.590 | 18.603 | 18.600 |
|  | ft | 130.497 | 45.002 | 131.001 | 103.945 | 120.000 |
|  | Tlw | 140.520 | 118.970 | 138.970 | 140.570 | 140.510 |
|  | bfw | 35.600 | 35.700 | 35.700 | 35.640 | 35.600 |
|  | fn | −36.118 | −44.324 | — | −46.487 | −50.936 |
|  | fp1 | 45.019 | 67.440 | — | 71.126 | 51.269 |
|  | fp2 | 37.720 | 32.810 | — | 26.790 | 44.310 |
|  | Mfnt | −6.581 | −1.879 | — | −5.388 | −7.884 |
|  | Mnz | 6.041 | 0.711 | — | 4.398 | 6.431 |
|  | Dnw | 72.354 | 64.445 | — | 66.609 | 71.340 |
|  | ea_nf | 14.180 | 13.120 | — | 13.970 | 14.100 |
|  | ea_nr | 14.450 | 13.340 | — | 14.240 | 14.730 |
|  | ea_p1r | 14.570 | 13.210 | — | 14.240 | 14.330 |
|  | ea_p2f | 16.080 | 13.980 | — | 15.700 | 16.220 |
|  | okp2 | −23.562 | −18.425 | — | −17.816 | −25.097 |
|  | okw | −29.699 | −24.245 | — | −18.430 | −27.368 |
|  | fp | — | — | 35.090 | — | — |
|  | fn1 | — | — | −15.060 | — | — |
|  | fn2 | — | — | −37.430 | — | — |
|  | Mfpt | — | — | 7.578 | — | — |
|  | Mpz | — | — | −6.336 | — | — |
|  | Dn2w | — | — | 88.097 | — | — |
|  | ea_pf | — | — | 20.080 | — | — |
|  | ea_pr | — | — | 19.840 | — | — |
|  | ea_n1r | — | — | 22.150 | — | — |
|  | ea_n2f | — | — | 18.210 | — | — |
|  | o1w | — | — | 2.140 | — | — |
|  | o1n1 | — | — | 2.011 | — | — |
| (1) | (Dnw − bfw)/(Tlw − bfw) | 0.350 | 0.345 | — | 0.295 | 0.341 |
| (2) | −Mnz/Mfnt | 0.918 | 0.379 | — | 0.816 | 0.816 |
| (3) | −fp1/fn | 1.246 | 1.522 | — | 1.530 | 1.007 |
| (4) | −fp2/fn | 1.044 | 0.740 | — | 0.576 | 0.870 |
| (5) | ea_p1r/ea_nf | 1.028 | 1.007 | — | 1.019 | 1.016 |
| (6) | ea_p2f/ea_nr | 1.113 | 1.048 | — | 1.103 | 1.101 |
| (7) | (okw − okp2)/fp2 | 0.163 | 0.177 | — | 0.023 | 0.051 |
| (8) | βnw | −0.269 | 0.079 | — | −0.024 | −0.088 |
| (9) | βnt | −0.005 | 0.325 | — | 0.195 | 0.215 |
| (10) | (Dn2w − bfw)/(Tlw − bfw) | — | — | 0.507 | — | — |
| (11) | −Mpz/Mfpt | — | — | 0.836 | — | — |
| (12) | −fn1/fp | — | — | 0.429 | — | — |
| (13) | −fn2/fp | — | — | 1.067 | — | — |
| (14) | ea_n1r/ea_pf | — | — | 1.103 | — | — |
| (15) | ea_n2f/ea_pr | — | — | 0.918 | — | — |
| (16) | (o1w − o1n1)/fn1 | — | — | 0.009 | — | — |
| (17) | βn2w | — | — | −0.084 | — | — |
| (18) | βn2t | — | — | −0.095 | — | — |

A zoom lens according to another exemplary embodiment of the invention includes first through fourth lens units and a rear group in order from the object side to the image side. The first lens unit has positive refractive power. The second lens unit has negative refractive power. The third lens unit has positive refractive power. The fourth lens unit has negative refractive power. The rear group includes one or more lens units and has positive refractive power as a whole. The lens units move during zooming. At least the fourth lens unit moves during focusing.

FIG. 11 is a sectional view of a zoom lens according to the sixth exemplary embodiment of the invention at a wide-angle end. FIGS. 12A, 12B, 12C, and 12D are aberration diagrams of the zoom lens according to the sixth exemplary embodiment at wide-angle end and a telephoto end during focusing on an infinitely distant object and a closest object (shooting distance of 420 mm). The shooting distance of 420 mm represents a numeric value of the numerical example (to be described) in units of millimeters. The same applies to the description below.

FIG. 13 is a sectional view of a zoom lens according to the seventh exemplary embodiment of the invention at a wide-angle end. FIGS. 14A, 14B, 14C, and 14D are aberration diagrams of the zoom lens according to the seventh exemplary embodiment at wide-angle end and a telephoto end during focusing on an infinitely distant object and a closest object (shooting distance of 420 mm).

Figure 15:
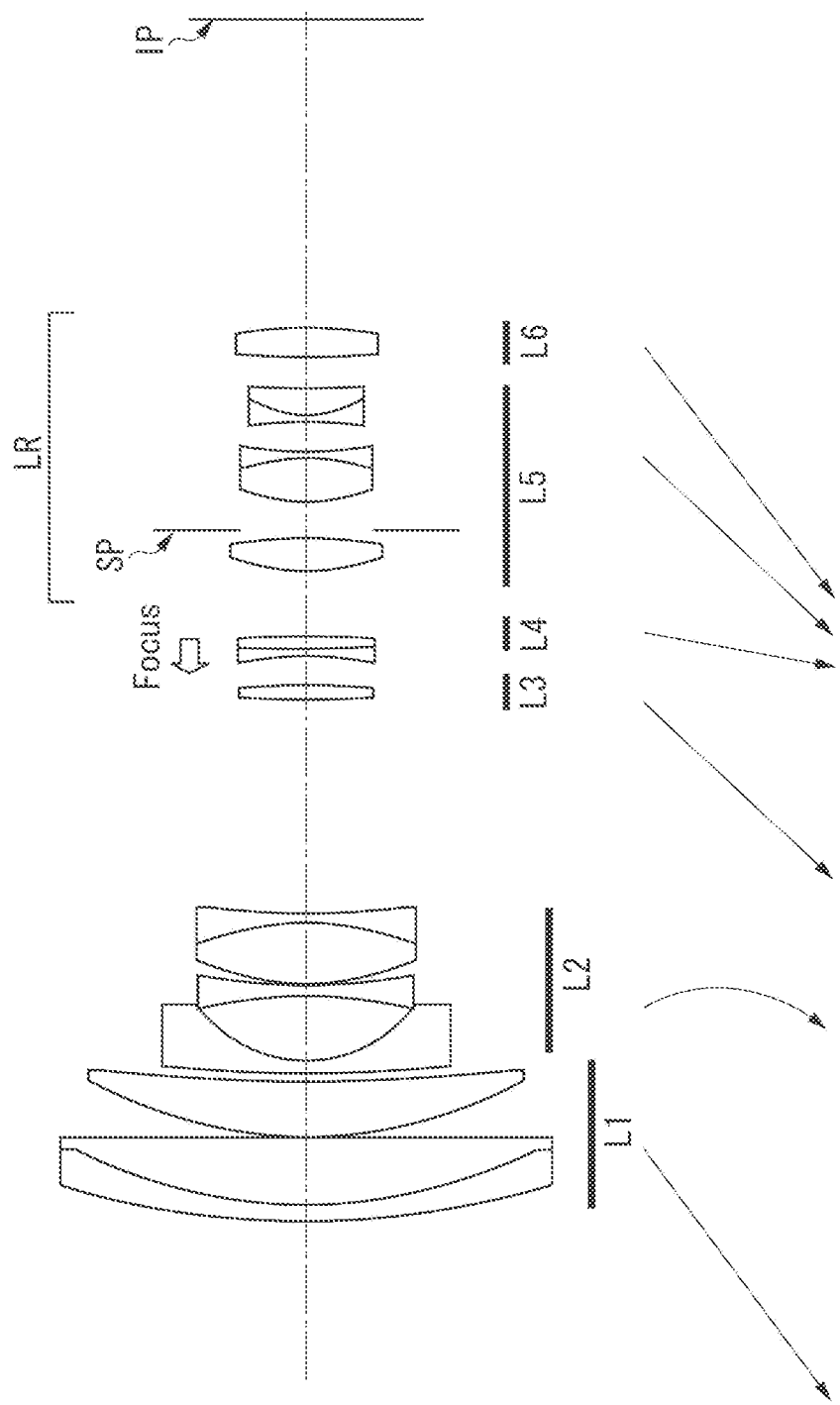
FIG. 15 is a sectional view of a zoom lens according to an eighth exemplary embodiment of the invention at a wide-angle end.
Figure 16B:
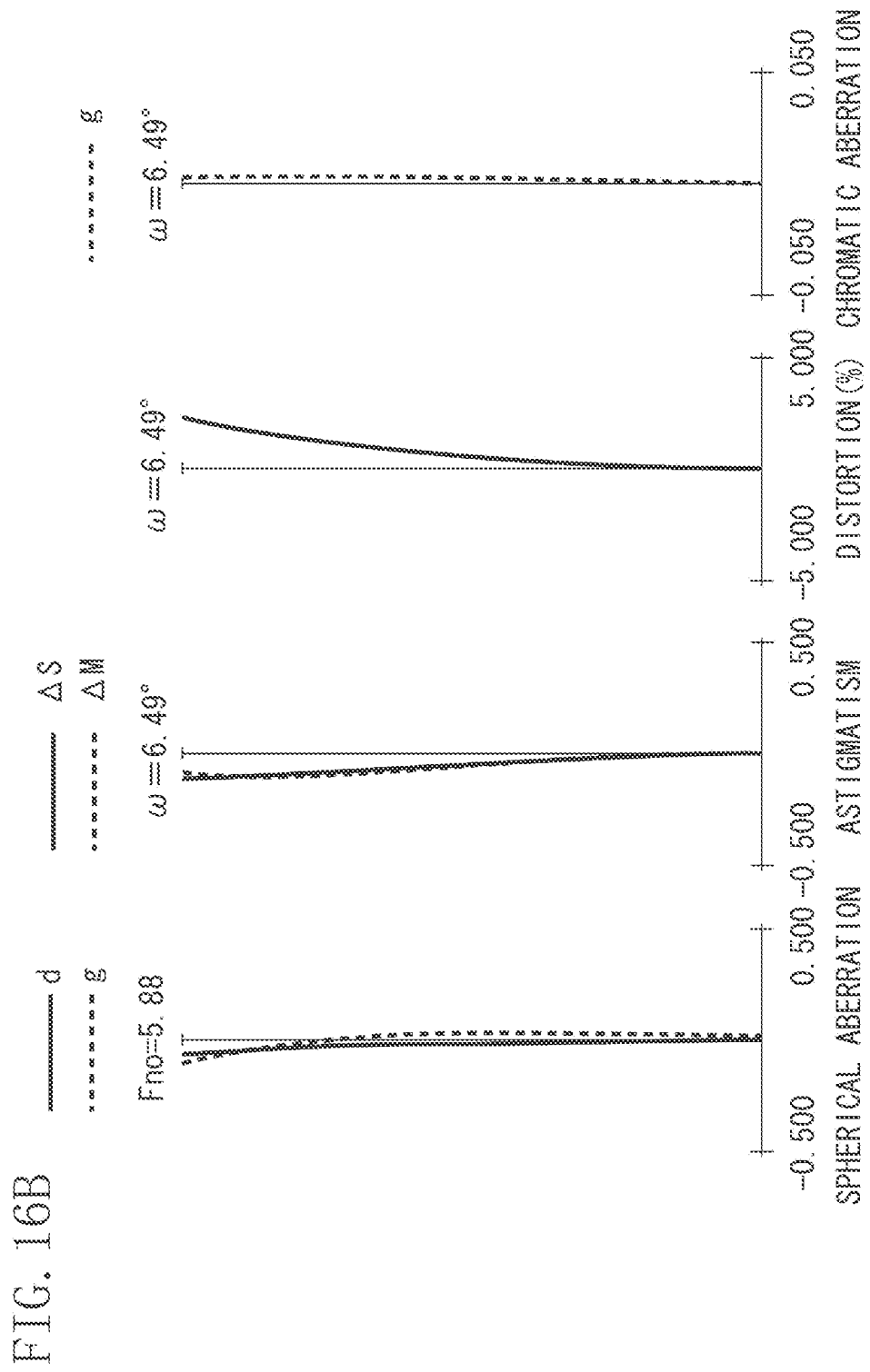

FIG. 15 is a sectional view of a zoom lens according to the eighth exemplary embodiment of the invention at a wide-angle end. FIGS. 16A, 16B, 16C, and 16D are aberration diagrams of the zoom lens according to the eighth exemplary embodiment at wide-angle end and a telephoto end during focusing on an infinitely distant object and a closest object (shooting distance of 420 mm).

FIG. 17 is a sectional view of a zoom lens according to the ninth exemplary embodiment of the invention at a wide-angle end. FIGS. 18A, 18B, 18C, and 18D are aberration diagrams of the zoom lens according to the ninth exemplary embodiment at wide-angle end and a telephoto end during focusing on an infinitely distant object and a closest object (shooting distance of 420 mm).

Figure 19:
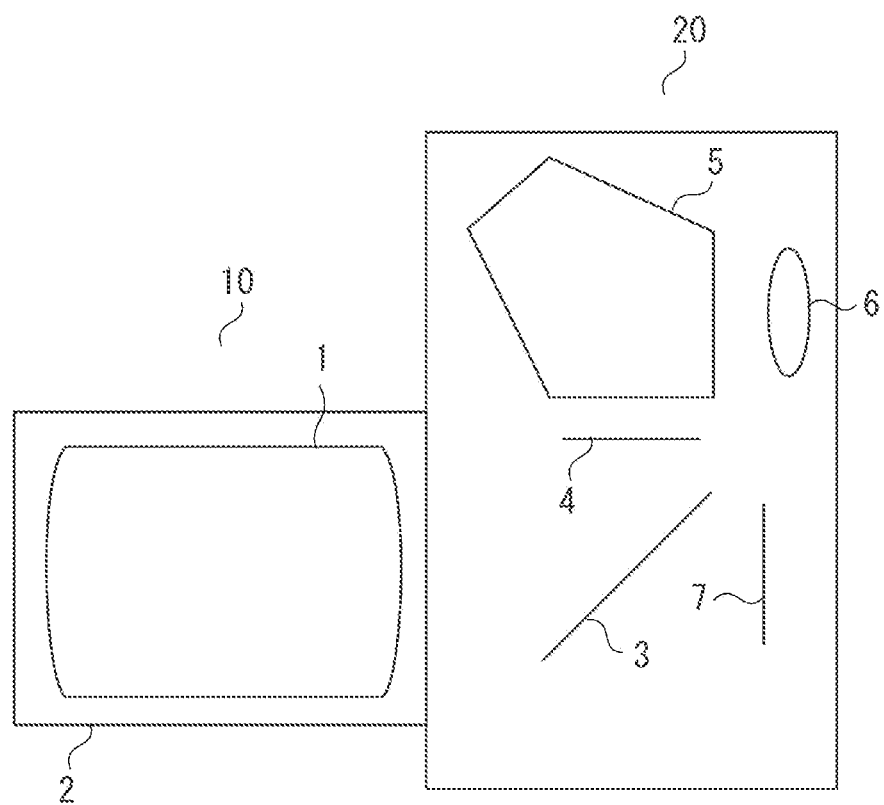
FIG. 19 is a schematic diagram illustrating principal components of an image pickup apparatus according to an exemplary embodiment of the invention.

FIG. 19 is a schematic diagram illustrating principal components of a single-lens reflex camera (image pickup apparatus) equipped with the zoom lens according to an exemplary embodiment of the invention.

The zoom lens in each exemplary embodiment represents a photographic lens system (optical system) used for an image pickup apparatus such as a video camera, a digital camera, or a silver-halide film camera. In the sectional views, the left side represents an object side (front) and the right side represents an image side (rear). In the sectional views, the i-th lens unit is represented as Li counted from the object side.

First through sixth lens units are represented as L1 through L6, respectively. The first lens unit L1 has positive refractive power. The second lens unit L2 has negative refractive power. The third lens unit L3 has positive refractive power. The fourth lens unit L4 has negative refractive power. The fifth lens unit L5 has positive refractive power. The sixth lens unit L6 has positive refractive power. The rear group LR includes one or more lens units and has positive refractive power as a whole.

An aperture stop is represented as SP. Image plane IP is equivalent to an imaging plane of a solid-state image sensor (photoelectric conversion element) such as a CCD sensor or a CMOS sensor if the zoom lens is used for the photographic optical system such as a video camera or a digital still camera. An arrow represents a moving locus of each lens unit during zooming from the wide-angle end to the telephoto end.

The sixth, eighth, and ninth exemplary embodiments include the first lens unit L1, the second lens unit L2, the third lens unit L3, the fourth lens unit L4, the fifth lens unit L5, and the sixth lens unit L6. The first lens unit L1 has positive refractive power. The second lens unit L2 has negative refractive power. The third lens unit L3 has positive refractive power. The fourth lens unit L4 has negative refractive power. The fifth lens unit L5 includes the aperture stop SP and has positive refractive power. The sixth lens unit L6 has positive refractive power. During zooming from the wide-angle end to the telephoto end, the first lens unit L1 and the third lens unit L3 through the sixth lens unit L6 move toward the object side. The second lens unit L2 moves along a locus that is convex toward the image side.

According to the sixth and eighth exemplary embodiments, the fourth lens unit L4 moves toward the object side as indicated by the arrow during focusing from an infinitely distant object to a closest object. According to the ninth exemplary embodiment, as indicated by the arrows, the third lens unit L3 moves toward the image side and the fourth lens unit L4 moves toward the object side in the reverse direction along the optical axis.

The seventh exemplary embodiment includes the first lens unit L1, the second lens unit L2, the third lens unit L3, the fourth lens unit L4, and the fifth lens unit L5 in order from the object side to the image side. The first lens unit L1 has positive refractive power. The second lens unit L2 has negative refractive power. The third lens unit L3 has positive refractive power. The fourth lens unit L4 has negative refractive power. The fifth lens unit L5 includes the aperture stop SP and has positive refractive power. During zooming from the wide-angle end to the telephoto end, the first lens unit L1 and the third lens unit L3 through the fifth lens unit L5 move toward the object side. The second lens unit L2 moves along a locus that is convex toward the image side. The fourth lens unit L4 moves toward the object side as indicated by the arrow during focusing from an infinitely distant object to a closest object.

As an aberration diagrams, a spherical aberration diagram illustrates a d-line (solid line) and a g-line (broken line). In an astigmatism diagram, a broken line represents meridional image plane ΔM with respect to d-line. A solid line represents sagittal image plane ΔS with respect to d-line. A diagram illustrating distortion is associated with the d-line. Lateral chromatic aberration is associated with the g-line. An F-number is represented as Fno. A half angle of view is represented as ω. In the exemplary embodiments described below, the wide-angle end and the telephoto end correspond to zoom positions reached when a zoom lens unit is mechanically positioned to the respective ends of a movable range along the optical axis.

The four-unit zoom lens according to U.S. Pat. No. 6,556,356 includes the large second lens unit as a focus lens unit and hampers fast focusing. An axial ray incident on the second lens unit is higher at the telephoto end than at the wide-angle end. Focusing on a closest object side excessively shortens the focal length at the telephoto end only. The zoom ratio at the closest object side is smaller than that for an infinitely distant object.

Generally, a closest object can maximize a photographic magnification for the optical system at the telephoto end. However, the zoom lens discussed in U.S. Pat. No. 6,556,356 decreases a distance between the first and second lens units and shortens the focal length. Accordingly, an angle of photographic view increases to decrease the maximum photographic magnification for the optical system.

The five-unit zoom lens discussed in Japanese Patent Application Laid-Open No. 2001-033697 changes an axial beam to a converged beam at the image side for the third lens unit. An off-axis principal ray increases the height of incidence, where the fourth lens unit is disposed. Accordingly, focusing tends to increase aberration variations. The third lens unit maintains high positive refractive power. The fourth lens unit having negative refractive power and the fifth lens unit having positive refractive power cause very low composite refractive power. The principal point of the composite lens unit including the third through fifth lens units is positioned distant from the image side.

As a result, the object side is given a negative refractive power and the image side is given a positive refractive power to weaken the retrofocus refractive power arrangement. A wide viewing angle tends to be hardly available.

The 5-unit zoom lens discussed in U.S. Patent Application Publication No. 2010/0091170 increases the negative refractive power of the third lens unit as a focus lens unit to suppress the amount of movement during focusing. The front principal point position of an adjacent composite lens unit having negative refractive power then moves toward the third lens unit if the composite lens unit includes the second and third lens units each having negative refractive power. This is equivalent to increasing a distance between the first lens unit and the second lens unit as a variator at the wide-angle end of a four-unit zoom lens that includes four lens units having positive, negative, positive, and positive refractive powers. A wide viewing angle is hardly available.

The 5-unit zoom lens discussed in U.S. Patent Application Publication No. 2010/0091171 increases the refractive power of the third lens unit as a focus lens unit to decrease the amount of movement during focusing. The rear principal point position of a composite lens unit having positive refractive power then moves toward the third lens unit if the composite lens unit includes the third and adjacent fourth lens units having positive refractive power. This hampers ensuring a specified length of back focus at the wide-angle end.

The zoom lens according to an exemplary embodiment of the invention includes first through fourth lens units and a rear group in order from the object side to the image side. The first lens unit has positive refractive power. The second lens unit has negative refractive power. The third lens unit has positive refractive power. The fourth lens unit has negative refractive power. The rear group includes one or more lens units and has positive refractive power as a whole. The image side of the third lens unit is configured to be afocal so that conditions (19) and (20) to be described are satisfied. The small, lightweight fourth lens unit performs focusing. The distance between the first and second lens units greatly contributes to zooming and remains unchanged during focusing. This alleviates a decrease in the magnification ratio and the maximum photographic magnification at the closest object side.

A high negative refractive power can be easily acquired by sandwiching the fourth lens unit having negative refractive power between the third lens unit and the rear group LR each having positive refractive power. The maximum amount of movement during focusing is decreased to easily miniaturize the entire zoom lens. The image side of the third lens unit is made afocal to decrease the height of incidence for an axial ray on the fourth lens unit during focusing. A change in the object distance decreases a variation in the spherical aberration or the axial chromatic aberration.

The light exiting from the fourth lens unit having negative refractive power becomes a divergent beam because the image side of the third lens unit is afocal. To converge the beam, the rear group at the image side generates a high positive refractive power. The retrofocus refractive power arrangement can be easily provided to easily enable a wide viewing angle. The fourth lens unit is disposed at a position where the off-axis principal ray causes a relatively small height of incidence. A change in the object distance easily decreases a variation in off-axis aberration such as the curvature of field and the lateral chromatic aberration.

As described above, the zoom lens according to the present exemplary embodiment of the invention provides excellent optical performance over full zoom and focus ranges while maintaining the small, lightweight focusing mechanism.

The following describes zoom lenses according to the exemplary embodiments. In the exemplary embodiments, focal length ft is assumed at the telephoto end for the entire zoom lens. Composite focal length $f_{123}t$ is assumed between the first lens unit L1 and the third lens unit L3 at the telephoto end. Then, the following condition is satisfied:

$$|ft/f_{123}t|<0.6 \tag{19}$$

According to the exemplary embodiments, the fourth lens unit L4 having negative refractive power is sandwiched between the third lens unit L3 and the rear group LR each having positive refractive power. The negative refractive power can be easily increased. The amount of focusing movement is decreased to easily miniaturize the entire zoom lens. Satisfying condition (19) makes the image side of the third lens unit L3 afocal. The fourth lens unit L4 decreases a variation in the height of incidence for an axial ray during focusing. A change in the object distance decreases a variation in the axial aberration.

The fourth lens unit L4 is disposed between the third lens unit L3 and the rear group LR having positive refractive power at a position where the off-axis principal ray causes a relatively small height of incidence. As a result, a variation in the off-axis aberration is decreased.

If the left side of condition (19) deviates in the positive direction, the positive refractive power of up to the third lens unit L3 increases to cause a converged beam at the image side of the third lens unit L3. As a result, an axial ray incident on the fourth lens unit L4 increases a variation in the object distance for the height of incidence. In addition, the refractive power is already converged up to the third lens unit L3. The rear group LR cannot increase the positive refractive power at the image side. The retrofocus refractive power arrangement is unbalanced to hamper providing a wide viewing angle and miniaturizing the entire zoom lens.

If the left side of condition (19) deviates in the negative direction, the negative refractive power of up to the third lens unit L3 increases to cause a divergent beam at the image side of the third lens unit L3. The negative refractive power of the fourth lens unit L4 cannot increase. The amount of focusing movement increases to increase the size of the entire zoom lens size. More advantageously, the values in condition (19) can satisfy condition (19a) below:

$$|ft/f_{123}t|<0.5 \tag{19a}$$

The above-mentioned exemplary embodiments can provide the zoom lens that features excellent optical performance over full zoom and focus ranges while maintaining the small, lightweight design as the entire zoom lens.

More advantageously, the exemplary embodiments can satisfy one or more of the following conditions. Focal length fw is assumed at the wide-angle end for the entire zoom lens. Composite focal length $f_{123}w$ is assumed between the first lens unit L1 and the third lens unit L3 at the wide-angle end. The fourth lens unit L4 is assumed to have lateral magnifications β4w and β4t at the wide-angle end and the telephoto end, respectively. Composite focal lengths $f_{12}w$ and $f_{12}t$ are assumed between the first lens unit L1 and the second lens unit L2 at the wide-angle end and the telephoto end, respectively. The third lens unit L3 is assumed to have focal length f3.

The rear group LR is assumed to have composite focal lengths fpw and fpt at the wide-angle end and the telephoto end, respectively. Focal length f4 is assumed for the fourth lens unit L4. The maximum amount of movement Mft is assumed during focusing of the fourth lens unit L4 at the telephoto end. Movement from the object side to the image side is assumed positive. The amount of movement Mft applies to focusing from an infinitely distant object to a closest object (shooting distance of 420 mm).

The amount of change in the distance Mz is assumed between the third lens unit L3 and the fourth lens unit L4 during zooming from the wide-angle end to the telephoto end. A decrease in the distance is assumed positive. In this case, one of the following conditions can be satisfied:

$$|fw/f_{123}w|<0.5 \tag{20}$$

$$|β4w|<1.0 \tag{21}$$

$$|β4t|<1.0 \tag{22}$$

$$0.3<-f_{12}w/f3<2.0 \tag{23}$$

$$0.3 < -f_{12}t/f3 < 2.0 \quad (24)$$

$$0.40 < -fpw/f4 < 0.95 \quad (25)$$

$$0.40 < -fpt/f4 < 0.95 \quad (26)$$

$$0.3 < -Mz/Mft < 1.0 \quad (27)$$

The following describes technical significances of these conditions. Condition (20) can be advantageously configured similar to condition (19) at the wide-angle end as well as telephoto end. This enables easily decreasing a variation in the axial aberration and the off-axis aberration during focusing at the wide-angle end also.

Satisfying condition (21) can more advantageously establish an afocal relationship between the third lens unit L3 and the fourth lens unit L4. This can easily decrease a variation in the axial aberration during focusing. Deviation from condition (21) unbalances an afocal relationship between the third lens unit L3 and the fourth lens unit L4. Focusing increases a variation in the spherical aberration or the axial chromatic aberration.

Condition (22) can be configured similar to condition (22) at the telephoto end as well as the wide-angle end. This can approximate the relationship between the third lens unit L3 and the fourth lens unit L4 to being afocal. A variation in the axial aberration can be easily decreased during focusing.

Conditions (23) and (24) concern refractive powers of the lens units for efficiently establishing an afocal relationship between the third lens unit L3 and the fourth lens unit L4. Deviation from the upper limits for conditions (23) and (24) converges a beam at the image side from the third lens unit L3. Deviation from the lower limits for conditions (23) and (24) diverges a beam at the image side from the third lens unit L3. As a result, an axial ray incident on the fourth lens unit L4 greatly changes the height of incidence during focusing and increases a variation in the spherical aberration or the axial chromatic aberration.

Conditions (25) and (26) are used when the fourth lens unit L4 diverges an afocal beam and again converges the beam on the image plane. Conditions (25) and (26) thereby effectively miniaturize the entire zoom lens. Conditions (25) and (26) are used when the fourth lens unit L4 having negative refractive power diverges a beam at the wide-angle end and the telephoto end and the rear group LR having positive refractive power forms an image on the image plane. Conditions (25) and (26) thereby miniaturize the entire zoom lens and provide excellent optical performance.

Deviation from the upper limits for conditions (25) and (26) excessively decreases the convergent positive refractive power of the rear group LR and increases the entire zoom lens size. Deviation from the lower limits for the same excessively increases the convergent positive refractive power thereof and increases the spherical aberration.

Condition (27) concerns the amount of movement of the fourth lens unit L4 at the telephoto end during focusing and concerns a ratio of the amount of change in the distance between the third lens unit L3 and the fourth lens unit L4 during zooming from wide-angle end to the telephoto end. Deviation from the upper limit for condition (27) leaves too long a distance between the third lens unit L3 and the fourth lens unit L4 compared to the amount of focusing for the fourth lens unit L4 and increases the entire zoom lens size. Deviation from the lower limit for condition (27) excessively decreases the amount of zooming movement at the telephoto end compared to the amount of focusing for the fourth lens unit L4 and increases loads on the lens units. High performance is hardly ensured. More advantageously, conditions (20) through (27) can be set to the following numeric values:

$$|fw/f_{123}w| < 0.4 \quad (20a)$$

$$|\beta 4w| < 0.5 \quad (21a)$$

$$|\beta 4t| < 0.5 \quad (22a)$$

$$0.35 < -f_{12}w/f3 < 1.50 \quad (23a)$$

$$0.5 < -f_{12}t/f3 < 1.7 \quad (24a)$$

$$0.5 < -fpw/f4 < 0.9 \quad (25a)$$

$$0.5 < -fpt/f4 < 0.9 \quad (26a)$$

$$0.60 < -Mz/Mft < 0.96 \quad (27a)$$

The above-mentioned exemplary embodiments can provide excellent optical performance over full zoom and focus ranges while maintaining the small, lightweight design as the entire zoom lens. The exemplary embodiments can fully ensure a magnification ratio and a photographic magnification at the closest object side and provide the zoom lens having the small, lightweight focus mechanism capable of streamlined wobbling.

The following describes the other features of the exemplary embodiments. More advantageously, the fourth lens unit L4 can be limited to using two or less lenses for faster focusing and a simplified wobbling mechanism.

The lens units can move for zooming from the wide-angle end to the telephoto end to increase the distance between the first lens unit L1 and the second lens unit L2, decrease the distance between the second lens unit L2 and the third lens unit L3, increase the distance between the third lens unit L3 and the fourth lens unit L4, and decrease the distance between the fourth lens unit L4 and the third lens unit L3. As a result, efficient zooming is easily available.

The rear group LR can include the fifth lens unit L5 and the sixth lens unit L6 each having positive refractive power in order from the object side to the image side or include the fifth lens unit L5 having positive refractive power. The configuration easily provides a high zoom ratio. The third lens unit L3 and the fifth lens unit L5 can move together during zooming. The drive mechanism can be easily simplified.

The third lens unit L3 as well as the fourth lens unit L4 can move together during focusing. This can more easily correct variations in aberrations due to a change in the object distance. The lens unit according to the exemplary embodiments ranges from the frontmost surface of the optical system to the rearmost surface thereof. Alternatively, the lens unit ranges from a surface having a distance from a forward adjacent lens to a surface having a distance from a backward adjacent lens while each of the distances varies with zooming or focusing.

The following describes numerical examples 6 to 9 corresponding to the sixth through ninth exemplary embodiments. In the numerical examples, the i-th surface is sequentially counted from the object side. In the numerical examples, the radius of curvature ri is assumed for the i-th lens surface sequentially counted from the object side. Lens thickness and air distance di is assumed for the i-th lens sequentially counted from the object side. Refractive index ndi and Abbe number vdi are assumed for a material of the i-th lens sequentially counted from the object side. BF denotes a back focus. An aspheric shape is assumed to have the X-axis in the optical axis direction and the H-axis perpendicular to the optical axis. The direction of light travel is assumed positive. The aspheric shape is assumed to have a paraxial radius of curvature r and aspheric coefficients A4, A6, A8, A10, and A12. Then, the aspheric shape is expressed as follows:

$$X = \frac{H^2/r}{1+(1-(H/r)^2)^{1/2}} + A4 \cdot H^4 + A6 \cdot H^6 + A8 \cdot H^8 + A10 \cdot H^{10} + A12 \cdot H^{12}$$

In each aspheric coefficient, e−x denotes $10^{-x}$. In addition to specifications such as the focal length and the F-number, the angle of view is equivalent to a half angle of view for the entire zoom lens. The image height is equivalent to the maximum image height that determines the half angle of view. The total lens length represents a distance between the first lens surface and the image plane. Back focus BF represents a length between the last lens surface and the image plane. Each lens unit data contains the focal length, the length along the optical axis, the front principal point position, and the rear principal point position of each lens unit. Distance d between optical surfaces is occasionally represented as (variable). In this case, the distance varies during zooming. An appendix provides surface distances corresponding to focal lengths.

Surface number 1 represents a dummy surface used for the design. The dummy surface is excluded from the zoom lens. Table 2 lists calculation results of the conditions based on the lens data according to the numerical examples 6 to 9 described below.

Numerical Example 6

Unit mm

Surface data

| Surface number | r | d | nd | vd | Effective diameter |
|---|---|---|---|---|---|
| 1 | ∞ | 1.50 | | | 60.02 |
| 2 | 111.698 | 2.00 | 1.84666 | 23.9 | 52.66 |
| 3 | 55.370 | 7.65 | 1.49700 | 81.5 | 50.01 |
| 4 | 3384.032 | 0.15 | | | 49.68 |
| 5 | 53.774 | 6.23 | 1.66672 | 48.3 | 48.11 |
| 6 | 295.614 | (variable) | | | 47.31 |
| 7 | 152.605 | 1.45 | 1.91082 | 35.3 | 30.90 |
| 8 | 15.649 | 7.30 | | | 23.59 |
| 9 | −48.289 | 1.20 | 1.77250 | 49.6 | 23.35 |
| 10 | 64.582 | 0.29 | | | 23.25 |
| 11 | 31.507 | 6.72 | 1.84666 | 23.8 | 23.64 |
| 12 | −34.468 | 1.10 | 1.77250 | 49.6 | 23.08 |
| 13 | 145.612 | (variable) | | | 22.11 |
| 14 | 87.716 | 1.95 | 1.78472 | 25.7 | 14.57 |
| 15 | −58.571 | (variable) | | | 14.57 |
| 16 | −34.608 | 0.70 | 1.90366 | 31.3 | 14.18 |
| 17 | 579.002 | (variable) | | | 14.45 |
| 18 | 22.161 | 4.00 | 1.60311 | 60.6 | 16.08 |
| 19 | −55.101 | 1.61 | | | 15.76 |
| 20(stop) | ∞ | 3.30 | | | 14.77 |
| 21 | 30.440 | 4.91 | 1.60311 | 60.6 | 13.77 |
| 22 | −17.452 | 0.75 | 1.84666 | 23.8 | 12.84 |
| 23 | −494.346 | 3.07 | | | 12.52 |
| 24 | −24.672 | 0.70 | 1.80000 | 29.8 | 11.77 |
| 25 | 13.389 | 2.54 | 1.84666 | 23.8 | 11.95 |
| 26 | 53.386 | (variable) | | | 12.01 |
| 27* | 94.305 | 3.99 | 1.68893 | 31.1 | 15.40 |
| 28 | −27.400 | | | | 16.47 |

Aspheric surface data

27th surface

K = 0.00000e+000   A4 = −2.62044e−005   A6 = 2.02686e−009
A8 = −4.13481e−011   A10 = −7.33645e−012   A12 = 7.19025e−014

Various data

Zoom ratio 5.59

| | Wide-angle | Middle | Telephoto |
|---|---|---|---|
| Focal length | 18.60 | 51.00 | 130.50 |
| F-number | 3.48 | 4.84 | 5.88 |
| Angle of view | 36.29 | 14.99 | 5.98 |
| Image height | 13.66 | 13.66 | 13.66 |
| Total lens length | 140.52 | 160.20 | 190.00 |
| BF | 35.60 | 56.40 | 71.56 |
| d6 | 0.90 | 21.92 | 42.41 |

| | | | |
|---|---|---|---|
| d13 | 26.18 | 6.70 | 1.50 |
| d15 | 2.83 | 4.19 | 8.87 |
| d17 | 7.09 | 5.73 | 1.05 |
| d26 | 4.80 | 2.15 | 1.50 |

| Zoom lens unit data | | | | | |
|---|---|---|---|---|---|
| Lens unit | Beginning surface | Focal length | Lens configuration length | Front principal point position | Rear principal point position |
| 1 | 1 | 88.69 | 17.53 | 5.86 | −5.78 |
| 2 | 7 | −17.44 | 18.06 | 1.34 | −11.69 |
| 3 | 14 | 45.02 | 1.95 | 0.66 | −0.44 |
| 4 | 16 | −36.12 | 0.70 | 0.02 | −0.35 |
| 5 | 18 | 37.72 | 20.89 | −21.54 | −23.56 |
| 6 | 27 | 31.24 | 3.99 | 1.85 | −0.54 |

Numerical Example 7

| Unit mm | | | | |
|---|---|---|---|---|
| Surface data | | | | |
| Surface number | r | d | nd | vd | Effective diameter |
|---|---|---|---|---|---|
| 1 | ∞ | 1.50 | | | 64.10 |
| 2 | 127.922 | 2.00 | 1.84666 | 23.8 | 56.80 |
| 3 | 76.612 | 6.62 | 1.49700 | 81.5 | 55.32 |
| 4 | 1483.135 | 0.15 | | | 54.89 |
| 5 | 66.859 | 5.86 | 1.60738 | 56.8 | 52.97 |
| 6 | 325.080 | (variable) | | | 52.19 |
| 7 | 79.300 | 1.45 | 1.91082 | 35.3 | 34.09 |
| 8 | 15.595 | 8.10 | | | 25.60 |
| 9 | −84.291 | 1.20 | 1.83481 | 42.7 | 25.41 |
| 10 | 42.660 | 1.31 | | | 25.09 |
| 11 | 30.665 | 6.60 | 1.84666 | 23.8 | 25.97 |
| 12 | −61.686 | 1.10 | 1.77250 | 49.6 | 25.43 |
| 13 | 413.544 | (variable) | | | 24.76 |
| 14 | 55.003 | 1.64 | 1.80518 | 25.4 | 14.39 |
| 15 | 1371.106 | (variable) | | | 14.24 |
| 16 | −38.056 | 0.70 | 1.90366 | 31.3 | 13.97 |
| 17 | −408.051 | (variable) | | | 14.24 |
| 18 | 23.610 | 3.66 | 1.60311 | 60.6 | 15.70 |
| 19 | −91.277 | 1.17 | | | 15.49 |
| 20(stop) | ∞ | 2.00 | | | 14.83 |
| 21 | 26.328 | 5.54 | 1.60311 | 60.6 | 14.37 |
| 22 | −23.088 | 0.75 | 1.80000 | 29.8 | 13.27 |
| 23 | −67.471 | 0.99 | | | 12.99 |
| 24 | −65.002 | 0.70 | 1.74950 | 35.3 | 12.45 |
| 25 | 15.384 | 1.91 | 1.77250 | 49.6 | 11.97 |
| 26 | 22.891 | 1.68 | | | 11.65 |
| 27 | 335.732 | 3.52 | 1.66680 | 33.0 | 11.80 |
| 28 | −9.868 | 0.80 | 1.72047 | 34.7 | 11.95 |
| 29 | 630.852 | 0.15 | | | 12.47 |
| 30 | 27.288 | 2.71 | 1.85400 | 40.4 | 12.79 |
| 31* | 110.032 | | | | 12.83 |

| Aspheric surface data |
|---|

31st surface

K = 0.00000e+000   A4 = 2.99992e−005   A6 = −4.29579e−008
A8 = 2.42140e−009   A10 = −2.39016e−011   A12 = −6.58966e−014

| Various data |
|---|
| Zoom ratio 5.59 |

| | Wide-angle | Middle | Telephoto |
|---|---|---|---|
| Focal length | 18.60 | 50.00 | 103.95 |
| F-number | 3.60 | 5.09 | 5.88 |

-continued

| | | | |
|---|---|---|---|
| Angle of view | 36.29 | 15.28 | 7.49 |
| Image height | 13.66 | 13.66 | 13.66 |
| Total lens length | 140.57 | 159.78 | 190.00 |
| BF | 35.64 | 56.33 | 67.17 |
| d6 | 0.90 | 24.00 | 48.93 |
| d13 | 31.63 | 7.05 | 1.50 |
| d15 | 3.12 | 4.63 | 7.52 |
| d17 | 5.45 | 3.94 | 1.05 |

Zoom lens unit data

| Lens unit | Beginning surface | Focal length | Lens configuration length | Front principal point position | Rear principal point position |
|---|---|---|---|---|---|
| 1 | 1 | 112.03 | 16.13 | 4.60 | −6.23 |
| 2 | 7 | −21.44 | 19.76 | 0.40 | −15.24 |
| 3 | 14 | 71.13 | 1.64 | −0.04 | −0.95 |
| 4 | 16 | −46.49 | 0.70 | −0.04 | −0.41 |
| 5 | 18 | 26.79 | 25.59 | 0.25 | −17.82 |

Numerical Example 8

Unit mm

Surface data

| Surface number | r | d | nd | vd | Effective diameter |
|---|---|---|---|---|---|
| 1 | ∞ | 1.50 | | | 64.00 |
| 2 | 95.457 | 2.00 | 1.84666 | 23.8 | 55.24 |
| 3 | 58.651 | 7.76 | 1.49700 | 81.5 | 51.80 |
| 4 | 6401.039 | 0.15 | | | 51.35 |
| 5 | 52.248 | 6.39 | 1.60311 | 60.6 | 49.00 |
| 6 | 239.934 | (variable) | | | 48.07 |
| 7 | 165.361 | 1.45 | 1.91082 | 35.3 | 31.91 |
| 8 | 15.531 | 7.54 | | | 23.98 |
| 9 | −49.402 | 1.20 | 1.77250 | 49.6 | 23.78 |
| 10 | 66.413 | 0.15 | | | 23.65 |
| 11 | 30.087 | 6.94 | 1.84666 | 23.8 | 24.00 |
| 12 | −34.011 | 1.10 | 1.80400 | 46.6 | 23.35 |
| 13 | 87.371 | (variable) | | | 22.18 |
| 14 | 100.574 | 1.83 | 1.80000 | 29.8 | 14.43 |
| 15 | −68.699 | (variable) | | | 14.33 |
| 16 | −34.220 | 0.70 | 1.90366 | 31.3 | 14.10 |
| 17 | 126.844 | 1.50 | 1.84666 | 23.8 | 14.46 |
| 18 | −120.827 | (variable) | | | 14.73 |
| 19 | 22.762 | 3.93 | 1.51633 | 64.1 | 16.22 |
| 20 | −47.446 | 0.83 | | | 15.96 |
| 21(stop) | ∞ | 3.30 | | | 15.30 |
| 22 | 21.131 | 5.11 | 1.60311 | 60.6 | 14.32 |
| 23 | −22.970 | 0.75 | 1.84666 | 23.8 | 13.16 |
| 24 | 34.807 | 3.44 | | | 12.56 |
| 25 | −39.697 | 0.70 | 1.80000 | 29.8 | 12.16 |
| 26 | 11.148 | 3.12 | 1.84666 | 23.8 | 12.29 |
| 27 | 89.644 | (variable) | | | 12.35 |
| 28* | 52.726 | 3.53 | 1.68893 | 31.1 | 14.48 |
| 29 | −45.855 | | | | 15.19 |

Aspheric surface data

28th surface

K = 0.00000e+000   A4 = −3.62046e−005   A6 = −6.64907e−009
A8 = −8.20333e−010   A10 = 3.23308e−012   A12 = 1.82226e−014

-continued

| Various data | | | |
|---|---|---|---|
| Zoom ratio 6.45 | | | |
| | Wide-angle | Middle | Telephoto |
| Focal length | 18.60 | 50.00 | 120.00 |
| F-number | 3.48 | 4.90 | 5.88 |
| Angle of view | 36.29 | 15.28 | 6.49 |
| Image height | 13.66 | 13.66 | 13.66 |
| Total lens length | 140.51 | 161.85 | 190.00 |
| BF | 35.60 | 57.97 | 73.10 |
| d6 | 0.90 | 19.59 | 38.16 |
| d13 | 24.74 | 6.80 | 1.53 |
| d15 | 3.31 | 4.95 | 9.74 |
| d18 | 7.48 | 5.84 | 1.05 |
| d27 | 3.56 | 1.79 | 1.50 |

| Zoom lens unit data | | | | | |
|---|---|---|---|---|---|
| Lens unit | Beginning surface | Focal length | Lens configuration length | Front principal point position | Rear principal point position |
| 1 | 1 | 84.52 | 17.79 | 5.05 | −6.91 |
| 2 | 7 | −15.67 | 18.38 | 2.05 | −10.62 |
| 3 | 14 | 51.27 | 1.83 | 0.61 | −0.42 |
| 4 | 16 | −50.94 | 2.20 | −0.41 | −1.61 |
| 5 | 19 | 44.31 | 21.18 | −20.88 | −25.10 |
| 6 | 28 | 36.13 | 3.53 | 1.13 | −0.99 |

Numerical Example 9

| Unit mm | | | | | |
|---|---|---|---|---|---|
| Surface data | | | | | |
| Surface number | r | d | nd | vd | Effective diameter |
| 1 | ∞ | 1.50 | | | 60.25 |
| 2 | 111.688 | 2.00 | 1.84666 | 23.8 | 52.90 |
| 3 | 54.774 | 7.45 | 1.49700 | 81.5 | 48.68 |
| 4 | 12582.119 | 0.15 | | | 48.38 |
| 5 | 50.826 | 6.20 | 1.66672 | 48.3 | 47.00 |
| 6 | 252.499 | (variable) | | | 46.20 |
| 7 | 147.037 | 1.45 | 1.91082 | 35.3 | 31.20 |
| 8 | 15.764 | 7.30 | | | 23.79 |
| 9 | −49.119 | 1.20 | 1.77250 | 49.6 | 23.57 |
| 10 | 55.922 | 0.20 | | | 23.38 |
| 11 | 31.138 | 6.76 | 1.84666 | 23.8 | 23.70 |
| 12 | −34.147 | 1.10 | 1.77250 | 49.6 | 23.12 |
| 13 | 158.890 | (variable) | | | 22.11 |
| 14 | 99.573 | 1.94 | 1.78472 | 25.7 | 15.32 |
| 15 | −60.620 | (variable) | | | 15.07 |
| 16 | −35.790 | 0.70 | 1.90366 | 31.3 | 14.52 |
| 17 | −1633.629 | (variable) | | | 14.69 |
| 18 | 23.157 | 3.96 | 1.60311 | 60.6 | 16.25 |
| 19 | −59.550 | 1.30 | | | 15.93 |
| 20(stop) | ∞ | 3.42 | | | 15.11 |
| 21 | 27.323 | 4.96 | 1.60311 | 60.6 | 14.10 |
| 22 | −19.541 | 0.75 | 1.84666 | 23.8 | 13.10 |
| 23 | 137.525 | 3.12 | | | 12.71 |
| 24 | −32.099 | 0.70 | 1.80000 | 29.8 | 12.08 |
| 25 | 11.916 | 2.77 | 1.84666 | 23.8 | 12.22 |
| 26 | 46.420 | (variable) | | | 12.29 |
| 27* | 68.211 | 3.84 | 1.68893 | 31.1 | 15.01 |
| 28 | −31.654 | | | | 15.98 |

-continued

Aspheric surface data

27th surface

K = 0.00000e+000   A4 = −2.82069e−005   A6 = −2.08522e−008
A8 = 3.41633e−010  A10 = −1.37913e−011  A12 = 1.14524e−013

Various data

Zoom ratio 7.01

|  | Wide-angle | Middle | Telephoto |
|---|---|---|---|
| Focal length | 18.62 | 51.01 | 130.47 |
| F-number | 3.46 | 4.80 | 5.88 |
| Angle of view | 36.27 | 14.99 | 5.98 |
| Image height | 13.66 | 13.66 | 13.66 |
| Total lens length | 140.28 | 158.59 | 189.71 |
| BF | 35.65 | 56.36 | 72.60 |
| d6 | 0.90 | 20.86 | 40.26 |
| d13 | 24.23 | 1.50 | 1.50 |
| d15 | 2.88 | 4.92 | 10.03 |
| d17 | 9.67 | 10.35 | 1.05 |
| d26 | 4.18 | 1.83 | 1.50 |

Zoom lens unit data

| Lens unit | Beginning surface | Focal length | Lens configuration length | Front principal point position | Rear principal point position |
|---|---|---|---|---|---|
| 1 | 1 | 85.67 | 17.29 | 5.71 | −5.75 |
| 2 | 7 | −17.27 | 18.01 | 1.46 | −11.47 |
| 3 | 14 | 48.27 | 1.94 | 0.68 | −0.41 |
| 4 | 16 | −40.50 | 0.70 | −0.01 | −0.38 |
| 5 | 18 | 41.08 | 20.98 | −22.87 | −24.67 |
| 6 | 27 | 31.88 | 3.84 | 1.58 | −0.73 |

TABLE 2

|  |  | numerical example 6 | numerical example 7 | numerical example 8 | numerical example 9 |
|---|---|---|---|---|---|
|  |  | Lens type | | | |
|  |  | PNPNPP | PNPNP | PNPNPP | PNPNPP |
|  |  | | | | Third lens unit, Fourth |
| Condition | Focus | Fourth lens unit | Fourth lens unit | Fourth lens unit | lens unit |
|  | fw | 18.600 | 18.603 | 18.600 | 18.616 |
|  | ft | 130.497 | 103.945 | 120.000 | 130.466 |
|  | f1 | 88.695 | 112.030 | 84.523 | 85.666 |
|  | f3 | 45.019 | 71.126 | 51.269 | 48.274 |
|  | f4 | −36.118 | −46.487 | −50.936 | −40.502 |
|  | f123t | 12531.300 | −245.497 | −270.440 | −1100.550 |
|  | f123w | 69.869 | 769.079 | 254.113 | 114.808 |
|  | f12w | −24.453 | −28.918 | −22.446 | −24.541 |
|  | f12t | −71.149 | −68.568 | −60.908 | −70.708 |
|  | fpw | 30.414 | 26.794 | 31.608 | 30.795 |
|  | fpt | 28.026 | 26.794 | 30.372 | 28.968 |
|  | Mft | −6.581 | −5.388 | −7.884 | −7.524 |
|  | Mz | 6.041 | 4.398 | 6.431 | 7.147 |
| (19) | ft/f123t | 0.010 | −0.423 | −0.444 | −0.119 |
| (20) | fw/f123w | 0.266 | 0.024 | 0.073 | 0.162 |
| (21) | p4w | −0.269 | −0.024 | −0.088 | −0.176 |
| (22) | p4t | −0.005 | 0.195 | 0.215 | 0.054 |
| (23) | −f12w/f3 | 0.543 | 0.407 | 0.38 | 0.508 |
| (24) | −f12t/f3 | 1.580 | 0.964 | 1.188 | 1.465 |
| (25) | −fpw/f4 | 0.842 | 0.576 | 0.621 | 0.760 |
| (26) | −fpt/f4 | 0.776 | 0.576 | 0.596 | 0.715 |
| (27) | −Mz/Mft | 0.918 | 0.816 | 0.816 | 0.950 |

With reference to FIG. 19, the following describes an example of applying the zoom lens described in the first through ninth exemplary embodiments to an image pickup apparatus. The image pickup apparatus according to an exemplary embodiment of the invention includes an interchangeable lens apparatus and a camera body. The interchangeable lens apparatus includes the zoom lens. The camera body is detachably connected to the interchangeable lens apparatus via a camera mount portion. The camera body includes an image sensor that senses an optical image formed by the zoom lens and converts the optical image into an electric image signal.

FIG. 19 is a schematic diagram illustrating principal components of a single-lens reflex camera. In FIG. 19, a photographic lens 10 includes a zoom lens 1 according to any one of the first through ninth exemplary embodiments. A lens barrel 2 as a holding member holds the zoom lens 1. A camera body 20 includes a quick-return mirror 3 and a focusing screen 4. The quick-return mirror 3 upward reflects a beam from the photographic lens 10. The focusing screen 4 is disposed at a position where the photographic lens 10 forms an image. The camera body 20 further includes a pentagonal roof prism 5 and an eyepiece lens 6. The pentagonal roof prism 5 transforms a reverse image formed on the focusing screen 4 into an erect image. The eyepiece lens 6 is used to observe the erect image.

A light-sensitive surface 7 is provided with a solid-state image sensor (photoelectric conversion element) or a silver-halide film that senses an image formed by the zoom lens. The solid-state image sensor includes a CCD sensor and a CMOS sensor. When capturing an image, the quick-return mirror 3 retracts from an optical path. The photographic lens 10 forms an image on the light-sensitive surface 7. The zoom lens according to each exemplary embodiment is also applicable to a mirrorless single-lens reflex camera having no quick-return mirror.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2011-220908 filed Oct. 5, 2011 and No. 2011-220909 filed Oct. 5, 2011, which are hereby incorporated by reference herein in their entirety.

What is claimed is:

1. A zoom lens comprising:
a lens unit Ln having negative refractive power;
a lens unit Lp1 having positive refractive power; and
a lens unit Lp2 having positive refractive power,
wherein the lens unit Ln includes two or less lenses and moves during focusing and zooming, the lens unit Lp1 is disposed adjacent to an object side of the lens unit Ln, the lens unit Lp2 is disposed adjacent to an image side of the lens unit Ln, and the lens unit Lp1 and the lens unit Lp2 move together during zooming, and
wherein the zoom lens satisfies the following conditions:

$$0.2 < (Dnw - bfw)/(Tlw - bfw) < 0.8$$

$$0.3 < -Mnz/Mfnt < 1.0$$

where Tlw denotes a distance between a lens surface of the entire zoom lens nearest to the object side and an image plane at a wide-angle end, Dnw denotes a distance between a lens surface of the lens unit Ln nearest to the image side and the image plane at the wide-angle end, bfw denotes a back focus at the wide-angle end, Mfnt denotes a maximum amount of focusing movement of the lens unit Ln at a telephoto end by assuming movement from the object side to the image side to be positive during focusing from infinite distance to close distance, and Mnz denotes an amount of change in distance between the lens unit Ln and the lens unit Lp1 during zooming from the wide-angle end to the telephoto end by assuming an increase in the distance to be positive.

2. The zoom lens according to claim 1, wherein the zoom lens satisfies the following conditions:

$$0.4 < -fp1/fn < 2.5$$

$$0.4 < -fp2/fn < 2.5$$

where fn, fp1, and fp2 denote focal lengths of the lens unit Ln, the lens unit Lp1, and the lens unit Lp2, respectively.

3. The zoom lens according to claim 1, wherein the zoom lens satisfies the following conditions:

$$0.7 < ea\_p1r/ea\_nf < 1.4$$

$$0.7 < ea\_p2f/ea\_nr < 1.4$$

where ea_nf and ea_nr denote effective diameters of the lens unit Ln at the object side and the image side, respectively, and ea_p1r and ea_p2f denote effective diameters of the lens unit Lp1 at the image side and the lens unit Lp2 at the object side, respectively.

4. The zoom lens according to claim 1, wherein the zoom lens satisfies the following condition:

$$|(okw - okp2)/fp2| < 0.3$$

where okw denotes a rear principal point position of a composite lens unit including the lens unit Lp1, lens unit Ln, and the lens unit Lp2 at the wide-angle end, okp2 denotes a rear principal point position of the lens unit Lp2, and fp2 denotes a focal length of the lens unit Lp2.

5. The zoom lens according to claim 1, wherein the zoom lens satisfies the following condition:

$$|\beta nw| < 1.0$$

where βnw denotes a lateral magnification of the lens unit Ln at the wide-angle end.

6. The zoom lens according to claim 1, wherein the zoom lens satisfies the following condition:

$$|\beta nt| < 1.0$$

where βnt denotes a lateral magnification of the lens unit Ln at the telephoto end.

7. An image pickup apparatus comprising a zoom lens, wherein the zoom lens comprises:
a lens unit Ln having negative refractive power;
a lens unit Lp1 having positive refractive power; and
a lens unit Lp2 having positive refractive power,
wherein the lens unit Ln includes two or less lenses and moves during focusing and zooming, the lens unit Lp1 is disposed adjacent to an object side of the lens unit Ln, the lens unit Lp2 is disposed adjacent to an image side of the lens unit Ln, and the lens unit Lp1 and the lens unit Lp2 move together during zooming, and
wherein the zoom lens satisfies the following conditions:

$$0.2 < (Dnw - bfw)/(Tlw - bfw) < 0.8$$

$$0.3 < -Mnz/Mfnt < 1.0$$

where Tlw denotes a distance between a lens surface of the entire zoom lens nearest to the object side and an image plane at a wide-angle end, Dnw denotes a distance between a lens surface of the lens unit Ln nearest to the image side and the image plane at the wide-angle end, bfw denotes a back focus at the wide-angle end, Mfnt denotes a maximum amount of focusing movement of the lens unit Ln at a telephoto end by assuming movement from the object side to the image side to be positive during focusing from infinite distance to close distance, and Mnz denotes an amount of change in distance between the lens unit Ln and the lens unit Lp1 during zooming from the wide-angle end to the telephoto end by assuming an increase in the distance to be positive.

8. A zoom lens comprising:
a lens unit Lp having positive refractive power;
a lens unit Ln1 having negative refractive power; and
a lens unit Ln2 having negative refractive power,
wherein the lens unit Lp includes two or less lenses and moves during focusing and zooming, the lens unit Ln1 is disposed adjacent to an object side of the lens unit Lp, the lens unit Ln2 is disposed adjacent to an image side of the lens unit Lp, and the lens unit Ln1 and the lens unit Ln2 move together during zooming, and
wherein the zoom lens satisfies the following conditions:

$$0.2 < (Dn2w - bfw)/(Tlw - bfw) < 0.8$$

$$0.3 < -Mpz/Mfpt < 1.0$$

where Tlw denotes a distance between a lens surface of the entire zoom lens nearest to the object side and an image plane at a wide-angle end, Dn2w denotes a distance between a lens surface of the lens unit Ln2 nearest to the image side and the image plane at the wide-angle end, bfw denotes a back focus at the wide-angle end, Mfpt denotes a maximum amount of focusing movement of the lens unit Lp at a telephoto end by assuming movement from the object side to the image side to be positive during focusing from infinite distance to close distance, and Mpz denotes an amount of change in distance between the lens unit Lp and the lens unit Ln2 during zooming from the wide-angle end to the telephoto end by assuming a decrease in the distance to be positive.

9. The zoom lens according to claim 8, wherein the zoom lens satisfies the following conditions:

$$0.3 < -fn1/fp < 2.5$$

$$0.3 < -fn2/fp < 2.5$$

where fp, fn1, and fn2 denote focal lengths of the lens unit Lp, the lens unit Ln1, and the lens unit Ln2, respectively.

10. The zoom lens according to claim 8, wherein the zoom lens satisfies the following conditions:

$$0.7 < ea\_n1r/ea\_pf < 1.4$$

$$0.7 < ea\_n2f/ea\_pr < 1.4$$

where ea_pf and ea_pr denote effective diameters of the lens unit Lp at the object side and the image side, respectively, and ea_n1r and ea_n2f denote effective diameters of the lens unit Ln1 at the image side and the lens unit Ln2 at the object side, respectively.

11. The zoom lens according to claim 8, wherein the zoom lens satisfies the following condition:

$$|(o1w-o1n1)/fn1| < 0.3$$

where o1w denotes a front principal point position of a composite lens unit including the lens unit Ln1, lens unit Lp, and the lens unit Ln2 at the wide-angle end, o1n1 denotes a front principal point position of the lens unit Ln1, and fn1 denotes a focal length of the lens unit Ln1.

12. The zoom lens according to claim 8, wherein the zoom lens satisfies the following condition:

$$|\beta n2w| < 1.0$$

where βn2w denotes a lateral magnification of the lens unit Ln2 at the wide-angle end.

13. The zoom lens according to claim 8, wherein the zoom lens satisfies the following condition:

$$|\beta n2t| < 1.0$$

where βn2t denotes a lateral magnification of the lens unit Ln2 at the telephoto end.

14. An image pickup apparatus comprising a zoom lens, wherein the zoom lens comprises:
a lens unit Lp having positive refractive power;
a lens unit Ln1 having negative refractive power; and
a lens unit Ln2 having negative refractive power,
wherein the lens unit Lp includes two or less lenses and moves during focusing and zooming, the lens unit Ln1 is disposed adjacent to an object side of the lens unit Lp, the lens unit Ln2 is disposed adjacent to an image side of the lens unit Lp, and the lens unit Ln1 and the lens unit Ln2 move together during zooming, and
wherein the zoom lens satisfies the following conditions:

$$0.2 < (Dn2w-bfw)/(Tlw-bfw) < 0.8$$

$$0.3 < -Mpz/Mfpt < 1.0$$

where Tlw denotes a distance between a lens surface of the entire zoom lens nearest to the object side and an image plane at a wide-angle end, Dn2w denotes a distance between a lens surface of the lens unit Ln2 nearest to the image side and the image plane at the wide-angle end, bfw denotes a back focus at the wide-angle end, Mfpt denotes a maximum amount of focusing movement of the lens unit Lp at a telephoto end by assuming movement from the object side to the image side to be positive during focusing from infinite distance to close distance, and Mpz denotes an amount of change in distance between the lens unit Lp and the lens unit Ln2 during zooming from the wide-angle end to the telephoto end by assuming a decrease in the distance to be positive.

15. A zoom lens comprising, in order from an object side to an image side:
a first lens unit having positive refractive power;
a second lens unit having negative refractive power;
a third lens unit having positive refractive power;
a fourth lens unit having negative refractive power; and
a rear group that includes one or more lens units and has positive refractive power as a whole, wherein the lens units move during zooming and the fourth lens unit moves during focusing, and
wherein the zoom lens satisfies the following conditions:

$$|ft/f_{123}t| < 0.6, \text{ and}$$

$$-0.269 \leq |\beta 4w| < 1.0,$$

where ft denotes a focal length of the entire zoom lens at a telephoto end and $f_{123}t$ denotes a composite focal length ranging from the first lens unit to the third lens unit at the telephoto end, and β4w denotes a lateral magnification of the fourth lens unit at the wide-angle end.

16. The zoom lens according to claim 15, wherein the zoom lens satisfies the following condition:

$$fw/f_{123}w| < 0.5$$

where fw denotes a focal length of the entire zoom lens at a wide-angle end and $f_{123}w$ denotes a composite focal length ranging from the first lens unit to the third lens unit at the wide-angle end.

17. The zoom lens according to claim 15, wherein the zoom lens satisfies the following condition:

$$|\beta 4t| < 1.0$$

where β4t denotes a lateral magnification of the fourth lens unit at the telephoto end.

18. The zoom lens according to claim 15, wherein the zoom lens satisfies the following condition:

$$0.3 < -f_{12}w/f3 < 2.0$$

where $f_{12}w$ denotes a composite focal length of the first lens unit and the second lens unit at the wide-angle end and f3 denotes a focal length of the third lens unit.

19. The zoom lens according to claim 15, wherein the zoom lens satisfies the following condition:

$$0.3 < -f_{12}t/f3 < 2.0$$

where $f_{12}t$ denotes a composite focal length of the first lens unit and the second lens unit at the telephoto end and f3 denotes a focal length of the third lens unit.

20. The zoom lens according to claim 15, wherein the zoom lens satisfies the following condition:

$$0.40 < -fpw/f4 < 0.95$$

where fpw denotes a composite focal length of the rear group at the wide-angle end and f4 denotes a focal length of the fourth lens unit.

21. The zoom lens according to claim 15, wherein the zoom lens satisfies the following condition:

$$0.40 < -fpt/f4 < 0.95$$

where fpt denotes a composite focal length of the rear group at the telephoto end and f4 denotes a focal length of the fourth lens unit.

22. The zoom lens according to claim 15, wherein the fourth lens unit includes two or less lenses.

23. The zoom lens according to claim 15, wherein the zoom lens satisfies the following condition:

$$0.3 < -Mz/Mft < 1.0$$

where Mft denotes a maximum amount of focusing movement of the fourth lens unit at the telephoto end by assuming movement from the object side to the image side to be positive during focusing from infinite distance to close distance and Mz denotes an amount of change in distance between the third lens unit and the fourth lens unit during zooming from the wide-angle end to the telephoto end by assuming an increase in the distance to be positive during zooming from the wide-angle end to the telephoto end.

24. The zoom lens according to claim 15, wherein the lens units move to effect zooming such that, at the telephoto end as compared with a wide-angle end, a distance between the first lens unit and the second lens unit is longer, a distance between the second lens unit and the third lens unit is shorter, a distance between the third lens unit and the fourth lens unit is longer, and a distance between the fourth lens unit and the rear group is shorter.

25. The zoom lens according to claim 15, wherein the rear group includes, in order from the object side to the image side, a fifth lens unit having positive refractive power and a sixth lens unit having positive refractive power.

26. The zoom lens according to claim 15, wherein the rear group includes a fifth lens unit having positive refractive power.

27. An image pickup apparatus comprising a zoom lens, wherein the zoom lens comprises, in order from an object side to an image side:
a first lens unit having positive refractive power;
a second lens unit having negative refractive power;
a third lens unit having positive refractive power;
a fourth lens unit having negative refractive power; and
a rear group that includes one or more lens units and has positive refractive power as a whole, wherein the lens units move during zooming and the fourth lens unit moves during focusing, and
wherein the zoom lens satisfies the following conditions:

$$|ft/f_{123}t| < 0.6$$

$$-0.269 \leq |\beta 4w| < 1.0$$

where ft denotes a focal length of the entire zoom lens at a telephoto end and $f_{123}t$ denotes a composite focal length ranging from the first lens unit to the third lens unit at the telephoto end, and β4w denotes a lateral magnification of the fourth lens unit at the wide-angle end.

28. A zoom lens comprising:
a lens unit Ln having negative refractive power;
a lens unit Lp1 having positive refractive power; and
a lens unit Lp2 having positive refractive power,
wherein the lens unit Ln includes two or less lenses and moves during focusing and zooming, the lens unit Lp1 is disposed adjacent to an object side of the lens unit Ln, the lens unit Lp2 is disposed adjacent to an image side of the lens unit Ln, and the lens unit Lp1 and the lens unit Lp2 move during zooming, and
wherein the zoom lens satisfies the following conditions:

$$0.2 < (Dnw-bfw)/(Tlw-bfw) < 0.8$$

$$0.3 < -Mnz/Mfnt < 1.0$$

$$|(okw-okp2)/fp2| < 0.3$$

where Tlw denotes a distance between a lens surface of the entire zoom lens nearest to the object side and an image plane at a wide-angle end, Dnw denotes a distance between a lens surface of the lens unit Ln nearest to the image side and the image plane at the wide-angle end, bfw denotes a back focus at the wide-angle end, Mfnt denotes a maximum amount of focusing movement of the lens unit Ln at a telephoto end by assuming movement from the object side to the image side to be positive during focusing from infinite distance to close distance, Mnz denotes an amount of change in distance between the lens unit Ln and the lens unit Lp1 during zooming from the wide-angle end to the telephoto end by assuming an increase in the distance to be positive, okw denotes a rear principal point position of a composite lens unit including the lens unit Lp1, lens unit Ln, and the lens unit Lp2 at the wide-angle end, okp2 denotes a rear principal point position of the lens unit Lp2, and fp2 denotes a focal length of the lens unit Lp2.

29. A zoom lens comprising:
a lens unit Lp having positive refractive power;
a lens unit Ln1 having negative refractive power; and
a lens unit Ln2 having negative refractive power,
wherein the lens unit Lp includes two or less lenses and moves during focusing and zooming, the lens unit Ln1 is disposed adjacent to an object side of the lens unit Lp, the lens unit Ln2 is disposed adjacent to an image side of the lens unit Lp, and the lens unit Ln1 and the lens unit Ln2 move during zooming, and
wherein the zoom lens satisfies the following conditions:

$$0.2 < (Dn2w-bfw)/(Tlw-bfw) < 0.8$$

$$0.3 < -Mpz/Mfpt < 1.0$$

$$|(o1w-o1n1)/fn1| < 0.3$$

where Tlw denotes a distance between a lens surface of the entire zoom lens nearest to the object side and an image plane at a wide-angle end, Dn2w denotes a distance between a lens surface of the lens unit Ln2 nearest to the image side and the image plane at the wide-angle end, bfw denotes a back focus at the wide-angle end, Mfpt denotes a maximum amount of focusing movement of the lens unit Lp at a telephoto end by assuming movement from the object side to the image side to be positive during focusing from infinite distance to close distance, Mpz denotes an amount of change in distance between the lens unit Lp and the lens unit Ln2 during zooming from the wide-angle end to the telephoto end by assuming a decrease in the distance to be positive, o1w denotes a front principal point position of a composite lens unit including the lens unit Ln1, lens unit Lp, and the lens unit Ln2 at the wide-angle end, o1n1 denotes a front principal point position of the lens unit Ln1, and fn1 denotes a focal length of the lens unit Ln1.

30. A zoom lens comprising, in order from an object side to an image side:
a first lens unit having positive refractive power;
a second lens unit having negative refractive power;
a third lens unit having positive refractive power;
a fourth lens unit having negative refractive power;
a fifth lens unit having positive refractive power; and
a sixth lens unit having positive refractive power, wherein the lens units move during zooming and the fourth lens unit moves during focusing, and wherein the zoom lens satisfies the following condition:

$$|ft/f_{123}t|<0.6$$

where ft denotes a focal length of the entire zoom lens at a telephoto end, and $f_{123}t$ denotes a composite focal length ranging from the first lens unit to the third lens unit at the telephoto end.

* * * * *